United States Patent
Sekiguchi et al.

(10) Patent No.: US 7,983,126 B2
(45) Date of Patent: Jul. 19, 2011

(54) OPTICAL-INFORMATION RECORDING APPARATUS AND METHOD AND SIGNAL PROCESSING CIRCUIT

(75) Inventors: Mitsuo Sekiguchi, Gunma (JP); Hiroya Kakimoto, Gunma (JP); Fuyuki Miyazawa, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 1422 days.

(21) Appl. No.: 11/443,641

(22) Filed: May 30, 2006

(65) Prior Publication Data

US 2007/0008854 A1    Jan. 11, 2007

(30) Foreign Application Priority Data

May 30, 2005    (JP) ................. 2005-157409

(51) Int. Cl.
  *G11B 20/18*    (2006.01)
(52) U.S. Cl. ............... 369/47.53; 369/53.34; 369/59.12
(58) Field of Classification Search .......... None
See application file for complete search history.

(56) References Cited

U.S. PATENT DOCUMENTS

| | | | | |
|---|---|---|---|---|
| 7,230,895 B2* | 6/2007 | Sasaki et al. | ............... | 369/47.53 |
| 2003/0156519 A1* | 8/2003 | Yokoi | ............... | 369/59.11 |
| 2003/0227852 A1* | 12/2003 | Ogawa | ............... | 369/59.23 |
| 2004/0160874 A1* | 8/2004 | Hwang et al. | ............... | 369/47.53 |
| 2005/0041552 A1* | 2/2005 | Shoji et al. | ............... | 369/59.12 |
| 2005/0169140 A1* | 8/2005 | Adachi et al. | ............... | 369/47.53 |

FOREIGN PATENT DOCUMENTS

| | | |
|---|---|---|
| JP | 231727 | 8/2000 |
| JP | 2003-30837 | 1/2003 |
| JP | 2004-110995 | 4/2004 |

* cited by examiner

*Primary Examiner* — Christopher R Lamb
(74) *Attorney, Agent, or Firm* — Chen Yoshimura LLP

(57) ABSTRACT

A recording condition approximate to the optimal is obtainable for a media even if unknown to the drive. A technique is provided that is effective for improving the signal quality, particularly, at a Wobble and Lpp. By regulating an intermediate pulse condition PWD, Tmp of a recording pulse configured with a top pulse, an intermediate pulse and a last pulse, the pit width W in a saturation code is controlled. The pit length and phase in the saturation code is controlled based on a front phase correction amount Ttop and rear phase correction amount Tlast.

24 Claims, 32 Drawing Sheets

Fig. 9
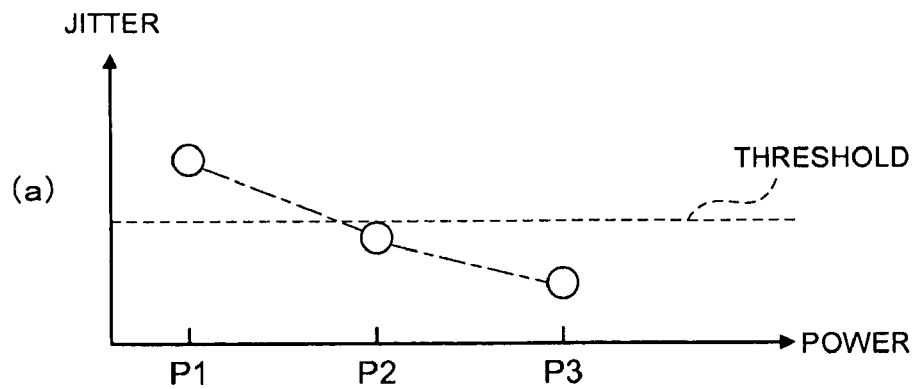
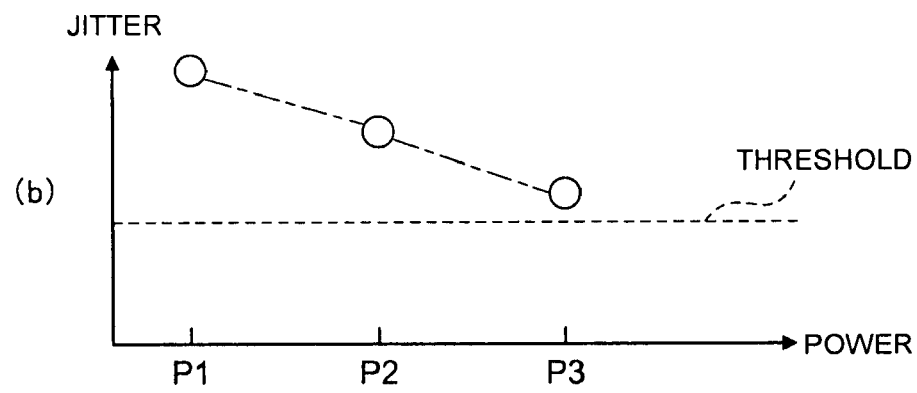
Fig. 10
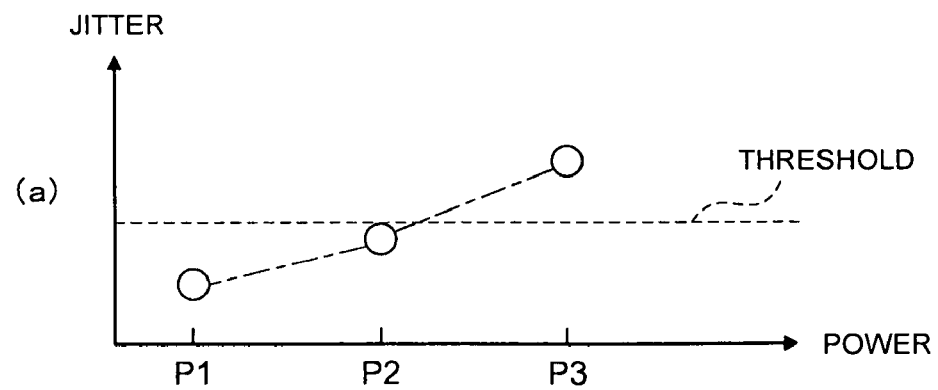
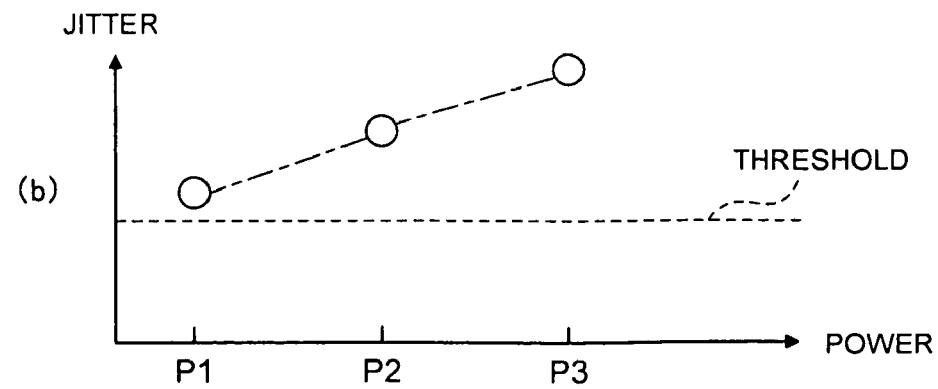

Fig. 13

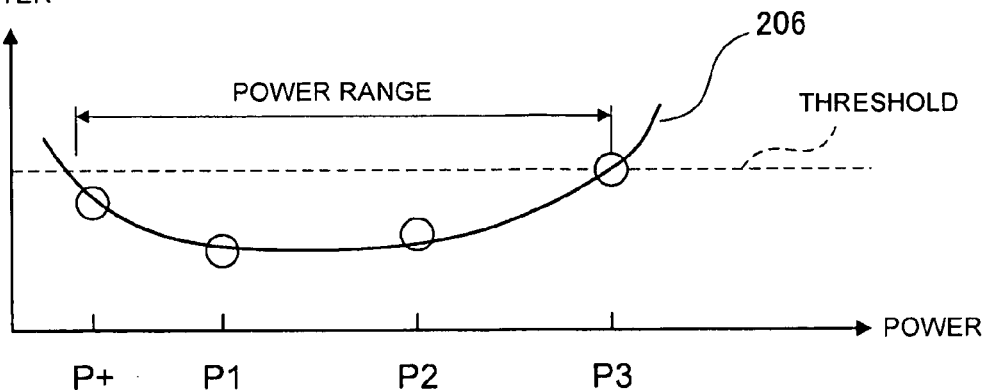

Fig. 14

| PATTERN | FORM | RELATION TO THRESHOLD | RECORDING CHARACTERISTIC PREDICTED | PULSE WIDTH |
|---|---|---|---|---|
| 1 | ARBITRARY | MAXIMUM JITTER ≤ THRESHOLD | EQUAL SENSITIVITY | ±0.2T |
| 2 | VALLEY | MINIMUM JITTER ≤ THRESHOLD | EQUAL SENSITIVITY | ±0.1T |
| 3 | VALLEY | MINIMUM JITTER > THRESHOLD | EQUAL SENSITIVITY + GREAT CHARACTERISTIC DIFFERENCE | ±0.2T |
| 4 | DESCENT-TOWARD-RIGHT | MINIMUM JITTER ≤ THRESHOLD | SOMEWHAT LOW SENSITIVITY | +0.1T, +0.2T |
| 5 | DESCENT-TOWARD-RIGHT | MINIMUM JITTER > THRESHOLD | SIGNIFICANTLY LOW SENSITIVITY | +0.2T, +0.4T |
| 6 | ASCENT-TOWARD-RIGHT | MINIMUM JITTER ≤ THRESHOLD | SOMEWHAT HIGH SENSITIVITY | -0.1T, -0.2T |
| 7 | ASCENT-TOWARD-RIGHT | MINIMUM JITTER > THRESHOLD | SIGNIFICANTLY HIGH SENSITIVITY | -0.2T, -0.4T |
| 8 | RIDGE | MAXIMUM JITTER > THRESHOLD | NG | ±0.2T |

| No | POLARITY | COUNT RESULT |
|---|---|---|
| 1 | Pit | 5 |
| 2 | Land | 6 |
| 3 | Pit | 9 |
| 4 | Land | 8 |
| 5 | Pit | 13 |
| 6 | Land | 8 |
| . | . | . |
| . | . | . |
| . | . | . |

Fig. 22
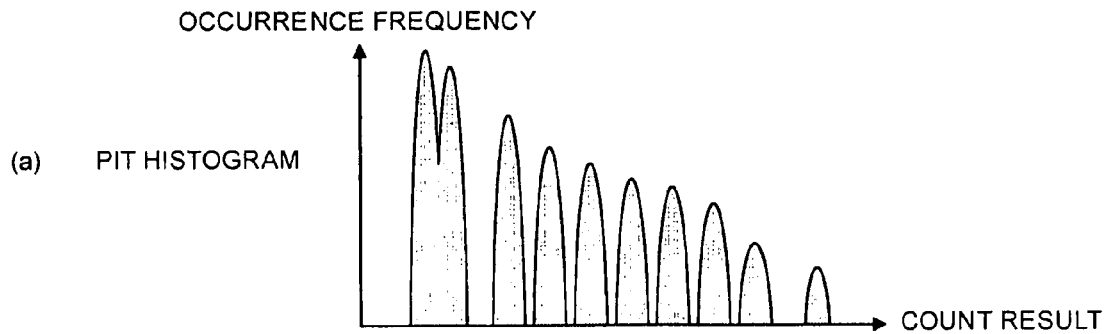
(a) PIT HISTOGRAM
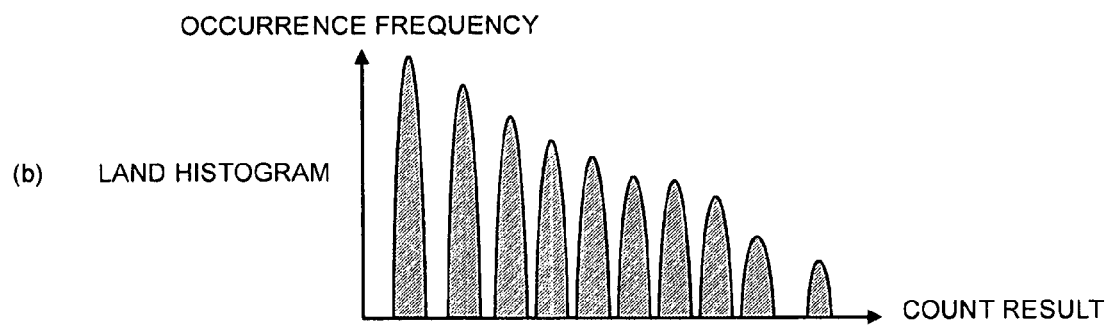
(b) LAND HISTOGRAM
Fig. 23
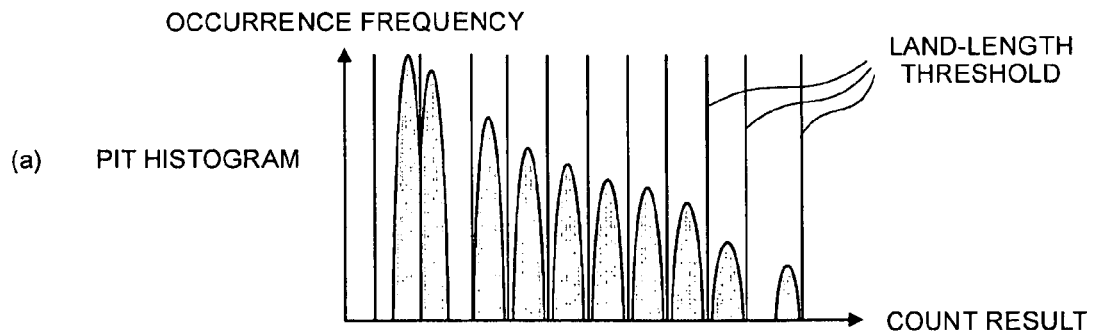
(a) PIT HISTOGRAM
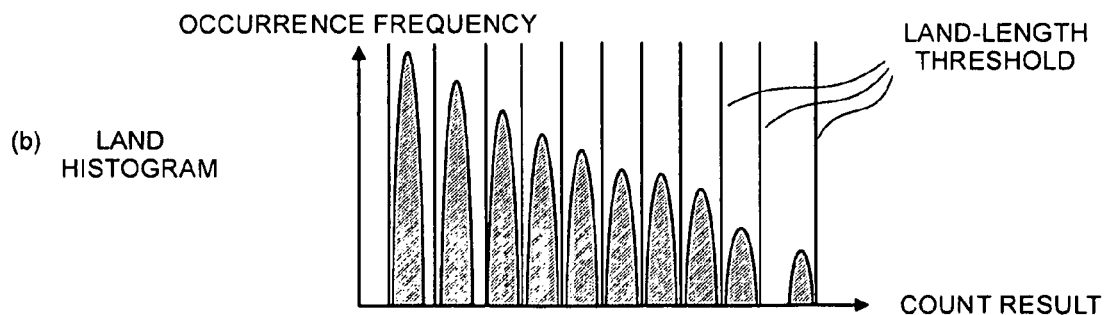
(b) LAND HISTOGRAM (a) PIT-LENGTH THRESHOLD

| DATA | COUNT VALUE |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

(b) LAND-LENGTH THRESHOLD

| DATA | COUNT VALUE |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

Fig. 26
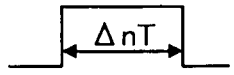
Fig. 27
| No | POLARITY | COUNT RESULT |
|---|---|---|
| 1 | Pit | 5 |
| 2 | Land | 6 |
| 3 | Pit | 9 |
| ... | ... | ... |
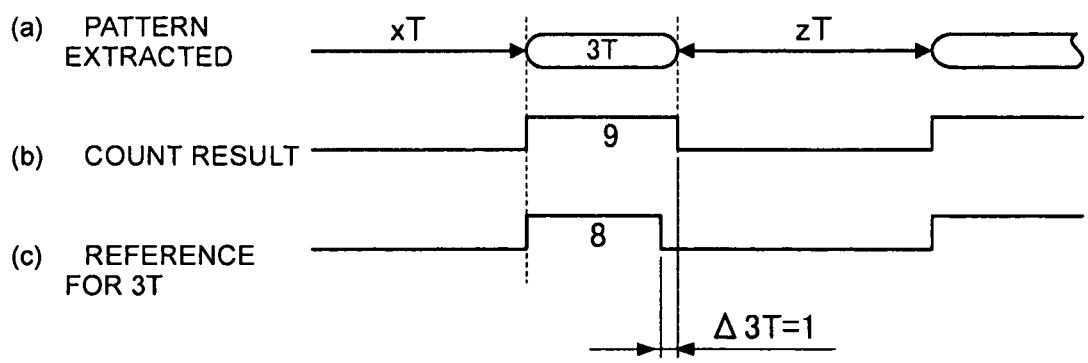

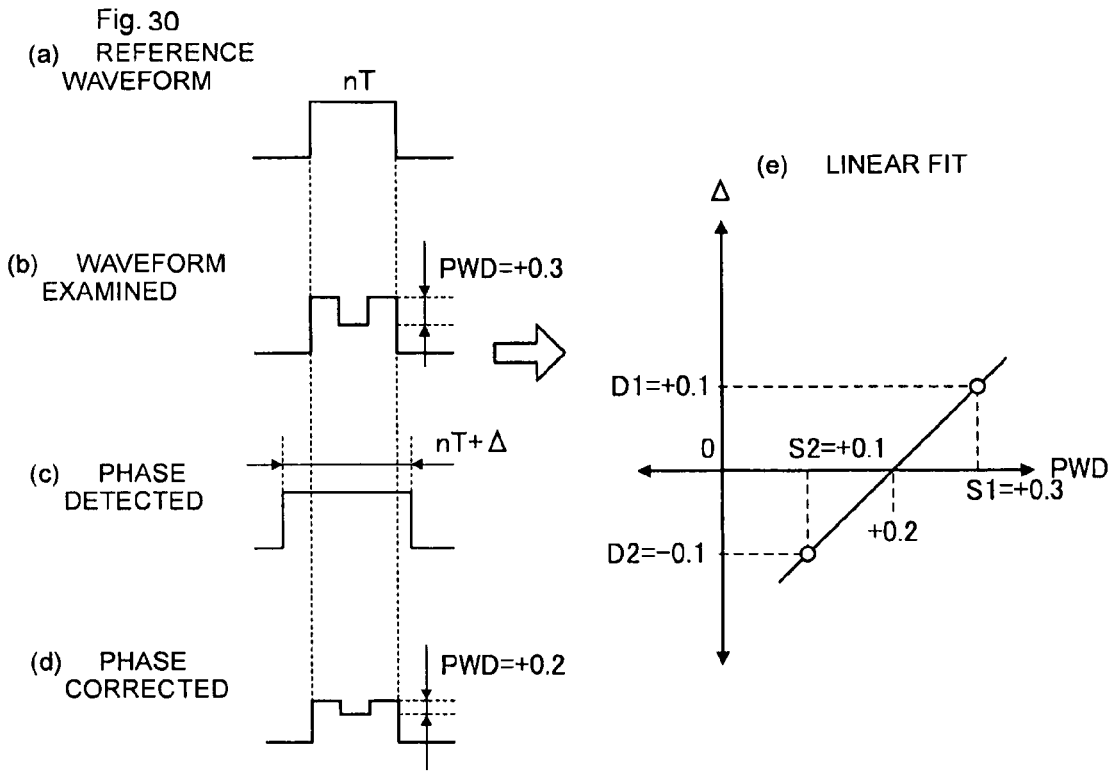
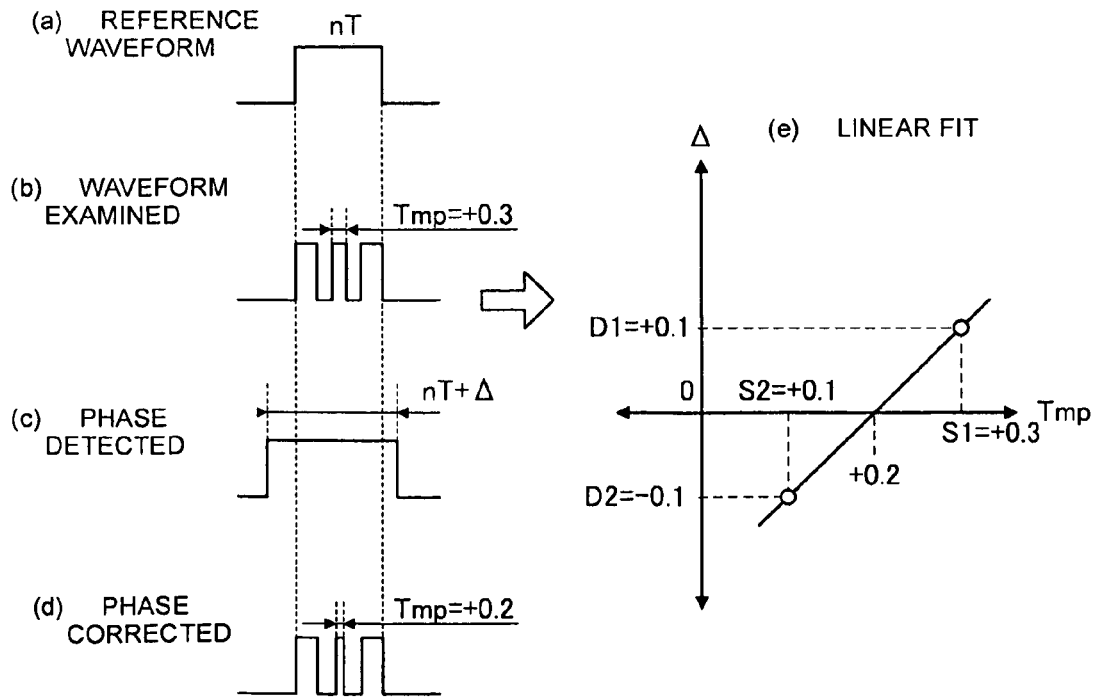

| CONTROL FACTOR | PIT TO BE CORRECTED | | | | | | | | |
|---|---|---|---|---|---|---|---|---|---|
| | 3T | 4T | 5T | 6T | 7T | 8T | 9T | 10T | 11T | 14T |
| PWD | PW3 | PW4 | PW5 | PW6 | PW7 | PW8 | PW9 | PW10 | PW11 | PW14 |
| Tmp | Tm3 | Tm4 | Tm5 | Tm6 | Tm7 | Tm8 | Tm9 | Tm10 | Tm11 | Tm14 |

Fig. 38

|  | xT | yT | zT |
|---|---|---|---|
| (a) RECORDING PULSE | | | |
| (b) REFERENCE PATTERN | 3T | | zT |
| (c) COMPARATIVE PATTERN A | 4T | HID3T | zT |
| (d) COMPARATIVE PATTERN B | 5T | HID4T | zT |
| (e) COMPARATIVE PATTERN C | 6T | HID5T | zT |
| (f) COMPARATIVE PATTERN D | 7T | HID6T | zT |
|  |  | HID7T |  |

Fig. 39

(a) PIT-FRONT-PHASE DEVIATION DETECTED

FPS

| PATTERN RETRIEVED | THRESHOLD PxT | | THRESHOLD LyT | | THRESHOLD PzT | |
|---|---|---|---|---|---|---|
|  | min | max | min | max | min | max |
| P6 OR GREATER – L4 – P3 | 26 | 100 | 10 | 18 | 2 | 9 |
| P6 OR GREATER – L4 – P4 | 26 | 100 | 10 | 18 | 9 | 18 |
| P6 OR GREATER – L4 – P5 | 26 | 100 | 10 | 18 | 18 | 26 |
| P6 OR GREATER – L4 – P6 | 26 | 100 | 10 | 18 | 26 | 35 |
| ... | ... | ... | ... | ... | ... | ... |

(b) PIT-REAR-PHASE DEVIATION DETECTED

RPS

| PATTERN RETRIEVED | THRESHOLD PxT | | THRESHOLD LyT | | THRESHOLD PzT | |
|---|---|---|---|---|---|---|
|  | min | max | min | max | min | max |
| P3 – L4 – P6 OR GREATER | 2 | 9 | 10 | 18 | 26 | 100 |
| P4 – L4 – P6 OR GREATER | 9 | 18 | 10 | 18 | 26 | 100 |
| P5 – L4 – P6 OR GREATER | 18 | 26 | 10 | 18 | 26 | 100 |
| P6 – L4 – P6 OR GREATER | 26 | 35 | 10 | 18 | 26 | 100 |
| ... | ... | ... | ... | ... | ... | ... |

(a) REFERENCE PATTERN (b) COMPARATIVE PATTERN (c) REFERENCE-PATTERN COUNT RESULT (d) COMPARATIVE-PATTERN COUNT RESULT (a) Ttop CORRECTION AMOUNT

| FRONT LAND | PIT TO BE CORRECTED | | | | | | | | |
|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

(b) Tlast CORRECTION AMOUNT

| REAR LAND | PIT TO BE CORRECTED | | | | | | | | |
|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

OPTICAL-INFORMATION RECORDING APPARATUS AND METHOD AND SIGNAL PROCESSING CIRCUIT

BACKGROUND OF THE INVENTION

1. Field of the Invention

Certain inventive aspects relate to an optical-information recording apparatus and method and a signal processing circuit for the same, and more particularly to an optical-information recording apparatus and method and a signal processing circuit for the same, that can optimize the recording condition in accordance with the compatibleness of the drive with a media.

2. Description of the Related Technology

Where recording is made to an optical-information recording media (hereinafter referred to as a "media"), as represented by a CD-R, a DVD-R or the like, the compatibleness of the recording media with the recording apparatus (hereinafter referred to as a "drive"), used in the recording, is different from combination to combination on an individual basis. This can be considered attributable to the cause of a media-side factor that changes the optimum condition due to a different recording material forming the media and a change in the optimal recording condition resulting from the deposit-film variation as encountered in the manufacture thereof, and of a drive-side factor that changes the optimum condition due to a different-type optical pickup and semiconductor laser constituting the drive and a change in the optimal condition due to the variation of assembling as encountered in the manufacture thereof. In actual, there exists a recording condition well suited for each combination as a composite factor.

For this reason, it is a traditional practice to use an approach to previously store, on the media side, ID information whose media type is identifiable from the drive side and, on the drive side, a recording condition previously prepared for each media type so that, when performing an actual recording, the ID information about the relevant media can be read out of the media loaded on the drive thereby using a recording condition (called a "write strategy") related to the ID information.

With the existing technique, recording conditions can be selected properly to a certain extent for a known media verified previously. However, for an unknown unverified media, there are cases not to be coped with under the recording condition prepared. Besides, there encounters a case that a media, even if known, is not compatible with under the prepared recording condition in the presence of a certain environmental change, e.g. change in recording rate, disturbance or aging.

There are known approaches described in JP-A-2003-30837, JP-A-2004-110995 and JP-A-2000-231727 that are intended to cope with such unknown medias.

JP-A-2003-30837 describes, in paragraph 0020, that " . . . detects a phase error of from the channel clock, on each record pattern. The record-compensation-parameter regulating section 12 optimizes the emission-waveform rule depending upon the result detected in the phase-error detecting section 11. . . . ", thus disclosing a technique to detect and compensate for a phase error through a comparison with the channel clock.

This document also describes, in paragraph 0024, that "then recorded is a test pattern for determining an emission-waveform rule. Then, reproduction is done from the area where recording the test pattern, to examine the previously-prepared relationship of the emission-waveform rule with a phase error amount. Namely, measurement is made as to a phase-error amount in each combination of a length of various marks and a length of various spaces immediately preceding those marks. From the phase-error amount thus measured, predicted is an emission-waveform rule on which the phase-error amount is zero, to determine a desired emission-waveform rule. . . . ", thus disclosing a technique that measures a phase-error amount on each combination of a mark and a space and predicts an emission-waveform rule on which the phase-error amount is zero (see FIGS. 8 and 12).

The technique described in JP-A-2003-30837 is an art effective in optimizing the strategy because of performing a correction based on a phase error in the record pattern.

However, the technique in JP-A-2003-30837 is to finely regulate the strategy previously stored in the drive similarly to the existing ones. For the media not adapted for the strategy previously stored, preferred recording quality is difficult to provide satisfactorily.

Meanwhile, JP-A-2004-110995 describes, in paragraph 0045, that " . . . integrally (continuously) produces a top pulse corresponding to a period 3T and a non-multi-pulse corresponding to a period 8T . . . " and, in paragraph 0046, that " . . . although the write pulse is regulated in its laser power in two stages, the optimal power is obtained at an optimal ratio of the laser power (top-pulse wave height) Ph to the laser power (non-multi-pulse wave height) Pm . . . ", thus suggesting the usefulness in optimizing the ratio Ph/Pm.

However, the technique in JP-A-2004-110995 is to temporarily establish the initial values of Ph and Pm depending upon the values stored in the drive or the media, and then determine the ratio Ph/Pm. This makes it difficult to satisfy a well recording quality to the media not adapted for the value temporarily established, similarly to JP-A-2003-30837.

JP-A-2000-231727 describes a technique that corrects for a phase error in the record pattern, similarly to JP-A-2003-30837. However, in case merely performing a phase correction, there is a possible case that, on a certain media, the modulation factor be excessively great for a long code. With a great modulation factor, the pit is increased in its width or depth. Where those are excessively great, signal quality deteriorates at the wobble or the land pre-pit (Lpp).

SUMMARY OF CERTAIN INVENTIVE ASPECTS

Therefore, it is an object certain inventive aspects to provide a technique that optimizes the recording condition in accordance with the compatibility of between a drive and a media, and particularly to provide a technique effective in improving the signal quality at the wobble or Lpp.

According to one inventive aspect, there is provided an optical-information recording apparatus adapted to establish a recording pulse defined with a top pulse, an intermediate pulse and a last pulse correspondingly to a plurality of types of codes and to illuminate laser light based on the established recording pulse thereby recording information to an optical recording media, the apparatus comprising: means for controlling a phase of a recording pit corresponding to the saturation code by regulating at least a condition of the top pulse in a recording pulse corresponding to a saturation code having a length a signal amplitude saturates; and means for controlling a width of the recording pit corresponding to the saturation code by regulating a condition of the intermediate pulse in the recording pulse corresponding to the saturation code.

By thus controlling the phase control by regulating the top pulse condition in the saturation code and the width by regulating the intermediate pulse condition, recording can be effected with quality for the signals of RF, Wobble and Lpp. Particularly, for the longest code, such as of 14T, the recording pit is ready to increase. In the case of a recording to a high-density disk, such a pit-width increase is responsible for a cross-talk caused to wobble or Lpp. Therefore, it is desired to regulate the intermediate pulse condition in the longest code.

Here, the saturation code means a code that the RF signal, obtained by reproducing a recording pit, saturates in amplitude. This includes a code longer than a spot diameter of reproducing light illuminated from a laser diode of the drive.

Meanwhile, the length and phase of a recording pit is desirably controlled by regulating the top pulse condition determining a front end of a recording pulse and the last pulse condition determining a rear end of the recording pulse. By thus controlling the pit length and width principally on separate control parameters, recording can be done with quality.

It is preferable that there are further included means for performing a test recording to the media by changing the intermediate pulse condition of the saturation code having a length the signal amplitude saturates, means for determining a tendency of modulation factor obtained as a result of the test recording, and means for determining the intermediate pulse condition of the saturation code depending upon the tendency of modulation factor.

By thus acquiring a tendency of a modulation factor against a change in the intermediate pulse, it is possible to establish a recording condition providing a suitable modulation factor. This allows for recording with higher quality.

It is preferable that there are further included means for determining a target modulation factor suited for the media, the intermediate pulse condition of the saturation code being determined with reference to the target modulation factor.

By thus employing, as an indicator, a target modulation factor suited for a recording media, recording can be done with quality even where there is a change in type of the recording media. The technique of establishing a target modulation factor can use a method to previously store, in the drive, indicators of target modulation factors respectively suited for medias on a type-by-type basis of the medias, a method to determine a target modulation factor suited for a recording media by a test recording, a method to confirming, by a test recording, a recording condition under which wobble or Lpp errors occur and determine the upper limit of modulation factor to be allowed for the media, or the like.

It is preferable that there are further included means for performing a test recording to the media by changing the intermediate pulse condition of the saturation code having a length the signal amplitude saturates, means for performing a test recording to the media by using a non-saturation code shorter than the saturation code, means for reproducing a result of the test recordings and detecting recording lengths of the saturation and non-saturation codes, and means for determining an intermediate pulse condition of the saturation code depending upon a change tendency of the recording length of the saturation code relative to the recording length of the non-saturation code.

By thus determining an intermediate pulse condition by utilizing a tendency in length change of a saturation code relative to a non-saturation code, the modulation balance can be optimized for the shorter and longer codes. Thus, recording can be done with higher quality.

According to a second aspect of the invention, there is provided an optical-information recording apparatus adapted to establish a recording pulses defined with a top pulse, an intermediate pulse and a last pulse correspondingly to a plurality of types of codes and to illuminate laser light based on the established recording pulse thereby recording information to an optical recording media, the apparatus comprising: means for placing the condition of the top pulse corresponding to a shortest code thereby performing a test recording; means for changing the intermediate pulse condition having a code longer than the shortest code thereby performing a test recording to the media; means for reproducing a result of the test recordings and detecting a recording length of the shortest code and a recording length of the code longer than the shortest code; and means for determining an intermediate pulse condition of the code longer than the shortest code depending upon a change tendency of the recording length of the code longer than the shortest code relative to the recording length of the shortest code.

By thus establishing a top pulse correspondingly to the shortest code high in occurrence frequency and utilizing a tendency in length change of the shortest code and longer code than that with reference to the shortest code thereby determine an intermediate pulse condition for the longer code, the modulation balance can be optimized for the longer code relative to the shorter code optimized. Thus, recording can be done with higher quality.

This structure is effective where the modulation factor is difficult to estimate based on the saturation code because of the increasing speed of test recording. For example, where the shortest code is in a length of 3T, the use of a non-saturation code having a length, say, of 4T or 5T makes it possible to estimate the modulation factor even in a high-speed test recording. Nevertheless, a saturation code may be set to the code longer than the shortest code.

It is preferable that there are further included means for changing a height of the intermediate pulse in the saturation code having a length the signal amplitude saturates and suspending the last pulse thereby performing a test recording to the media, and means for determining a ratio in height of the top pulse to the intermediate pulse of the saturation code depending upon a result of the test recording.

By thus conducting a test recording with a change in the intermediate pulse condition in a state the last pulse is rendered off, it is easy to look the tendency of modulation factor change. Thus, the recording condition can be established with higher accuracy.

It is preferable that the intermediate pulse, in the saturation code having a length the signal amplitude saturates, is configured by a plurality of narrow pulses, the apparatus further including means for changing a width of the narrow pulses and setting the narrow pulse and the last pulse at an equal width thereby performing a test recording to the media, and means for determining a width of the narrow pulse in the saturation code depending upon a result of the test recording.

By thus conducting a recording test with a change in the intermediate pulse condition in a state the narrow pulses constituting the intermediate pulse and the last pulse are made in an equal width, the tendency of modulation factor change is made easy to know. This allows for establishing a recording condition with higher accuracy. Note that the intermediate pulse is desirably configured by a comb-like pulse having a plurality of narrow pulses arranged at an equal interval.

According to a third aspect of the invention, there is provided am optical-information recording method adapted to establish a recording pulse defined with a top pulse, an intermediate pulse and a last pulse correspondingly to a plurality of types of codes and to illuminate laser light based on the established recording pulse thereby recording information to an optical recording media, the method comprising: a step of controlling a phase of a recording pit corresponding to the saturation code by regulating at least a condition of the top pulse in a recording pulse corresponding to a saturation code having a length a signal amplitude saturates; and a step of controlling a width of the recording pit corresponding to the saturation code by regulating a condition of the intermediate pulse in the recording pulse corresponding to the saturation code.

It is preferable that there are further included a step of performing a test recording to the media by changing the intermediate pulse condition of the saturation code having a length the signal amplitude saturates, a step of determining a tendency of modulation factor obtained as a result of the test recording, and a step of determining the intermediate pulse condition of the saturation code depending upon the tendency of modulation factor.

It is preferable that there are further included a step of performing a test recording to the media by changing the intermediate pulse condition of the saturation code having a length the signal amplitude saturates, a step of performing a test recording to the media by using a non-saturation code shorter than the saturation code, a step of reproducing a result of the test recordings and detecting recording lengths of the saturation and non-saturation codes, and a step of determining an intermediate pulse condition of the saturation code depending upon a change tendency of the recording length of the saturation code relative to the recording length of the non-saturation code.

According to a fourth aspect of the invention, there is provided an optical-information recording method adapted to establish a recording pulses defined with a top pulse, an intermediate pulse and a last pulse correspondingly to a plurality of types of codes and to illuminate laser light based on the established recording pulse thereby recording information to an optical recording media, the apparatus comprising: a step of placing the condition of the top pulse corresponding to a shortest code thereby performing a test recording; a step of changing the intermediate pulse condition having a code longer than the shortest code thereby performing a test recording to the media; a step of reproducing a result of the test recordings and detecting a recording length of the shortest code and a recording length of the code longer than the shortest code; and a step of determining an intermediate pulse condition of the code longer than the shortest code depending upon a change tendency of the recording length of the code longer than the shortest code relative to the recording length of the shortest code.

It is preferable that there are further included a step of changing a height of the intermediate pulse in the saturation code having a length the signal amplitude saturates and suspending the last pulse thereby performing a test recording to the media, and a step of determining a ratio in height of the top pulse to the intermediate pulse of the saturation code depending upon a result of the test recording.

It is preferable that the intermediate pulse, in the saturation code having a length the signal amplitude saturates, is configured by a plurality of narrow pulses, the apparatus further including a step of changing a width of the narrow pulses and making the narrow pulse and the last pulse in an equal width thereby performing a test recording to the media, and a step of determining a width of the narrow pulse in the saturation code depending upon a result of the test recording.

It is preferable that the signal processing signal processing circuit is incorporated in an optical-information recording apparatus that is to establish a recording pulse defined with a top pulse, an intermediate pulse and a last pulse correspondingly to a plurality of codes and to illuminate laser light based on the established recording pulses thereby recording information to an optical recording media.

Here, in certain inventive aspects, the recording pulse is desirably constituted with a top pulse and a succeeding pulse. The succeeding pulse is desirably constituted with an intermediate pulse and a last pulse. The top pulse is desirably established corresponding to the shortest pit the highest in occurrence frequency and difficult to record. For example, where there is a definition of a pit string of 3T-11T as in the CD-R or a definition of 3T-11T and 14T as in the DVD-R, the top pulse is desirably provided corresponding to a 3T pit.

Meanwhile, the succeeding pulse can take any of non-multi-pulse and multi-pulse forms. In the case of a non-multi-pulse, the recording pulse is desirably optimized based on the power ratio of top and succeeding pulses. In the case of a multi-pulse the succeeding pulse is desirably constituted with a plurality of divisional pulses so that the record pulse can be optimized by regulating the duty ratio of the divisional pulses.

The conditions on the top and succeeding pulses may be defined by combining any of pulse power, pulse width and duty ratio. Desirably, the recording pulse is optimized by regulating the ratio of the top and succeeding pulses.

Meanwhile, by determining the succeeding pulse condition after determining the top pulse condition, further stable recording quality may be provided. Namely, the technique adopted includes determining first the optimal condition for the top pulse thereby enabling to find out the optimal top pulse condition, followed by determining the succeeding pulse condition. On the contrary, in the technique first optimizing the ratio of top and succeeding pulses as described in JP-A-2004-110995, there are cases that no optimal solution is obtained which lowers the compatibility with an unknown media. Incidentally, the top and succeeding pulse conditions may be determined repeatedly several times in order to further improve the accuracy.

According to one inventive aspect, recording condition can be obtained nearly optimally even where the media is unknown to the drive. Particularly, a suitable recording condition can be obtained under which signal quality is improved at Wobble or Lpp.

BRIEF DESCRIPTION OF THE DRAWINGS

FIGS. 9A and 9B are concept figures showing an example that a decent-to-the-right pattern is obtained as a result of a recording quality examination executed at FIG. 3 step S120;

FIGS. 10A and 10B are concept figures showing an example that an ascent-to-the-right pattern is obtained as a result of a recording quality examination executed at FIG. 3 step S120;

FIG. 13 is a concept figure showing an example of a test-range determination to be executed at step S122 in the case an ascent-to-the-right pattern is obtained at the FIG. 3 step S120;

FIG. 14 is a figure showing an example to execute the FIG. 3 step S120 by using eight patterns;

FIGS. 22A and 22B are concept figures showing the manner of a histogram preparation shown in FIG. 19;

FIGS. 23A and 23B are concept figures showing the manner of a threshold determination shown in FIG. 19;

FIGS. 24A and 24B are concept figures showing an example of a threshold obtained by the technique shown in FIG. 23;

FIG. 26 is a concept figure showing a table configuration for particular pattern retrieval for use in detecting a pit-balance deviation;

FIG. 27 is a concept figure showing a detailed example to detect a length deviation amount by the absolute comparison of count results;

FIG. 30 is a concept figure showing an example of a correction for length deviation utilizing a linear fitting as to a single-pulse form;

FIG. 31 is a concept figure showing an example of a correction for length deviation utilizing a linear fitting as to a multi-pulse form;

FIGS. 38A and 38B are figures showing an example of a record pattern for detecting the amount of a pit deviation caused due to thermal interference;

FIGS. 39A and 39B are concept figures showing a table configuration for particular pattern retrieval for use in detecting a pit front and rear phase deviations;

FIGS. 46A and 46B are concept figures showing a table configuration for storing correction amounts Ttop and Tlast;

DETAILED DESCRIPTION OF CERTAIN ILLUSTRATIVE EMBODIMENTS

With reference to the accompanying drawings, description is now made in detail on an optical-information recording apparatus according to the present embodiment. Note that certain inventive aspects are not limited to the ensuing embodiments but can be modified in suitable ways.

FIGS. 1A and 1B are concept figures respectively illustrating a recording pulse configuration and a recording-condition determining overall flowchart, according to one embodiment. As shown in FIG. 1A, a recording pulse 10, in one embodiment, is configured with a top pulse 12 arranged at a top of the recording pulse and a succeeding pulse 14 provided following the top pulse.

Here, provided that a pit the shortest in length has a data length mT (see "DATA 1", in the figure) whose recording pulse has a data length m'T while a pit longer than the shortest pit has a data length nT (see "DATA 2", in the figure) whose recording pulse 10 has a length n'T, then the top pulse 12, equal in length to the shortest-pit recording pulse, has a length m'T and hence the succeeding pulse 14 has a length (n−m)T. This embodiment is assumed to take the values of m=3 and n=3-11 and 14. Incidentally, T is a unit time defined for the optical-disk system whose period is determined based on the clock signal.

The conditions for the recording pulse 10 are determined upon executing a flowchart in a series shown in FIG. 1B. The flowchart is executed due to a test recording in the state that an optical-information recording medium (hereinafter, referred to as a "media" or a "disk") is loaded on an optical-information recording apparatus (hereinafter, referred to as a "recording apparatus" or a "drive").

As shown in FIG. 1B, when determining the conditions for the recording pulse 10, a pulse condition for a length m'T is first determined (step S100). Then, m'T/(n−m)T is determined as a ratio of the pulse condition for a length m'T to the pulse condition for a length (n−m)T by use of the condition for a length m'T (step S200). Then, a pulse nT is structured based on the relevant ratio (step s300). Finally, by making a phase deviation correction, determined is a condition for a recording pulse having a length n'T is determined (step S400).

Figure 2:
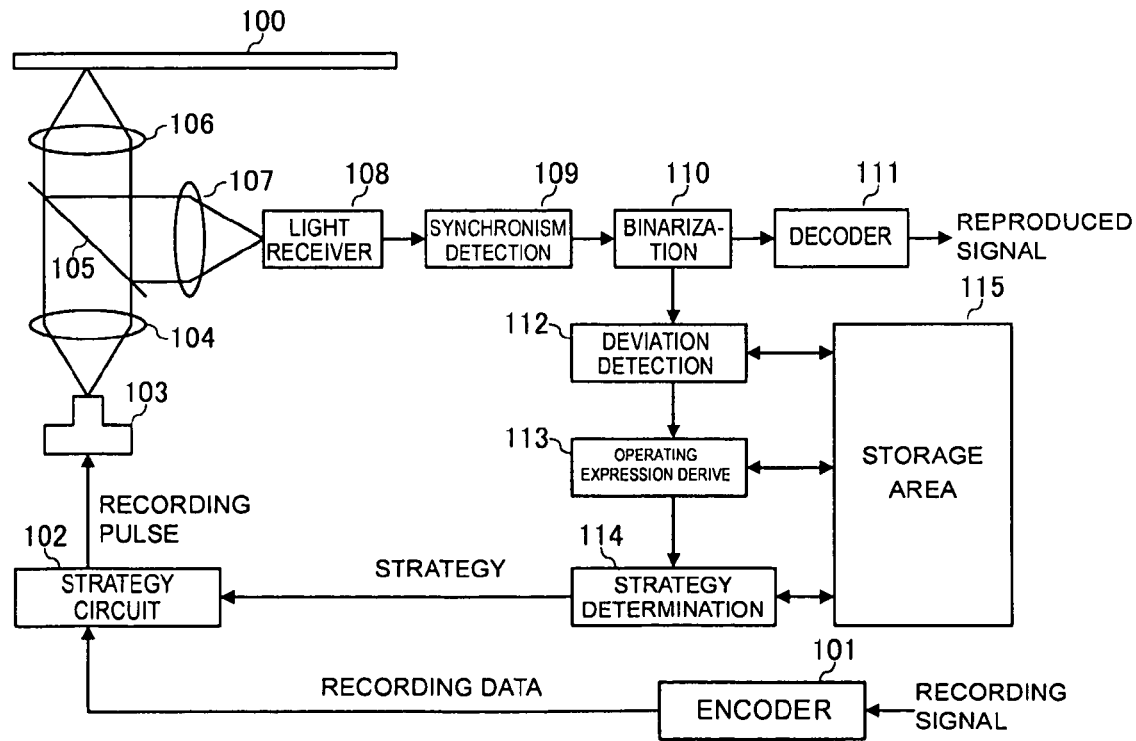
FIG. 2 is a block diagram showing an internal configuration of a drive according to one inventive aspect.

FIG. 2 shows a block diagram illustrating an internal arrangement of the drive according to one embodiment. The drive 100 is to record/reproduce information to/from a media 50 by use of the laser light outputted from a laser oscillator 103.

In the case of recording information to the media 50, an encoder 101 encodes a recording signal corresponding to a desired piece of recording information under the EFM scheme, and applies the encoded recording data to a strategy circuit 102.

In the strategy circuit 102, there are established various setting parameters for a predetermined strategy. The strategy circuit 102 is to correct the various setting parameters for a strategy, to control the intensity and pulse width of laser light outputted from the laser oscillator 103 and generate a recording pulse with which a desired recording condition is to be obtained.

The recording pulse, formed in the strategy circuit 102, is applied to the laser oscillator 103. The laser oscillator 103 takes control of output laser light correspondingly to the recording pulse. The laser light controlled is illuminated to the media 50 rotating at a constant linear or rotation speed through a lens 104, a half mirror 105 and a lens 106. This makes a recording, to the media 50, of a record pattern formed by the rows of pits and lands corresponding to desired recording data.

Meanwhile, when reproducing the information recorded on the media 50, the laser oscillator 103 illuminates uniform, reproducing laser light to the media 50 rotating at a constant linear or rotational speed through the lens 104, the half mirror 105 and the lens 106.

In this case, the reproducing laser light uses a weaker one than the laser light outputted from the laser oscillator 103 upon recording. The reflection light, of from the media 50 caused due to the reproducing laser light, is received by the light receiver 108 through the lens 106, the half-mirror 105 and the lens 107 and converted into an electric signal.

The electric signal, outputted from the light receiver 108, corresponds to a record pattern formed by the pits and lands recorded on the media 50. Based on the electric signal outputted from the light receiver 108, a clock signal with a predetermined period is generated from a wobble component contained in the electric signal in a synchronous-signal detecting circuit 109. Then, it is made binary in a binarization circuit 110 and decoded in a decoder 111, thus being outputted as a reproduced signal.

In the recording system thus structured with the drive and the media, its recording quality relies upon the characteristic deviations of the drive and media. Accordingly, the recording quality can be improved by absorbing the effect in the foregoing strategy. Note that the media can apply any of various optical-information recording mediums including dye medias as represented by CD-Rs and DVD-Rs and phase-change medias as represented by CD-RWs and DVD-RWs.

From now on, description is made in detail on the recording-pulse-condition determining flowchart, shown in FIG. 1B, which is to be executed by the drive.

Condition m'T Determination

Figure 1:
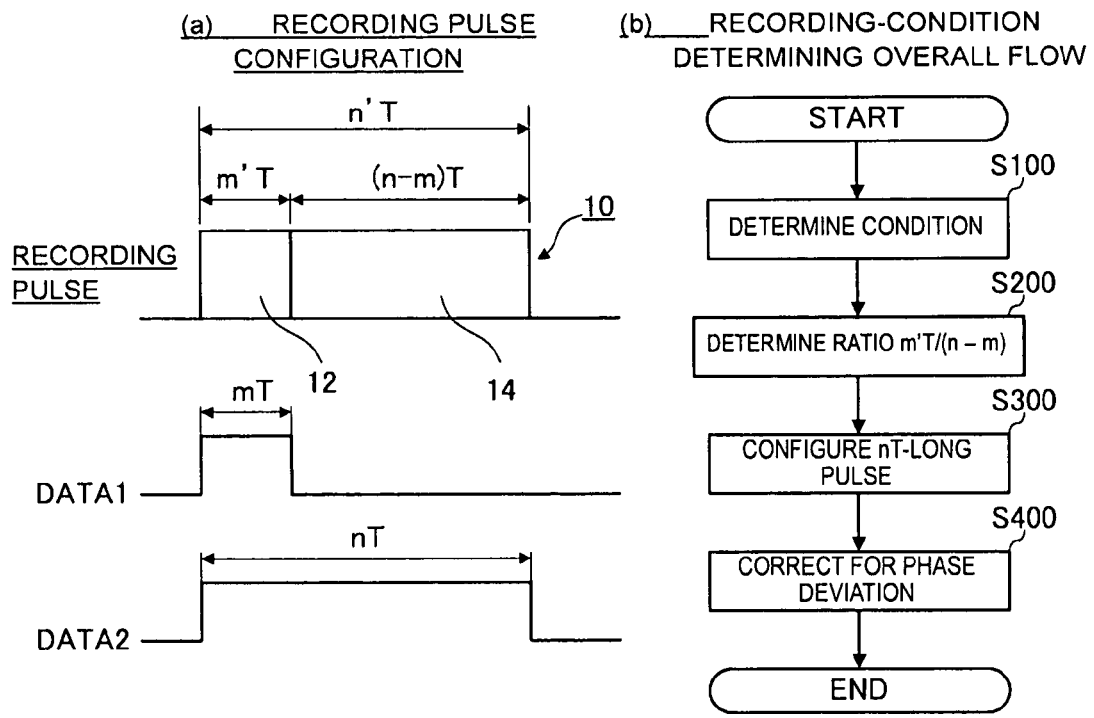
FIGS. 1A and 1B are concept figures showing a recording pulse configuration and an overall flowchart to determine a recording condition, according to one inventive aspect.
Figure 3:
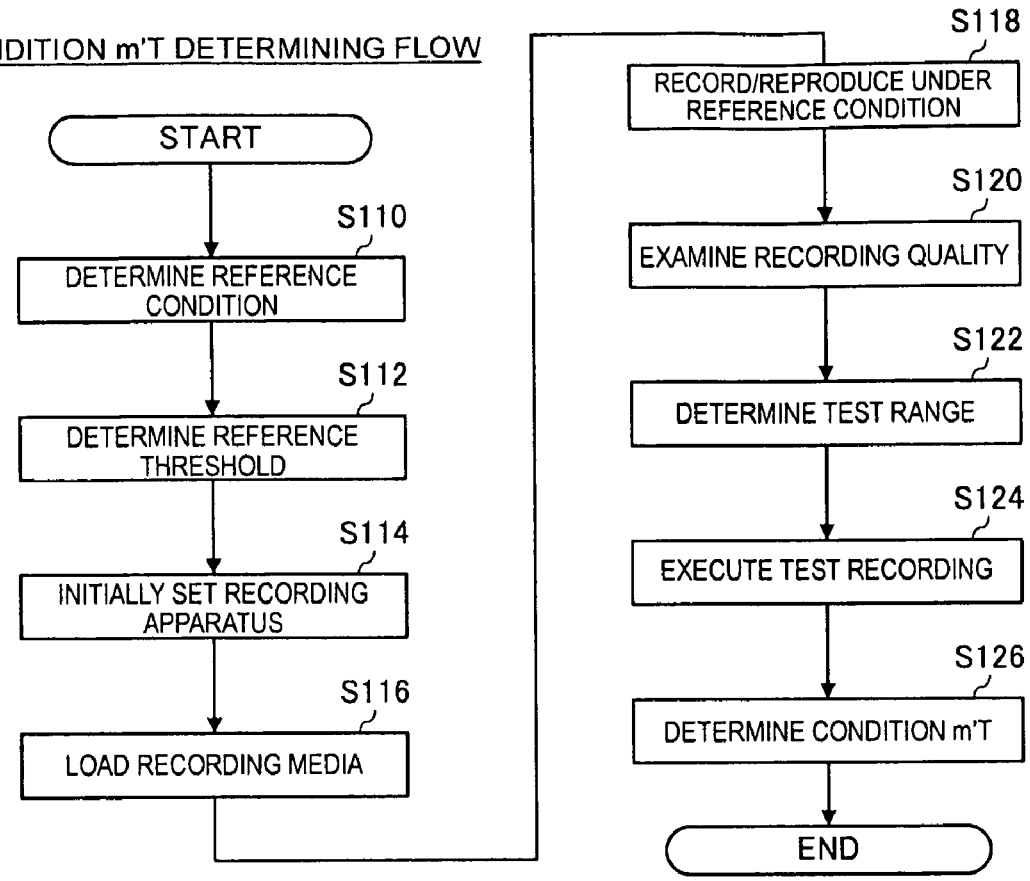
FIG. 3 is a flowchart showing a detailed execution procedure for an mT determining flowchart shown in FIG. 1.

FIG. 3 shows a flowchart illustrating a detailed execution procedure for the flowchart for determining m't as shown in FIG. 1. As shown in the figure, the drive 100 executes steps S110-S114 until making the initial setting to the drive. Then, it executes steps S116-S122 of before determining a test-recording condition. Thereafter, a step S124 is executed to perform a test recording under the condition determined. Based on the result, a step S126 is executed to determine the condition of a pulse mT. The steps are detailed in the following.

Reference Condition Determination

At step S110 shown in FIG. 3, test recording is performed by use of a desired standard media while changing the rate of recordation to thereby determine, as a reference condition, one pulse width and three power values. The three power values desirably use a value at which jitter has assumed a minimum as a result of the test recording and two values lying across that value. The greater and smaller two power values preferably use values in the neighborhood of a threshold serving as a reference for jitter suitability. The reference condition thus determined is to be used for the later record-quality examination.

Reference Threshold Determination

Because the embodiment is intended to establish a test-recording condition in a range of equal to or lower than the jitter threshold (hereinafter, referred to as a "test range") as referred later, there is a need to determine a threshold, i.e. a reference of determination. The threshold may be prepared by a standard value in accordance with the drive and media types. However, the threshold, indicative of a minimal line of a permissible area for jitter, is to vary depending upon the state of the optical parts and other elements structuring the optical pickup shown in FIG. 2. It also is to vary depending upon the rate of recording onto the media.

It is therefore recommended to correctly establish a test range by determining such a threshold on each combination of the drive and media in actual use and providing a correct reference for determination.

Nevertheless, establishing a threshold on each combination of the drive and media leads to a factor to increase the recording process. Accordingly, a threshold suited for the individual drive may be stored in a storage area 115 during the manufacture thereof on the assumption that the individual-drive-based variations are the major cause of threshold variations.

Figure 4:
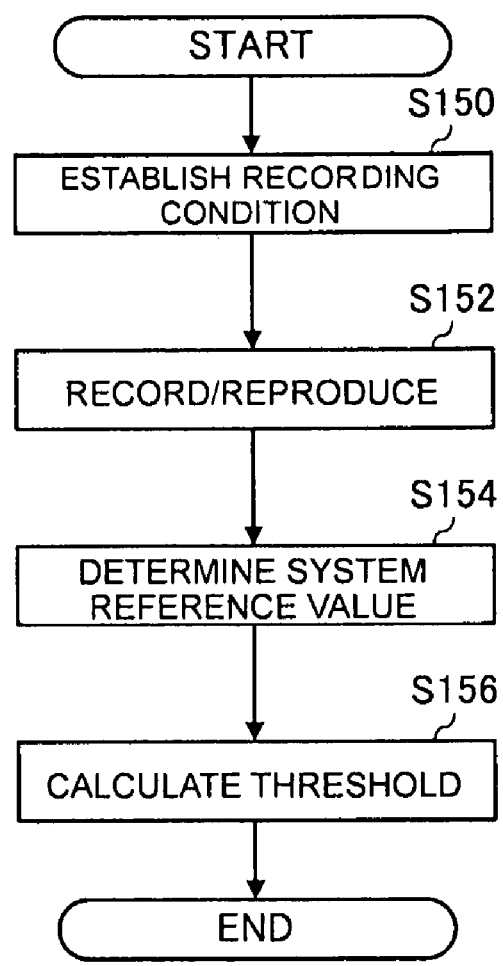
FIG. 4 is a flowchart showing the detail of a reference threshold determining step shown in FIG. 3.

FIG. 4 is a flowchart illustrating the detail of the reference-threshold determining step shown in FIG. 3. As shown in the figure, the reference threshold is determined by performing a recording/reproducing under a predetermined recording condition, determining a reference value for a system depending upon the result thereof, and using a value, secured a predetermined margin on the reference value, as a threshold for use in determining a test range. Those steps are explained in order.

At first, a step S150 is executed to establish a recording condition. This step includes preparing a predetermined pattern of condition required to record/reproduce, e.g. pulse width, power, recording/reproducing rate and recording address, setting the recording condition to the drive, and then loading a reference media onto the drive. The reference media is preferably selected a standard characteristic one out of various types of medias.

Then, step S152 is executed to perform a recording and reproducing to and from the loaded reference media under the recording condition established at the step S150, thereby obtaining a recording/reproduced characteristic value, e.g. of jitter, under the recording condition. The characteristic value acquired here is a value representative of recording quality.

Subsequently, step S154 is executed to determine the optimal value, e.g. a minimum value of jitter, from the recording/reproduced characteristic value acquired at the step S152 and taking it as a system reference value. This establishes, as a reference value, a jitter value considered nearly the optimal value for the drive. Incidentally, the reference value may be an intermediate value of between the two points of intersections with a predetermined threshold, i.e. an intermediate value of power margin, instead of the optimum value of jitter.

Finally, step S156 is executed to calculate, as a threshold, a value that a predetermined coefficient α (desirably α>1) is multiplied on the system reference value determined at the step S154. Due to this, determination is made in the form a predetermined margin is provided to the system reference value. Namely, calculating a threshold by use of a system reference value is done as threshold=system reference value×α wherein the coefficient α desirably uses a value of approximately 1.5. Note that the coefficient α may be set at a suitable value for the drive or media type wherein it may be set at a value close to the system reference value, e.g. α=0.8–1.2, or at a value somewhat great, e.g. α=2.0–3.0.

Figure 5:
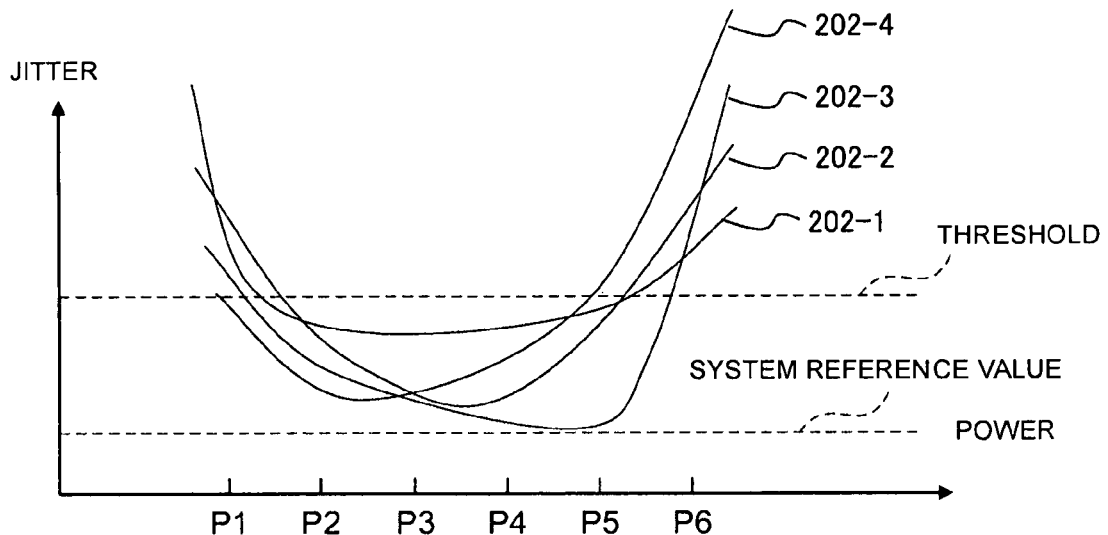
FIG. 5 is a concept figure showing an embodiment of the flowchart shown in FIG. 4.

FIG. 5 is a concept figure illustrating an embodiment of the flowchart shown in FIG. 4. In the illustrated example, reproduced characteristics 202-1-202-4 have been obtained by using a jitter value as a characteristic value indicative of recording quality and changing the power from P1 to P6 relative to the pulse widths W1-W4. In the illustrated example, a recording condition is provided by the pulse widths W1-W4 and power P1-P6 while a system reference value is provided by an extreme point of a reproduced characteristic 202-3 that the lowest jitter value has been obtained, wherein a value obtained by multiplying, say, 1.5 on the system reference value gives a threshold. Note that the arrows, given in the matrix of the figure, indicate the direction in which test condition is changed, which are used in the similar meaning in the ensuing description.

Figure 6:
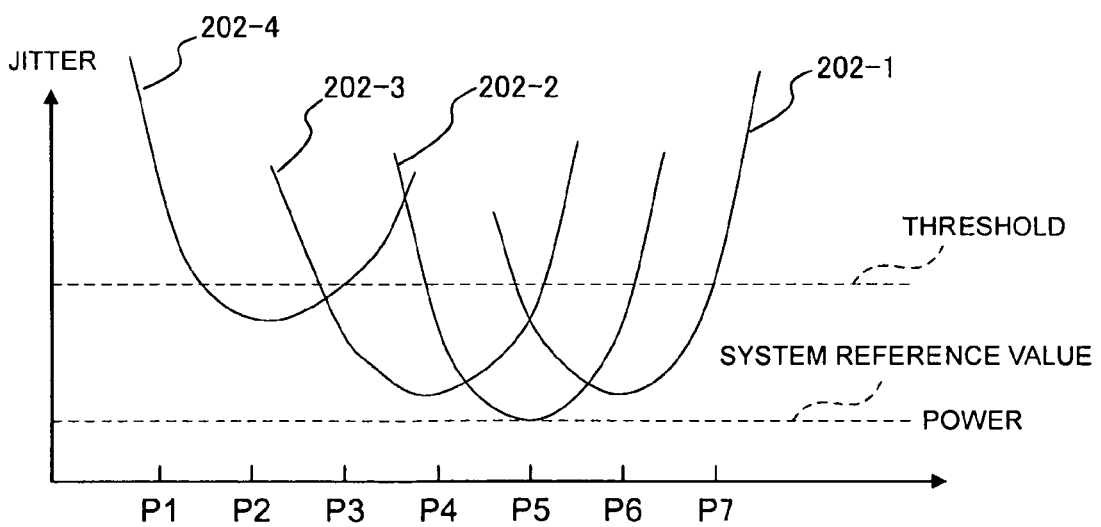
FIG. 6 is a concept figure showing an embodiment of the flowchart shown in FIG. 4.

FIG. 6 is a concept figure illustrating another embodiment of the flowchart shown in FIG. 4. In the illustrated example, reproduced characteristics 202-1-202-4 have been obtained by using a jitter value as a characteristic value indicative of recording quality and changing the range of power from P1 to P6 for each of the pulse widths W1-W4. In the illustrated example, the reproduced characteristic 202-2 that the lowest jitter value has been obtained has an extreme point providing a system reference value, wherein a value obtained by multiplying, say, 1.5 on the system reference value gives a threshold. In this manner, the threshold can be determined by changing the power condition on each of the pulse widths.

Figure 7:
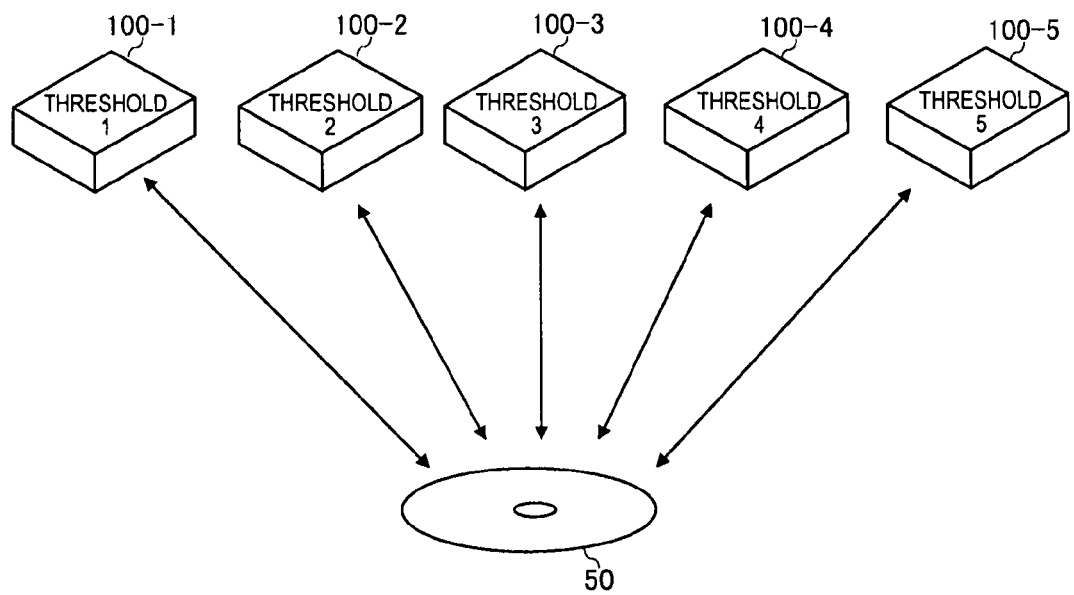
FIG. 7 is a concept figure showing an example to determine a threshold for each drive.

FIG. 7 is a concept figure illustrating an example to determine a threshold for each of the drives. Where a threshold is desirably established suited for the variations of between the individual drives, recording/reproducing is done to/from a reference media 50 that is common between drives 100-1-100-5, to store thresholds 1-5 unique to the respective drives.

Incidentally, where the threshold setting process is desirably simplified, an average may be taken over the thresholds 1-5 obtained by recording/reproducing a reference media common between several standard drives so that the average threshold can be applied as a threshold for other drive.

In this case, the drives used for determining the average threshold may be of the same design or in a similar design that is not perfectly the same in design. Meanwhile, the thresholds for the drives can use an average value taken over those. Furthermore, the average threshold once determined may be used generally as a threshold for the drive in the same or similar design to be manufactured in the later. Meanwhile, a plurality of drives varied may be prepared intentionally to determine an average value over those.

Recording Apparatus Initial Setting

Step S114 is executed to store the reference condition and reference threshold determined at the FIG. 3 steps S110 and S112 explained above, in the storage area 115 of the drive 100. This step is preferably done during the manufacture of the drive 100.

Recording Media Loading

Step S116 is executed to load a media 50, to which information is to be recorded, in the drive 100 completed of the step S114 initial setting.

Recordation/Reproduction Under Reference Condition

Using the condition established at the step S114, step S118 is executed to make a recording to the media 50 loaded at the step S116. Specifically, using the one pulse width and three power values defined as a reference condition, recording/reproducing is done trice to obtain jitter values of three points. Plotting the three-point jitter values, relatively to an axis of power, reveals the tendency of recording characteristic dependent upon the combination of a drive 100 and a media 50.

Recording Quality Examination

FIGS. 8A and 8B are concept figures illustrating examples that a valley pattern has been obtained as a result of a recording quality examination conducted at the FIG. 3 step S120. As shown in the figure, recording quality is examined by using the jitter value and threshold concerning the reference condition obtained in the steps mentioned so far. In the illustrated example, power values P1, P2 and P3 were used as a reference condition wherein the virtual lines, connected between the jitter values obtained at the respective power values, assume a valley pattern. Such a valley pattern, when obtained, means that the reference media used at the step S110 and the recording media loaded at the step S116 are equal in sensitivity and hence similar in recording characteristic.

Here, FIG. 8A is an example that a valley pattern has a minimum value equal to or smaller than the threshold while FIG. 8B an example that a valley pattern has a minimum value equal to or greater than the threshold. For both pattern cases, the reference media and the recording media can be considered equal in sensitivity. Where the reference media and the recording media have an equal sensitivity in this manner, the condition for use in test recording is established in a plane area of power×pulse width about a reference condition.

In FIGS. 8A and 8B, there is a difference in the differential amount of between the reproduced values respectively obtained at the recording points P1, P2 and P3 and the reproducing reference value, i.e. in the differential amount of between the jitter values and the jitter threshold in the illustrated example. In FIG. 8A, the reproduced values are closer to the reproducing reference value.

From this, it can be considered easy to find out the optimal condition in FIG. 8A rather than in FIG. 8B. Therefore, tests may be established in the less number of cycles where obtaining the FIG. 8A recording characteristic than those in the case where obtaining the FIG. 8B recording characteristic, thereby finding out a more preferred solution by the smaller number of tests cycles.

Namely, where the difference amount is smaller between the reproduced value and the reproducing reference value, the optimal condition lies closer to the reference condition, where the difference amount is greater between the reproduced value and the reproducing reference value, the optimal condition lies away from the reference condition. Accordingly, when desired to reduce the number of test cycles, it is desired to change the number of test cycles depending upon the difference amount of between the reproduced value and the reproducing reference value.

FIGS. 9A and 9B are concept figures illustrating examples that a descent-toward-right pattern is obtained as a result of a recording-quality examination executed at the FIG. 3 step S120. In the illustrated example, the pattern is provided in a descent-toward-right that jitter value decreases with an increase of power as P1, P2, P3. Such a descent-toward-right pattern, when obtained, means that the recording media is lower in sensitivity than the reference media.

Here, FIG. 9A is an example that the minimum value, in the descent-toward-right pattern, is equal to or smaller than the threshold while FIG. 9B is an example that the minimum value, in the descent-toward-right pattern, is equal to or greater than the threshold. For both pattern cases, the recording media can be considered lower in sensitivity than the reference media. Where the recording media is lower in sensitivity in this manner, the test range, defined as a plane area of power×pulse width about a reference condition, is shifted toward the side of higher power and wider pulse width, thereby conducting a test recording.

Meanwhile, where obtaining a descent-toward-right pattern as shown in the figure, it can be considered that the minimum value of jitter lies on the higher power side. Accordingly, recording characteristic may be confirmed again by performing an additional write at higher power than P3. In this case, the accuracy of recording quality examination can be improved though there is one increase in the number of recording cycles. Incidentally, where such a pattern is obtained, the number of test cycles may be changed depending upon the difference amount of between a reproduced value and reproducing reference value similarly to the case where obtained the foregoing valley pattern.

Figure 8:
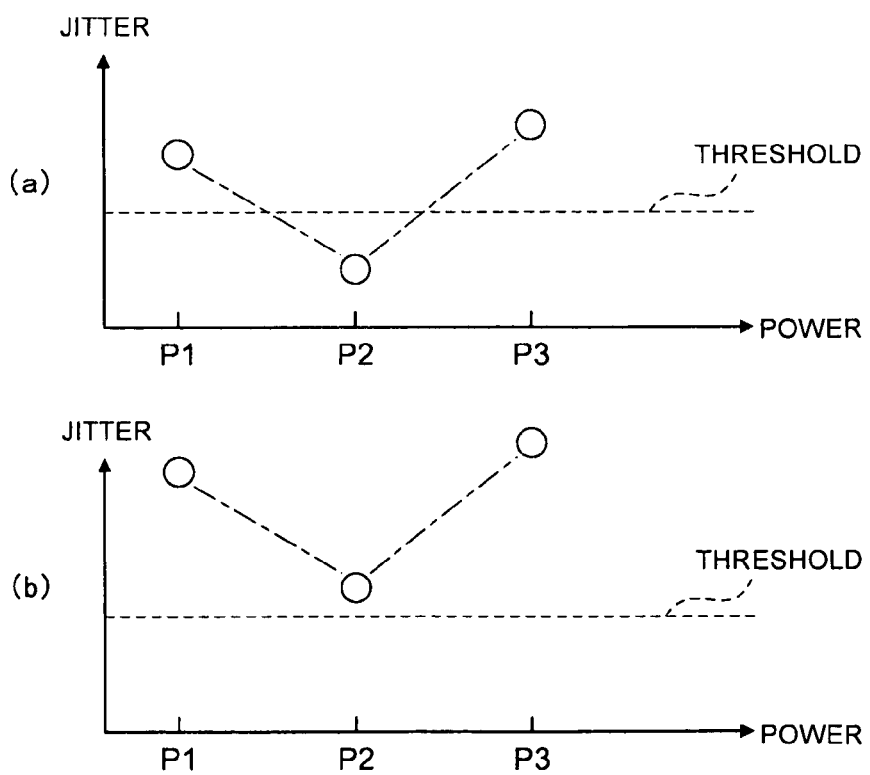
FIGS. 8A and 8B are concept figures showing an example that a valley pattern is obtained as a result of a recording quality examination executed at FIG. 3 step S120.

Meanwhile, where obtaining a descent-toward-right pattern as shown in the figure, the optimal value can be considered lying away from the reference condition than that for the case of the FIG. 8 valley pattern. It is desired to increase the number of test cycles greater than that for the case of a valley pattern.

FIGS. 10A and 10B are concept figures illustrating examples that an ascent-toward-right pattern is obtained as a result of a recording quality examination executed at the FIG. 3 step S120. In the illustrated example, the pattern is provided as an ascent-toward-right pattern that jitter value increases with an increase of power as P1, P2, P3. Such an ascent-toward-right pattern, when obtained, means that the recording media is higher in sensitivity than the reference media.

Here, FIG. 10A is an example that the minimum value, in the ascent-toward-right pattern, is equal to or smaller than the threshold while FIG. 10B is an example that the minimum value, in the ascent-toward-right pattern, is equal to or greater than the threshold. For both pattern cases, the recording media can be considered higher in sensitivity than the reference media. Where the recording media has a higher sensitivity in this manner, the test range, defined as a plane area of power×pulse width about a reference condition, is shifted toward the side of lower power and narrower pulse width, thereby conducting a test recording.

Meanwhile, where obtaining an ascent-toward-right pattern as shown in the figure, it can be considered that the minimum value of jitter lies on the lower power side. Accordingly, recording characteristic may be confirmed again by performing an additional write at lower power than P1. In this case, the accuracy of recording quality examination can be improved though there is one increase in the number of recording cycles. Incidentally, where such a pattern is obtained, the number of test cycles may be changed depending upon the difference amount of between a reproduced value and a reproducing reference value similarly to the case where obtained the foregoing valley pattern.

Meanwhile, where obtained an ascent-toward-right pattern as shown in the figure, the optimal value can be considered lying away from the reference condition than that for the case of the FIG. 8 valley pattern. It is desired to increase the number of test cycles greater than that for the case of a valley pattern.

Test Range Determination

Figure 11:
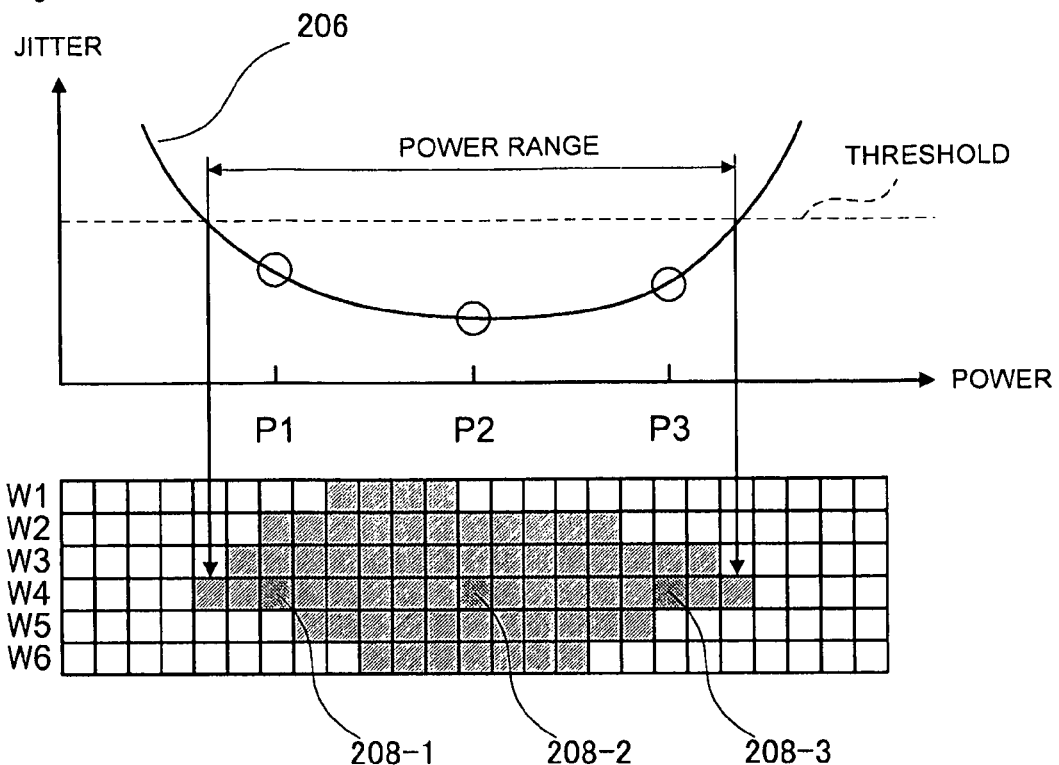
FIG. 11 is a concept figure showing an example of a test-range determination to be executed at step S122 in the case a valley pattern is obtained at the FIG. 3 step S120.

FIG. 11 is a concept figure illustrates an example of a test range determination to be executed at step S122 in the case a valley pattern is obtained at the FIG. 3 step S120. In the case that a valley pattern is obtained, the cross points of an approximate curve 206, depicted by the jitter values respectively obtained at P1, P2 and P3 and the threshold, are taken as a power variable range for use in a test recording, as shown in the figure. The variable range provides a power range. Note that, in the description, the range of power for actual use in a test recording is defined as a "power range" while the power range in which jitter is equal to or lower than the threshold is defined as a "power margin".

Here, the approximate curve 206 differs based upon the pulse width. Accordingly, provided that the pulse width used under the reference condition is taken W4, recording is made at power P1, P2 and P3 on each of the pulse widths W1-W6 lying about W4, to thereby confirm the cross points of between the resulting approximate curve 206 and the threshold. This provides a power range where below the threshold, for each of the pulse widths, as shown in the matrix image in the figure. The range shown by hatching in the figure provides a test range. The three power conditions for P1, P2 and P3 and the pulse width W4 that have been used as the reference condition, if shown in the matrix image, provide 208-1, 208-2 and 208-3 in the figure. Thus, the test range determined is established as a plane area of power×pulse width, lying about the reference condition.

By thus determining a power range on each of the pulse widths, tests can be conducted intensively in the range where below the threshold. This makes it possible to find out a suitable condition by a reduced number of test cycles.

Incidentally, the number of test cycles can be reduced also by setting the power-change step somewhat greater for a power margin taken broad and smaller for a power margin taken narrow. For example, when a margin can be taken 10 mW, tests are conducted five cycles at a 2-mW step on the assumption that the optimum value is obtainable by conducting tests roughly. When a margin is taken 1 mW, precise tests are determined necessary thus conducting tests ten cycles at a 0.1-mW step. Such a structure is also possible to implement.

Figure 12:
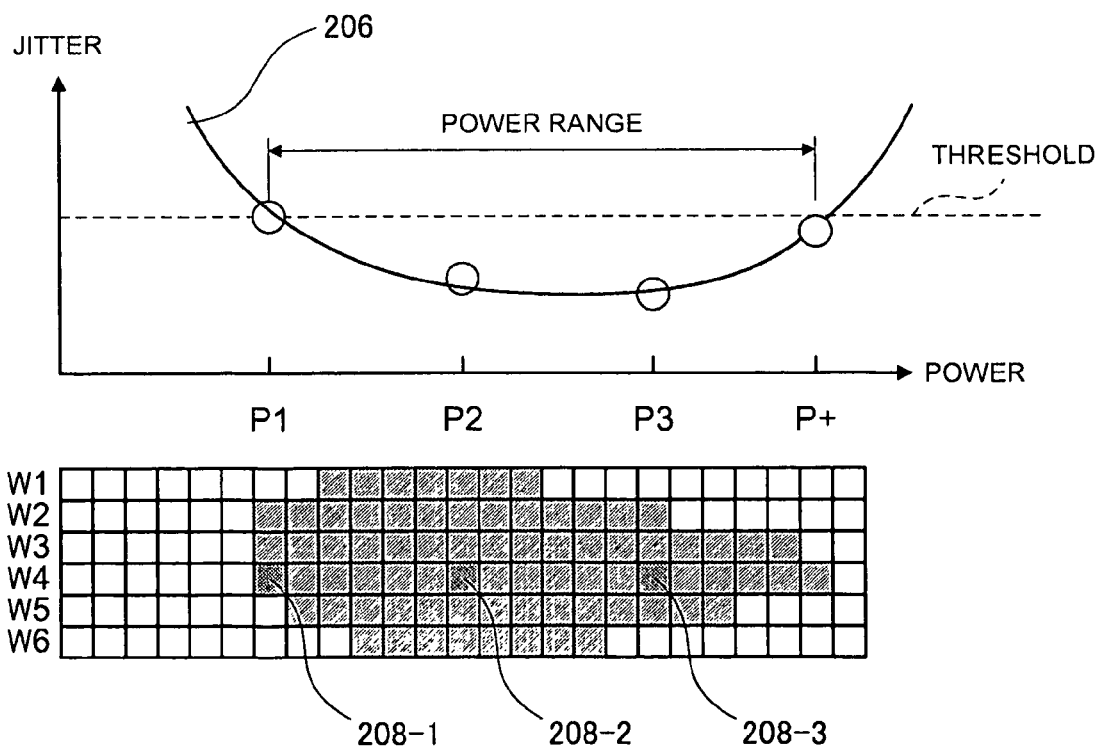
FIG. 12 is a concept figure showing an example of a test-range determination to be executed at step S122 in the case a descent-to-the-right pattern is obtained at the FIG. 3 step S120.

FIG. 12 is a concept figure illustrating an example of a test range determination to be executed at step S122 in the case a descent-toward-right pattern is obtained in the FIG. 3 step S120. In the case that a descent-toward-right pattern is obtained as shown in the figure, the optimal condition can be considered lying on the higher power side. Accordingly, additional recording is made at a power P+ higher than P3, to provide a power range defined by the cross points of an approximate curve 206, depicted by the jitter values respectively obtained at P1, P2, P3 and P+ and the threshold. This process is repeated on each of the pulse widths W1-W6, thus obtaining a test range as shown in a matrix image in the figure.

Here, the test range determined by the procedure is given in a pattern that the plane area of power×pulse width, lying about the reference conditions 208-1, 208-2 and 208-3, is shifted toward the higher power side. In this example, the values W1-W6 used for the valley pattern were used without change. However, because sensitivity is in a tendency toward lowering for a descent-toward-right pattern, the power range may be determined by a shift to a broader pulse-width than that of W1-W6.

FIG. 13 is a concept figure illustrating an example of a test range determination to be executed at step S122 in the case an ascent-toward-right pattern is obtained in the FIG. 3 step S120. In the case that an ascent-toward-right pattern is obtained as shown in the figure, the optimal condition can be considered lying on the lower power side. Accordingly, additional recording is made at a power P+ lower than P1, to provide a power range defined by the cross points of an approximate curve 206, depicted by the jitter values respectively obtained at P+, P1, P2 and P3 and the threshold. This process is repeated on each of the pulse widths W1-W6, thus obtaining a test range as shown in a matrix image in the figure.

Here, the test range determined by the procedure is given in a form that the plane area of power×pulse width, lying about the reference conditions 208-1, 208-2 and 208-3, is shifted toward the lower power side. In this example, the values W1-W6 used for the valley pattern were applied without change. However, because sensitivity is in a tendency toward the higher for an ascent-toward-right pattern, the power range may be determined by a shift toward the narrower pulse-width than that of W1-W6.

Namely, in the approach discussed, recording quality is examined on each of the pulse widths, to determine the number of test cycles on each pulse width depending upon the result thereof. It is expected to reduce the number of test cycles. The examination of recording quality explained is an exemplification with a patterning of jitter change through the recording under the reference condition. Desirably, it is recommended to use the eight patterns given in the following.

FIG. 14 is a figure illustrating an example to execute the FIG. 3 step S120 by use of eight patterns. As shown in the figure, pattern 1 is to be applied when the jitter maximum value is equal to or smaller than the threshold even if the relevant pattern is in any of a valley, an ascent-toward-right, a decent-toward-right or the like. When such a pattern is obtained, sensitivity is regarded nearly equal to that of the reference media and wherein it is determined that the margin where below the threshold can be taken broad, thus extending the power condition to both the lower and higher power sides. Namely, in pattern 1, because no values are taken approximate to the threshold, additional recording is made for both the lower and higher power sides.

Thereafter, the jitter characteristic obtained as a result of the additional recording is curve-fit to take, as a power-range reference value, the spacing between the greater-and-smaller two points of the fit-curve intersecting with the jitter threshold.

When the pattern is obtained, the pulse-width range of the reference value ±0.2 T is determined as a test range. In a test recording, the optimal recording condition is detected by a change at an interval of 0.2 T throughout the test range. Incidentally, T represents a unit-time length of the recording pit.

Here, provided that the pulse width providing a reference value is taken as pulse condition 1 and the two points extended are taken as pulse conditions 2 and 3, the pulse conditions 2 and 3 for pattern 1 are given by pulse widths extended by ±0.2 T. Due to the change to the pulse width conditions, somewhat change is made to the power range for use as a test condition.

Namely, for a change 0.1 T to the pulse width, the power-range reference value×(1−0.05×1) mW is provided as a power range for the relevant pulse width. For a change 0.2 T to the pulse width, the power-range reference value×(1−0.05×2) mW is provided as a power range for the relevant pulse width. For a change −0.1 T to the pulse width, the power-range reference value×(1−0.05×(−1)) mW is provided as a power range for the relevant pulse width.

Accordingly, the test conditions fallen under pattern 1 include the following three sets:
(1) pulse-width reference value, power-range reference value,
(2) pulse-width reference value −0.2 T, power-range reference value×(1−0.05×(−2)) mW, and
(3) pulse-width reference value +0.2 T, power-range reference value×(1−0.05×(+2)) mW.

Note that, in one embodiment, the reference condition given in (1) may not be used in the actual test recording.

Pattern 2 is to be applied for the case a valley pattern is obtained and the jitter minimum value is equal to or smaller than the threshold. When this pattern is obtained, the recording media is determined equal in sensitivity to the reference media. Accordingly, reference value ±0.1 T is selected as a pulse width condition. Thereafter, power range setting is performed on each of the pulse conditions according to the similar procedure to pattern 1. As a result, the test conditions fallen under pattern 2 include the following three sets:
(1) pulse-width reference value, power-range reference value,
(2) pulse-width reference value −0.1 T, power-range reference value×(1−0.05×(−1)) mW, and
(3) pulse-width reference value +0.1 T, power-range reference value×(1−0.05×(+1)) mW.

Pattern 3 is to be applied for the case a valley pattern is obtained and the jitter minimum value is above the threshold. When this pattern is obtained, the recording media is determined equal in sensitivity to the reference media and greatly different in media nature. Accordingly, reference value ±0.2 T is selected as a pulse width condition. Thereafter, power range setting is performed on each of the pulse conditions according to the similar procedure to pattern 1. As a result, the test conditions fallen under pattern 3 include the following three sets:
(1) pulse-width reference value, power-range reference value,
(2) pulse-width reference value −0.2 T, power-range reference value×(1−0.05×(−2)) mW, and
(3) pulse-width reference value +0.2 T, power-range reference value×(1−0.05×(+2)) mW.

Pattern 4 is to be applied for the case a descent-toward-right pattern is obtained and the jitter minimum value is equal to or smaller than the threshold. When this pattern is obtained, the recording media is determined somewhat lower in sensitivity than the reference media. Accordingly, three points, i.e. reference value, +0.1 T and +0.2 T, are selected as a pulse width condition. Thereafter, power range setting is performed on each of the pulse conditions according to the similar procedure to pattern 1. As a result, the test conditions fallen under pattern 4 include the following three sets:
(1) pulse-width reference value, power-range reference value,
(2) pulse-width reference value +0.1 T, power-range reference value×(1−0.05×(+1)) mW, and
(3) pulse-width reference value +0.2 T, power-range reference value×(1−0.05×(+2)) mW.

Pattern 5 is to be applied for the case a descent-toward-right pattern is obtained and the jitter minimum value is above the threshold. When this pattern is obtained, the recording media is determined significantly lower in sensitivity than the reference media. Accordingly, three points, i.e. reference value, +0.2 T and +0.4 T, are selected as a pulse width condition. Thereafter, power range setting is performed on each of the pulse conditions according to the similar procedure to pattern 1. As a result, the test conditions fallen under pattern 5 include the following three sets:
(1) pulse-width reference value, power-range reference value,
(2) pulse-width reference value +0.2 T, power-range reference value×(1−0.05×(+2)) mW, and
(3) pulse-width reference value +0.4 T, power-range reference value×(1−0.05×(+4)) mW.

Pattern 6 is to be applied for the case an ascent-toward-right pattern is obtained and the jitter minimum value is equal to or smaller than the threshold. When this pattern is obtained, the recording media is determined somewhat higher in sensitivity than the reference media. Accordingly, three points, i.e. reference value, −0.1 T and −0.2 T, are selected as a pulse width condition. Thereafter, power range setting is performed on each of the pulse conditions according to the similar procedure to pattern 1. As a result, the test conditions fallen under pattern 6 include the following three sets:
(1) pulse-width reference value, power-range reference value,
(2) pulse-width reference value −0.1 T, power-range reference value×(1−0.05×(−1)) mW, and
(3) pulse-width reference value −0.2 T, power-range reference value×(1−0.05×(−2)) mW.

Pattern 7 is to be applied for the case an ascent-toward-right pattern is obtained and the jitter minimum value is above the threshold. When this pattern is obtained, the recording media is determined significantly higher in sensitivity than the reference media. Accordingly, three points, i.e. reference value, −0.2 T and −0.4 T, are selected as a pulse width condition. Thereafter, power range setting is performed on each of the pulse conditions according to the similar procedure to pattern 1. As a result, the test conditions fallen under pattern 7 include the following three sets:
(1) pulse-width reference value, power-range reference value,
(2) pulse-width reference value −0.2 T, power-range reference value×(1−0.05×(−2)) mW, and
(3) pulse-width reference value −0.4 T, power-range reference value×(1−0.05×(−4)) mW.

Pattern 8 is to be applied for the case a ridge pattern is obtained and the jitter maximum value is above the threshold. When this pattern is obtained, determination is made as abnormal in pattern. Accordingly, reference value ±0.2 T is selected as a pulse width condition. Thereafter, power range setting is performed on each of the pulse conditions according to the similar procedure to pattern 1. As a result, the test conditions fallen under pattern 8 include the following three sets:
(1) pulse-width reference value, power-range reference value,
(2) pulse-width reference value −0.2 T, power-range reference value×(1−0.05×(−2)) mW, and
(3) pulse-width reference value +0.2 T, power-range reference value×(1−0.05×(+2)) mW.

Incidentally, in the case that detected is a pattern other than pattern 2 most resembled to the reference media out of the eight patterns explained, the recording result, a basis of the relevant pattern, may be again reproduced in order to confirm that it is not responsible for erroneous operation of reproducing, thereby again detecting a jitter. In this case, when a characteristic other than pattern 2 is detected by the re-reproducing, it is satisfactory to make an addition and extension of the recording condition according to the condition shown in FIG. 14.

Here, in the case that detected is pattern 8 as a result of confirming the erroneous operation of reproducing, it can be considered as an erroneous operation of recording. Accordingly, before performing an additional recording and pulse-width extension, recording is again made with a pulse-width reference value. In the case that pattern 8 results in spite of performing a reproduction of the re-recording result, the pulse condition is extended, i.e. pulse conditions 2 and 3 are extended instead of performing an additional recording, i.e. of making a power extension for margin measurement for pulse condition 1. It is satisfactory to perform a power extension in accordance with the extension to pulse conditions 2 and 3, by the foregoing technique.

Namely, for pattern 8, no margin can be taken under pulse condition 1 thus making it impossible to determine a power range as a reference of extension. Therefore, the initial power condition range is taken as a reference power range.

Test Range Determination: Power Range Determination by Approximation

By executing the foregoing procedure, determined is a test range effective for obtaining the optimal solution by the reduced number of test cycles. Description is now made on a power range determining technique that is vital for determining a test range.

In order to raise the accuracy of finding out the optimal solution by the possible reduced number of test cycles, one inventive aspect is to gather the test conditions intensively within a region where equal to or below the threshold as described before. If based on the way of thinking, the power range for use in a rest recording may be determined from greater and smaller, two power values indicative of a margin to the threshold. Here, the margin to the threshold, if in the relevant region, means a width to obtain a characteristic value equal to or smaller than the threshold while the power values of the greater-and-smaller two points mean the lower and higher power values determining the width of a margin.

Here, considering the reduction in test recording time for various medias and the efficient utilization of the test range for a media limited in test recording range as in a write-once-media, it is desired to provide recording points required in a test recording possibly smaller in the number. However, high accuracy is desired for the power range to be determined here because it is an important parameter providing a determination criterion for the optimal recording condition.

Accurate determination of the power range contributes to the reduced number of test cycles because it means the tests gathered intensively within a selected range. For example, where conducting a test recording at a frequency of once per 0.1 mW, test recording is done 10 cycles at a power range of 1 mW and 20 cycles at a power range of 2 mW. Reducing the power range contributes to the reduction in the number of test cycles.

For this reason, one embodiment notifies a fact that the record-reproduced signal in its recording quality is depicted a change in the form of a quadratic curve about the optimal point, as an extreme point, against a recording power, and hence proposes a technique that a margin amount to be determined is obtained by approximating a characteristic curve by use of several recording points. By applying such an approximation approach, a power range can be easily determined with accuracy based on several recording points, thus reducing the number of test cycles.

Figure 15:
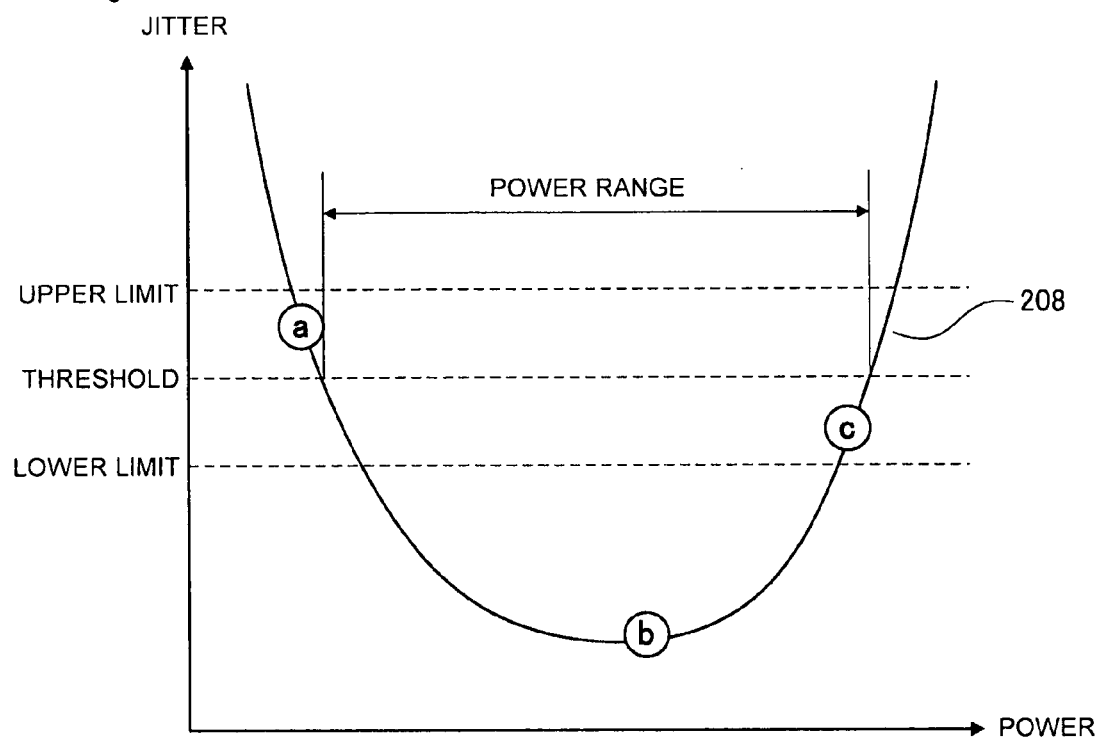
FIG. 15 is a concept figure explaining a method to determine, by curve fitting, a power range for use in the FIG. 3 step S122.

FIG. 15 is a concept figure explaining a method that determines a power range for use at FIG. 3 step S122 by curve fitting. Upon an approximation, first selected are two points, i.e. "a" on the lower power side and "c" on the higher power side, where jitter values as a recording-characteristic determination references lies approximate to the threshold, and "b" lying between those where the jitter value is smaller in value than any of those "a", "c" and the threshold, as shown in the figure. Namely, those "a", "b" and "c" selected have the following relationship:

a>b, c>b and threshold>b.

Here, "approximate to the threshold" in the foregoing is defined as a range of between the upper and lower limit values somewhat distant from the threshold as shown in the figure. Desirably, the upper limit value is established at 40% of the threshold while the lower limit value is at 5% of the threshold. Then, by approximating the values "a", "b" and "c" with a quadratic function, a power range is taken by a difference of the greater-and-smaller two points of the quadratic function intersecting with the threshold. Note that the range to be defined as "approximate to the threshold" can be changed by taking account of the spacing of between recording points and the like, e.g. −5%-+40% or −10%-30%.

Figure 16:
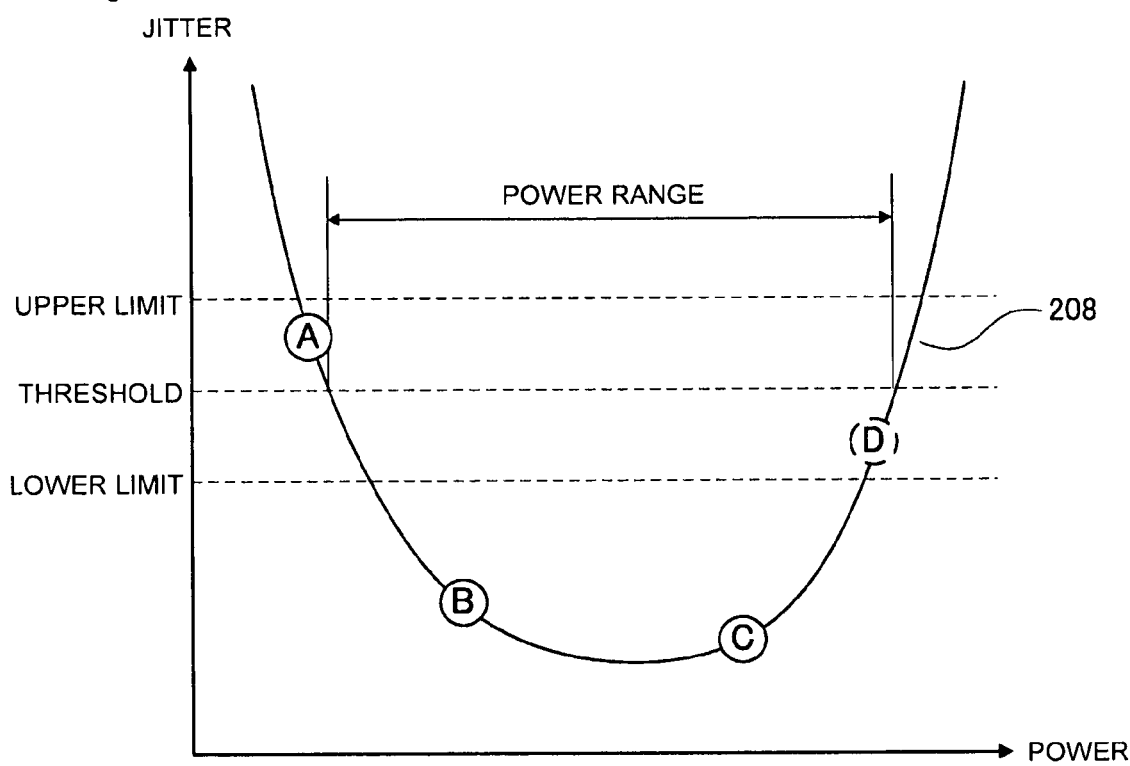
FIG. 16 is a concept figure explaining another method to determine, by curve fitting, a power range for use in the FIG. 3 step S122.

FIG. 16 is a concept figure explaining another method that determines a power range for use at FIG. 3 step S122 by curve fitting. Where the foregoing condition "a>b, c>b and threshold>b" is not satisfied by only the three conditions A, B and C, values approximate to the threshold are desirably obtained by adding D to the higher power side, as shown in the figure.

Furthermore, where there is a relationship B>C as shown in the figure, an approximate expression is desirably computed based on the three points A, C and D without using B.

In this case, because the recording three points and the threshold have a relationship "A>C, D>C and threshold>C" suited for depicting an approximate curve, an accurate approximate curve can be obtained by three-point approximation. Incidentally, the additional recording condition shown at D may be determined based on "A>B, B>C" represented by the pre-addition recording points and the threshold.

Where there is, on the lower power side, no value approximate to the threshold conversely to FIG. 15, addition may be made under the condition lower in power than A. In a certain relationship of between the recording points and the threshold, one point or more of recording conditions may be added properly.

Meanwhile, the power range for use under the added recording conditions may be given a constant change for a predetermined power step. Otherwise, the relation of a jitter variation against a power variation may be previously determined to establish a power condition from that relation.

Incidentally, where satisfactory recording points for determining a power range cannot be obtained despite adding the recording condition as in the above, a recording condition is again added in the similar procedure to the above thereby changing the recording point.

Meanwhile, in order to avoid from the restrictions to the test recording range as encountered in the write-once-media or from the spending of a huge test time, the upper limit may be provided to the number of additional cycles of re-recording conditions. Otherwise, the upper limit may be provided to the additional power in order to prevent the recording power from exceeding a laser output due to the addition of recording conditions.

Meanwhile, in the foregoing example, the power range was determined by three-point approximation. Alternatively, two points closes to the threshold may be selected to determine a power range from the difference in power value represented by the greater-and-smaller two points.

Besides, in the technique for selecting two points where approximate to the threshold, recording may be made by changing the power until finding out the greater-and-smaller two points across the threshold so that the two points most approximate to the threshold can be selected out of the recorded ones. Otherwise, the two points may be selected as they are. This technique is detailed in the following.

Test Range Determination: Sampling-Based Power Range Determination

Figure 17:
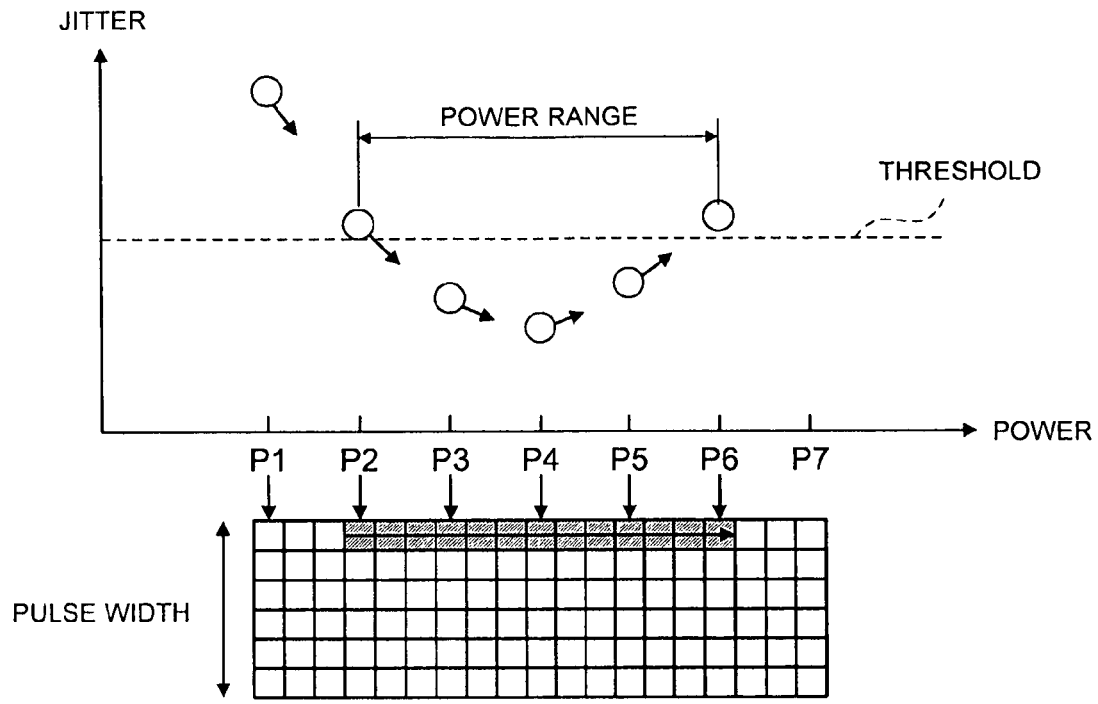
FIG. 17 is a concept figure explaining an example to determine, by sampling, a power range for use in the FIG. 3 step S122.

FIG. 17 is a concept figure explaining an example to determine, by sampling, a power range for use in the FIG. 3 step S122. In the illustrated example, power is changed gradually until obtaining the value most approximate to the threshold, to determine a power range based on the greater and smaller, two power values where approximate to the threshold.

Namely, as shown in the figure, recording power is increased in order of P1, P2, P3 . . . to thereby perform a recording/reproducing thus repeating the recording/reproducing up to the power value P6 where obtained the value equal to or greater than the threshold. If showing this process in a matrix form, power change is performed from P1 up to P6. However, the power range is taken at between lower-power P2 and higher-power P6 where most approximate to the threshold. In this manner, the power range can be also determined by selecting the two points across the threshold.

Here, in the technique for selecting the greater-and-smaller two points where approximate to the threshold, the following forms can be suitably selected and used:
1) selecting the greater-and-smaller two points constituting a power margin, i.e. selecting the two points most approximate to a reproducing reference value within the power range the reproducing reference value is satisfied,
2) selecting the two points most approximate to a reproducing reference though somewhat outside of the power margin, 3) selecting the greater-and-smaller two points across the reproducing reference value, on the lower power side,
4) selecting the greater-and-smaller two points across the reproducing reference value, on the higher power side, or
5) selecting the two points most approximate to the reproducing reference value, which two points are across the reproducing reference value, on the lower and higher power sides.

Besides, a recording characteristic may be approximated by use of the two points selected in the above technique, to thereby determine the greater-and-smaller two points where intersects with the reproducing reference value.

Ratio m'T/(n−m)T Determination

Figure 18:
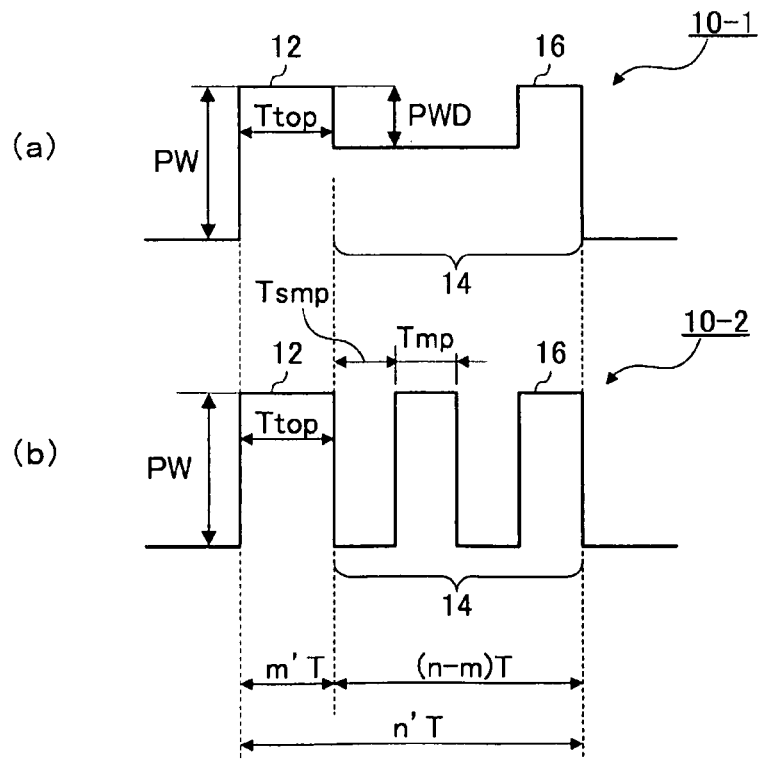
FIG. 18 is a concept figure showing an example of a for-test recording pulse for use in a ratio determination at FIG. 1B step S200.

FIG. 18 is a concept figure illustrating an example of a test recording pulse for use in the ratio determination at FIG. 1B step S200. FIG. 18A is an exemplification using a single pulse configured in a single-pulse pattern while FIG. 18B is an exemplification using a multi-pulse configured in a plurality-of-pulses pattern. As shown in the figure, a single pulse 10-1 and a multi-pulse 10-2 are each configured with a top pulse 12 arranged in the beginning of the recording pulse and the succeeding pulse 14 continuing from that. The succeeding pulse 14 has a last pulse 16 arranged at the rear end of the recording pulse.

Here, the total energy of the recording pulse is regulated by the height of the main power PW while the initial energy imparted to the recording-pit tip is regulated by the length of the top pulse width Ttop. The main power PW is desirably in the highest value among the recording pulses 10-1 and 10-2 while the top pulse width Ttop corresponds to the shortest recording pit having a length 3T. Because the shortest recording pulse is the highest in occurrence probability and hence heavily influential upon the recording quality, the optimal condition of power PW and width Ttop is established for the top pulse 12 by the condition m'T determining flowchart stated before.

Subsequently, the condition is determined for the succeeding pulse 14 by the ratio m'T/(n−m)T determining flowchart. For a single pulse 10-1, the condition for the succeeding pulse is to provide a power-reduced portion lower in power by PWD than the main power PW, as shown in FIG. 18A. By regulating the amount of the same, the recording pit is prevented from being formed in a teardrop form. Likewise, for a multi-pulse 10-2, regulated is the width Tmp of an intermediate pulse lying between the top pulse 12 and the end pulse 14 or the duty ratio of Tmp and Tsmp, thereby preventing the recording pit from being formed in a teardrop form, as shown in FIG. 18B. The succeeding pulse condition is determined based on the condition for the top pulse.

Figure 19:
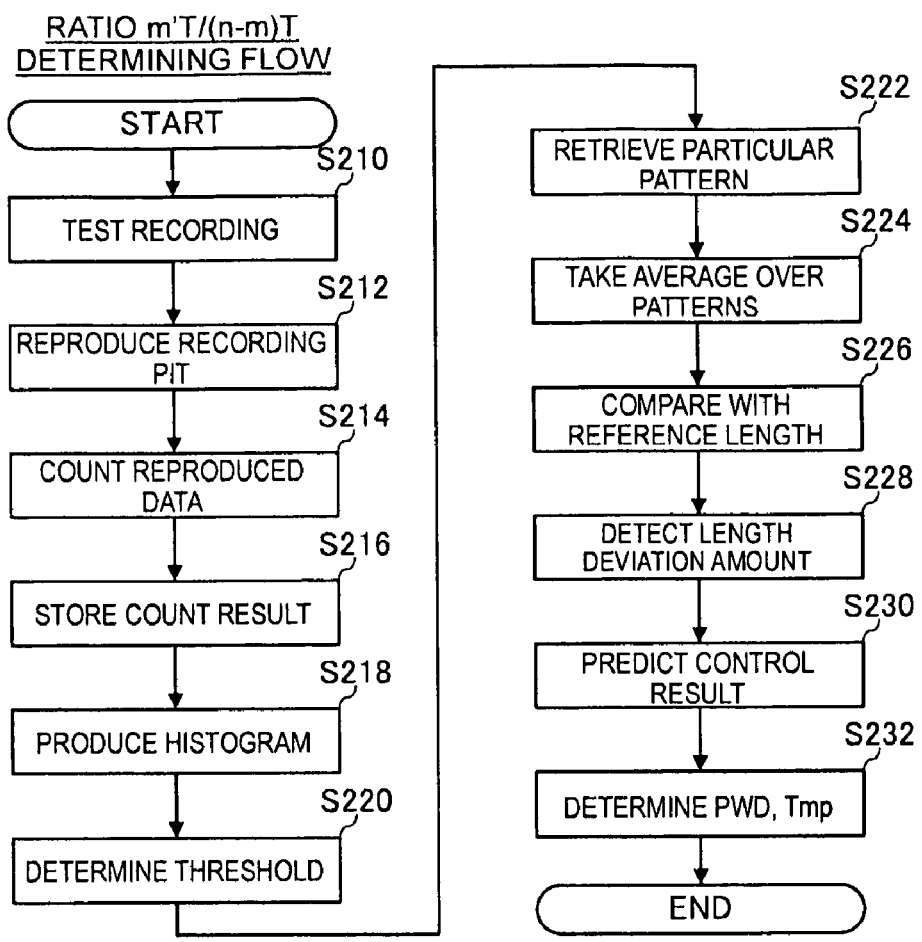
FIG. 19 is a flowchart showing an execution procedure for a ratio determining flowchart at the FIG. 1B step S200.

FIG. 19 is a flowchart illustrating an execution procedure for the ratio determining flowchart at FIG. 1B step S200. In order to setting up various parameters as to a recording strategy to be executed by the strategy circuit 102, the FIG. 2 drive first performs a test recording, to the media 50, based on a plurality of record patterns changed in condition (n−m)T (step S210). At this time, the condition for the mT pulse is fixed at a value obtained in the condition m'T determining flowchart.

Then, reproduction is performed of the record pattern formed by the test recording (step S212). The record-deviation detecting section 112 makes a counting on a reproduced binary signal thus obtained from the binarization circuit 110, by means of a counter synchronous with a predetermined clock (step S214). The pit and land lengths included in the reproduced binary signal are stored, as count data, in the storage area 115 (step S216).

Then, the record-deviation detecting section 112 produces a histogram representative of an occurrence frequency by use of the count data stored in the storage area 115 (step S218). From the histogram, determined is a count-result threshold providing a criterion for determining a pit length and land length (step S220).

Then, the record-deviation detecting section 112 retrieves a plurality of particular patterns including a particular pit/land pattern with reference to the threshold, out of the count data stored in storage area 115 (step S222). The count results, considered fallen under the equal pit length and included in the particular pattern, are averaged over. Furthermore, the count results, considered fallen under the equal land length, are averaged over thereby determining the average lengths respectively over the pits and lands constituting the particular pattern (step S224).

Then, the record-deviation detecting section 112 sets one of the plurality of particular extracted patterns into an extraction pattern and compares the length of a recording pit included in the extraction pattern with a reference length (step S226), thus detecting a pit-length deviation amount relative to the recording pulse (step S228).

Then, an operating-expression deriving section 113 derives an optimal-strategy-determining operating expression depending upon the deviation amount detected by the record-deviation detecting section 112. The strategy determining section 114 predicts a control result of various parameters by use of the operating expression derived by the operating-expression deriving section 113 (step S230). Based on the prediction result, PWD or Tmp shown in FIG. 18 are determined and set to the strategy circuit 102 (step S232).

Figures 20, 21:
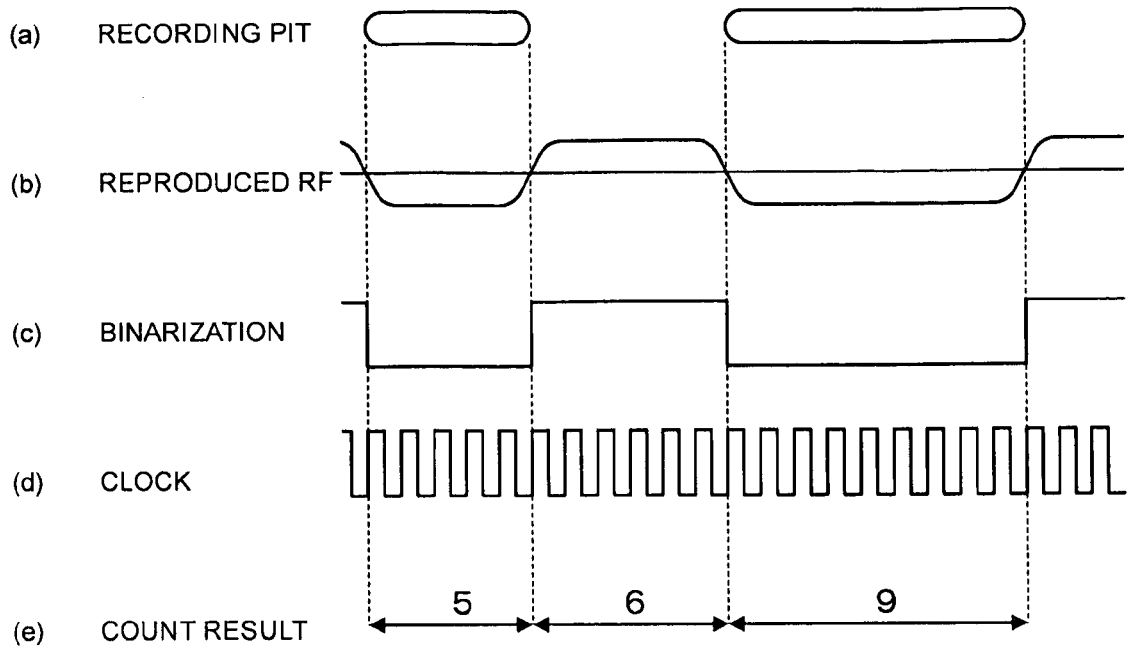
FIG. 20 is a concept figure showing an operation concept of from test recording up to reproduced data counting shown in FIG. 19.
FIG. 21 is a concept figure showing the manner of a count result storage shown in FIG. 19.

FIG. 20 is a concept figure illustrating an operation concept of from a test recording to a reproduced-data counting shown in FIG. 19. As shown in the figure, when test recording is first made, a recording pit shown in FIG. 20A is formed on the optical disk. In case the recording pit is reproduced, a reproduced RF signal is obtained corresponding to the recording pit, as shown in FIG. 20B. In case the reproduced RF signal is made binary, a reproduced binary signal is obtained as shown in FIG. 20C. By counting the pulse length of the binary signal, at between polarity inversions, by means of a clock signal as shown in FIG. 20D, a count result is obtained as shown in FIG. 20E.

FIG. 21 is a concept figure illustrating the manner of storage of the FIG. 19 count result. As shown in the figure, the binary signal counted by the clock signal is stored, together with pit/land distinctions, chronologically in a table provided in the storage area 115 and segmentarily at polarity inversions thereof. The table shown in the figure is stored in a state that addresses are attached for a later retrieval.

FIGS. 22A and 22B are concept figures illustrating the manner of FIG. 19 histogram production. As shown in the figure, the count-value occurrence frequency, if represented graphically, provides a histogram. By preparing histograms separately for the pits and the lands, two types can be obtained, i.e. a pit histogram representative of a pit-count tendency shown in FIG. 22A and a land histogram representative of a land-count tendency shown in FIG. 22B. In this manner, because a unit length nT (n=3, 4, 5, . . . 14) is naturally determined for a reference clock on the optical disk, a ridge of occurrence-frequency distribution is obtained on each unit length nT.

FIGS. 23A and 23B are concept figures illustrating the manner of FIG. 19 threshold determination. As shown in the figure, the valleys formed between the ridges of the histogram can be used as a threshold for determining a unit length nT. For this reason, established are a pit-length threshold as a reference for determining a pit length and a land-length threshold as a reference for determining a land length, respectively, for the pit histogram and the land histogram.

FIGS. 24A and 24B are concept figures illustrating an example of the thresholds obtained by the FIG. 23 technique. Pit-length thresholds are defined respectively at pit-length boundaries as shown in FIG. 24A while land-length thresholds are defined respectively at land-length boundaries as shown in FIG. 24B. In the FIG. 24A example, the threshold at the boundary of 2T and 3T is given as "count value=2". The threshold at the boundary of 3T and 4T are given as "count value=9". Subsequently, setting is made up to the boundary of 14T and 15T. Meanwhile, in the FIG. 24B example, the threshold at the boundary of 2T and 3T is given as "count value=2". The threshold at the boundary of 3T and 4T are given as "count value=10". Subsequently, setting is made up to the boundary of 14T and 15T.

Description is now made on the detail of the process steps shown in FIG. 19 of from particular pattern retrieval (step S222) to deviation-amount detection (step S228). These steps are executed on the various-deviation-detecting principle, in the record-deviation detecting section 112.

Figures 24, 25:
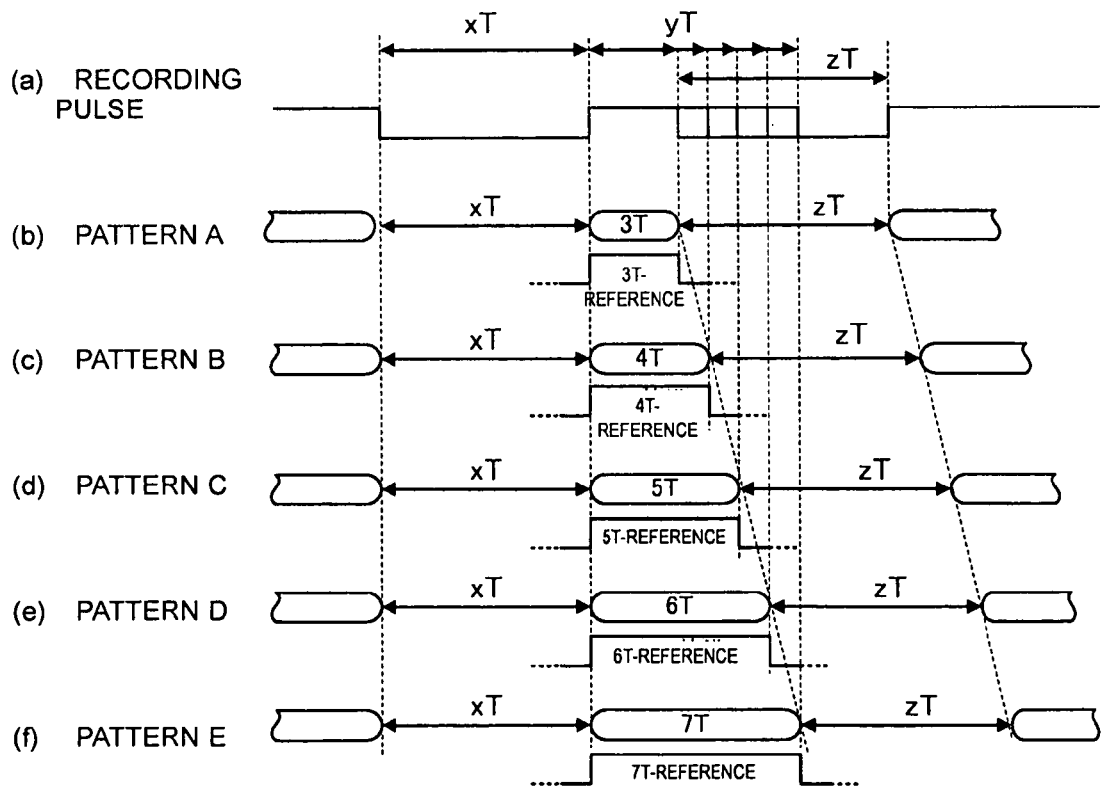
FIG. 25 is a figure showing an example of a record pattern for detecting a deviation amount by a pit balance.

FIG. 25 shows a figure illustrating an example of record patterns for detecting a deviation amount by a pit balance. Here, pit balance refers to a balance of between the top and succeeding pulses. As shown in the figure, when detecting a deviation amount by a pit balance, test recording is performed by using a recording pulse shown in FIG. 25A. The recording pulse includes a pattern having a continuing land LxT, pit PyT and land LzT wherein the lands LxT, LzT are fixed in their lengths while the pit PyT is varied in its pit length as 3T, 4T, . . . 7T as shown in FIGS. 25B to 25F. Not that the variable land is varied in length up to 14T though not shown.

Here, in case measuring the length of the variable-length pit PyT of the record pattern, the variable-length pit PyT would have a length corresponding to the respective ideal pit lengths under the ideal recording condition.

However, in case the variable-length pit PyT has a length deviated from the ideal regulation length, then the amount of deviation of the variable-length pit PyT from the regulation length corresponds to the length deviation amounts of the respective pits P3T, P4T, . . . P14T of 3T, 4T, . . . 14T relative to the recording pulse in the strategy during recording because the lands LxT, LzT are fixed in their lengths.

Therefore, it is possible to detect a length deviation amount of the pit by conducting a test recording with using a certain strategy, comparing a recording result of a variable-length pit PyT with a reference length of the pit as shown in FIGS. 25B-25F from a test-recording reproduced pattern based on the recording pulse, and detecting a deviation amount of from an ideal length of the pit.

FIG. 26 is a concept figure illustrating a table configuration for retrieving a particular pattern for use in pit-balance deviation detection. In the case of detecting a pit-balance deviation, the data stored in the FIG. 2 storage area 115 is retrieved with reference to a threshold range as to the land LxT, pit PyT and land Lzt established for each of the particular patterns (corresponding to step S222 in FIG. 19), to extract a data string satisfying the threshold.

Then, the count result is classified as land LxT, pit PyT and land LzT, to determine averages respectively over the land LxT, pit PyT and land LzT (corresponding to step S224 in FIG. 19). Using the average of the count result, a front phase-deviation amount is obtained on each pit length by conducting a pattern comparison shown in FIG. 25.

FIG. 27 is a concept figure illustrating a concrete example to detect a length deviation amount by absolutely comparing the count result. As shown in the figure, where detecting a deviation amount by a comparison with the ideal reference length, a particular pattern shown in (a) of FIG. 27 is extracted, by retrieval, out of the data group stored in the storage area, to compare between the count values of the both at their comparing portions as shown in (b) and (c) of the figure. In the illustrated example, a pit having a length 3T is a portion to be compared. A difference is determined of between "9" shown in (c) of the figure, i.e. a particular-pattern count result, and "8" shown in (d) of the figure, a count result corresponding to the reference length. The difference "1" thus obtained provides a deviation amount on the pit having a length 3T.

Figure 28:
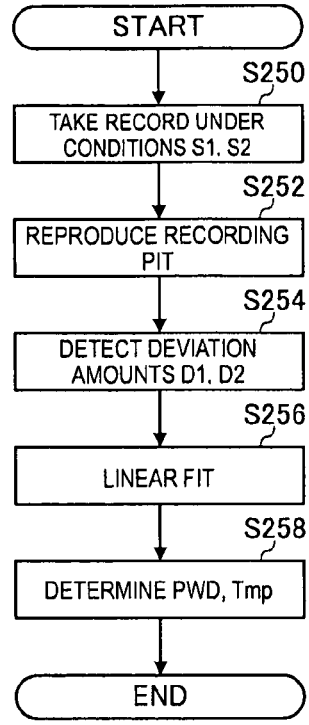
FIG. 28 is a flowchart showing an execution example of a control-amount prediction shown in FIG. 19.

FIG. 28 is a flowchart illustrating an execution example of FIG. 19 control-amount prediction. As shown in the figure, control-amount prediction is conducted by executing a series of steps, as follows. Namely, test recording is conducted under two or more conditions S1, S2 different in recording conditions (step S250). The resulting record pit is reproduced (step S252). By comparing the resulting reproduced pattern, determined are a deviation amount D1 corresponding to the condition S1 and a deviation amount D2 corresponding to the condition S2 (step S254), to thereby making a linear fitting of the relationship of between the S1 and S2 as well as D1 and D2 (step S256). Using the relevant linear line, an optimal correction amount is determined (step S258).

In the meanwhile, the deviation amounts D1 and D2 detected as above vary depending upon the various setting parameters for a strategy. As a result of analysis, it has been revealed that the deviation amounts D1 and D2, varying depending upon the various setting parameters for a strategy, are to change nearly in a linear form.

Namely, the deviation amounts in the respective test recordings, detected in the recording-deviation detecting section 112, can be grasped as a linear change approximated based on the least-squares method.

For this reason, in the drive according to the embodiment, when conducted test recordings twice for example, the optimal strategy can be determined by noticing the linear relationship of between the setting parameters for the strategy and the deviation amounts D1 and D2 detected. Nevertheless, in one embodiment, curve fitting may be applied in place of linear fitting.

Namely, typical parameters are provided by PWD for a single pulse and Tmp for a multi-pulse that vary under the recording conditions S1 and S2. Those parameters are changed with S1, S2, whose effects are detected as D1, D2. Using the four points, linear fitting is made to obtain a correction amount capable of canceling the deviation by use of the linear line.

Figure 29:
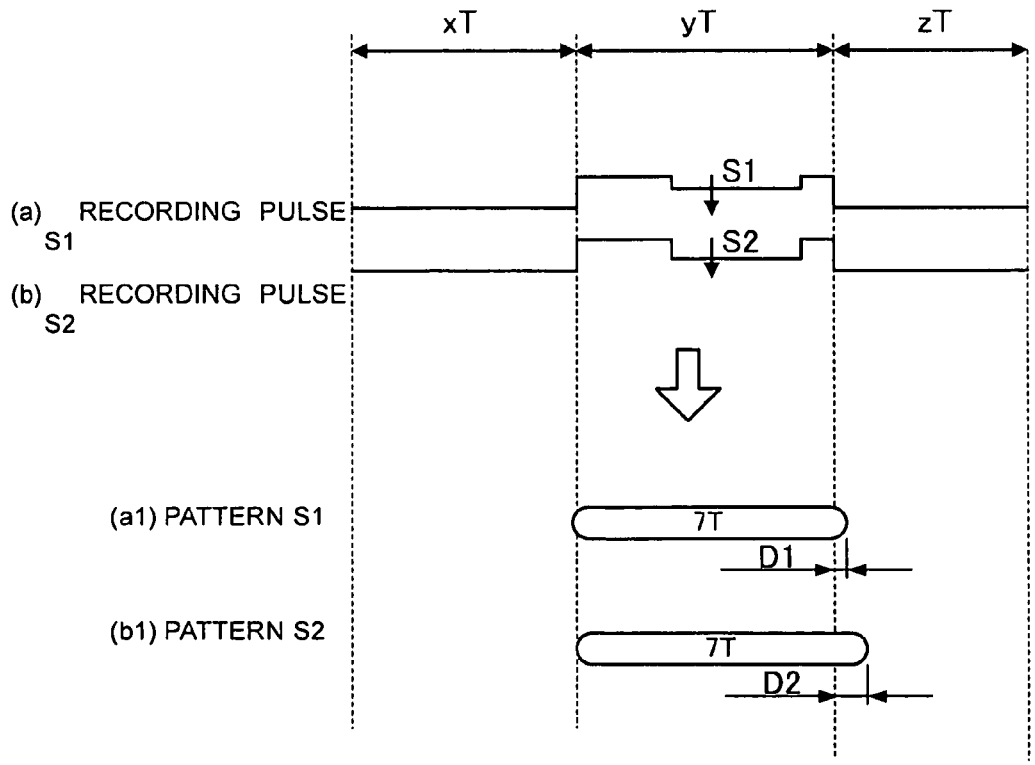
FIG. 29 is a concept figure showing a relationship of between a recording condition S1, S2 and a deviation amount D1, D2 when changing PWD.

FIG. 29 is a concept figure illustrating a relationship between a change of recording condition S1, S2 and a deviation amount D1, D2 in the case PWD is changed. Here, the recording pulse shown in (a) of the figure is a recording pulse S1 wherein PWD is changed by S1 while the recording pulse shown in (b) of the figure is a recording pulse S2 wherein PWD is changed by S2. Using the two conditions, test recording is performed.

As a result, a pattern S1, shown in (a1) in the figure, is obtained corresponding to the figure-(a) recording pulse while a pattern S2, shown in (b1) in the figure, is obtained corresponding to the figure-(b) recording pulse. Here, in the pattern S1, a deviation is caused in an amount D1 corresponding to the control amount S1 while, in the pattern S2, a deviation is caused in an amount D2 corresponding to the control amount S2.

By knowing the deviation amounts D1, D2 for the control amounts S1, S2, it can be predicted in what amount a deviation is caused by providing in what control amount to which one of the parameters. For this reason, by utilizing the relationship of those, control amount is predicted and correction amount is determined.

FIG. 30 is a concept figure illustrating an example of correction for length deviation by utilizing a linear fitting as to a single-pulse form. When determining a correction amount PWD for length deviation, test recording is conducted by use of a waveform recessed by PWD in a center, as shown in (b) of the figure, of a pulse having a reference waveform nT as shown in (a) of the figure. As a result, a length deviation Δ is detected in the reproduced signal obtained, as shown in (c) of the figure.

In the illustrated example, the PWD is changed in two ways, i.e. S1=+0.3 and S2=+0.1, to obtain the resulting length deviations Δ as deviation amounts D1=+0.1 and D2=−0.1. By using those S1, S2, D1 and D2 thus obtained, the control result A is linearly fit against a control amount PWD as shown in (e) of the figure. By utilizing the linear line, a correction amount PWD=+0.2 capable of canceling a length deviation is determined as an optimal correction value. In this case, the top-pulse condition is kept fixed without a change.

In this manner, linear or curve fitting is available for a relationship of between a strategy change S1, S2 and a deviation amount change D1, D2 if determining at least two change points. By using the linear line, it is possible to determine an optimal correction amount at which the deviation amount is zero.

Specifically, the recording pulse is optimally corrected by determining a deviation amount D for a several-point change of the strategy S, substituting a relationship between the strategy S and the deviation amount D to a general expression "D=a×S+b", determining constants a, b by resolving the simultaneous equations, determining finally a strategy S corresponding to the ideal deviation amount D, and setting the relevant strategy S to the FIG. 1 strategy circuit 102.

For example, it is assumed that the FIG. 2 record-deviation detecting section 112 detected a deviation amount D1 from a reproduced pattern in a test recording using a certain strategy S1 and a deviation amount D2 from a reproduced pattern in a test recording using another strategy S2.

$$D1=a\times S1+b$$

$$D2=a\times S2+b$$

From the above, "a" and "b" are calculated to determine the following function that uses "a" and "b" thus calculated:

$$S=(D-b)/a.$$

The optimal strategy S can be determined by substituting, in the function, an output deviation amount D for improving the recording quality, e.g. for correcting for the initial output deviation, etc. caused, say, in an equalizer.

FIG. 31 is a concept figure illustrating an example of correction for length deviation by utilizing a linear fitting as to a multi-pulse form. When determining a correction amount Tmp for length deviation, test recording is conducted by use of a waveform having an intermediate pulse length Tmp, as shown in (b) of the figure, of a pulse having a reference waveform nT as shown in (a) of the figure. Detected is a length deviation Δ in the reproduced signal obtained, as shown in (c) of the figure. In this case, the top pulse condition is kept fixed without a change.

In the illustrated example, Tmp is changed in two ways, i.e. S1=+0.3 and S2=+0.1, to obtain the resulting length deviations Δ as deviation amounts D1=+0.1 and D2=−0.1. By using those S1, S2, D1 and D2 thus obtained, the control result Δ is linearly fit against a control amount Tmp as shown in (e) of figure. By utilizing the linear line, a correction amount Tmp=+0.2 capable of canceling a length deviation is determined as an optimal correction value.

Figures 32, 33:
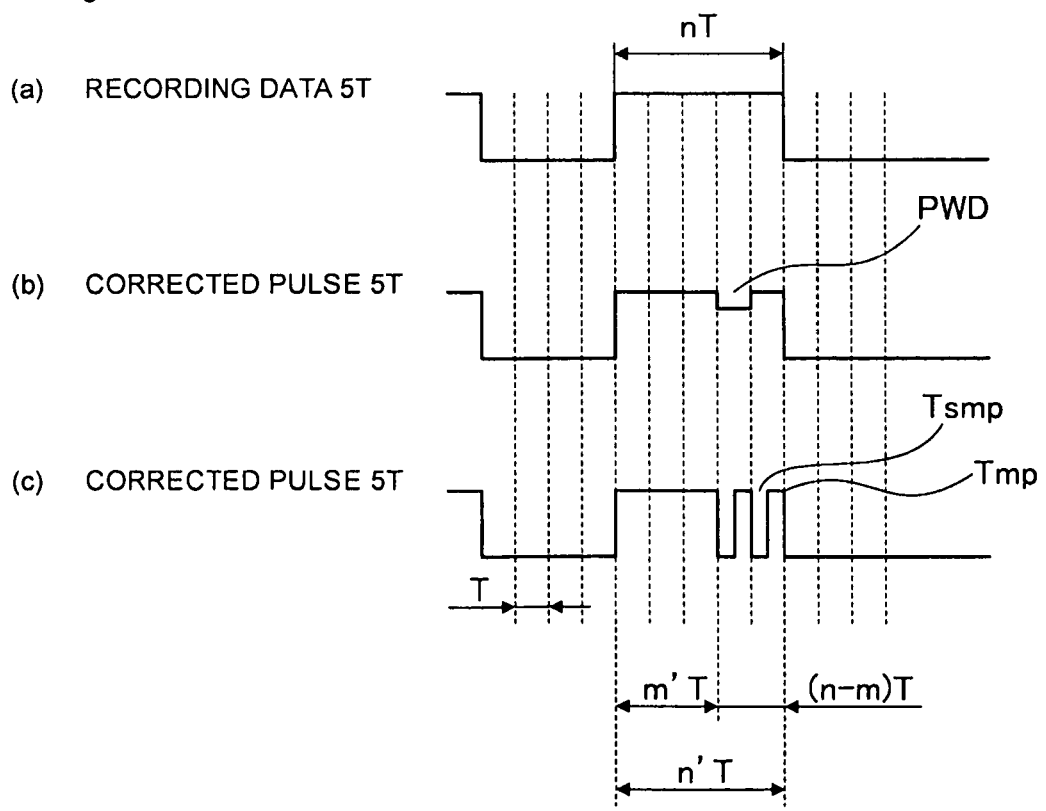
FIG. 32 is a concept figure showing a table configuration for storing correction amounts PWD and Tmp.
FIG. 33 is a concept figure showing a configuration concept of an nT pulse to be executed at FIG. 1 step S300.

FIG. 32 is a concept figure illustrating a table configuration storing correction amounts PWD and Tmp. As shown in the figure, the correction amounts PWD and Tmp are each defined based on each pit length to be corrected. For example, in the case the pit to be corrected has a length 3T, the correction amount PWD is stored in an area indicated "PW3" in the figure while the correction amount Tmp having a length 3T is stored in an area indicated "Tm3" in the figure. Subsequently, for 4T, 5T, ... 14T, storage is done similarly to 3T.

FIG. 33 is a concept figure illustrating a configuration concept of an nT-long pulse to be used at FIG. 1 step S300. As shown in (a) of the figure, the recording data for forming, say, a 5T-long pit, is to be outputted as a pulse signal in a length nT having a length corresponding to five periods of the clock signal. The pulse corrected on the recording data is outputted as a pulse signal beginning with a top pulse m'T and having a length n'T as shown in (b) and (c) of the figure. In a single-pulse case, PWD is defined within an (n−m)T-long pulse while, in a multi-pulse case, Tmp is defined within a (n−m) T-long pulse.

In this case, PWD and Tmp are each have a value conforming to the optimal ratio m'T/(n−m)T with reference to the condition of the mT-long pulse because of the value determined by fixing the top pulse condition. As a result, the nT-long pulse constituted by the top and succeeding pulses is provided as a value desirable for improving the recording quality. Nevertheless, because phase condition is not yet defined at this time, the optimal strategy is obtainable by further executing the flowchart for determining a phase condition, referred later.

Correction for Phase Deviation

Figure 34:
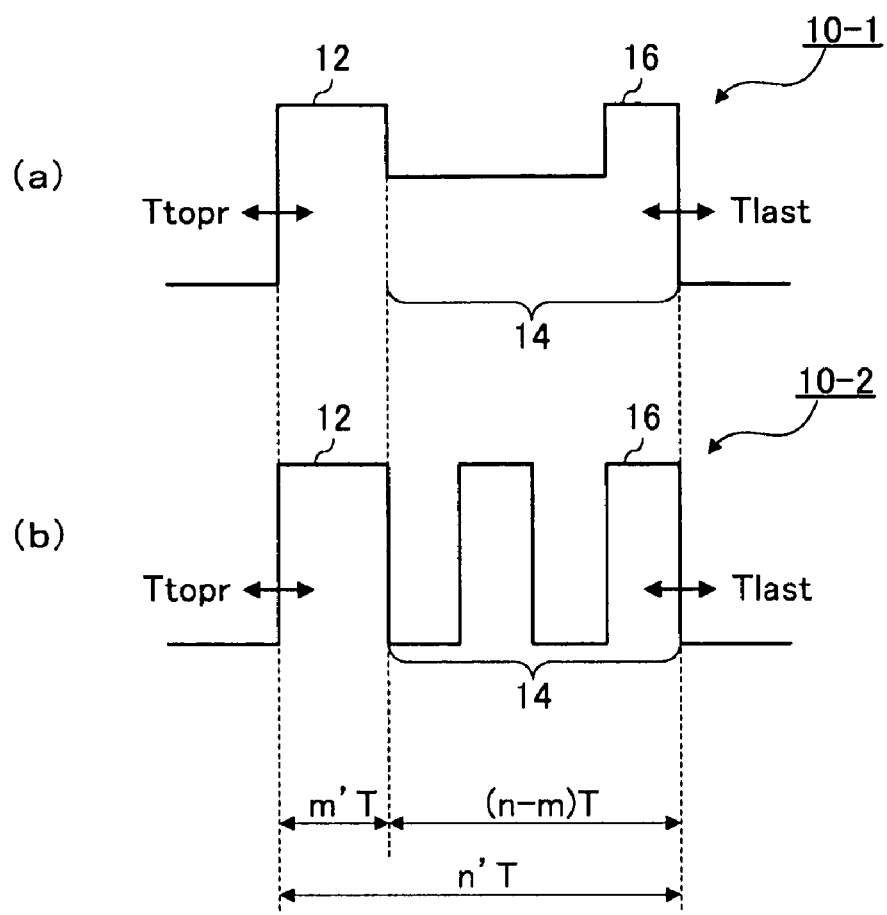
FIG. 34 is a concept figure showing an example of a for-test recording pulse for use in a phase deviation correction at FIG. 1B step S400.

FIG. 34 is a concept figure illustrating an example of a for-test recording pulse for use in the phase-deviation correction at FIG. 1B step S400. In (a) of FIG. 34, there is shown an example of a single-pulse configured by a single-pulse pattern while, in (b) of FIG. 34, there is shown an example of a multi-pulse configured by a multi-pulse pattern.

As shown in the figure, in both cases of a single pulse 10-1 and a multi-pulse 10-2, as a recording-pulse phase condition are established Ttopr for regulating a start point of the top pulse 12 as well as Tlast for regulating an end point of the last pulse 16. By regulating these values, the pit length after recording is optimized furthermore. Note that the phase conditions are determined by conducting a test recording under the conditions of top and succeeding pulses determined in the flowchart described so far.

Figure 35:
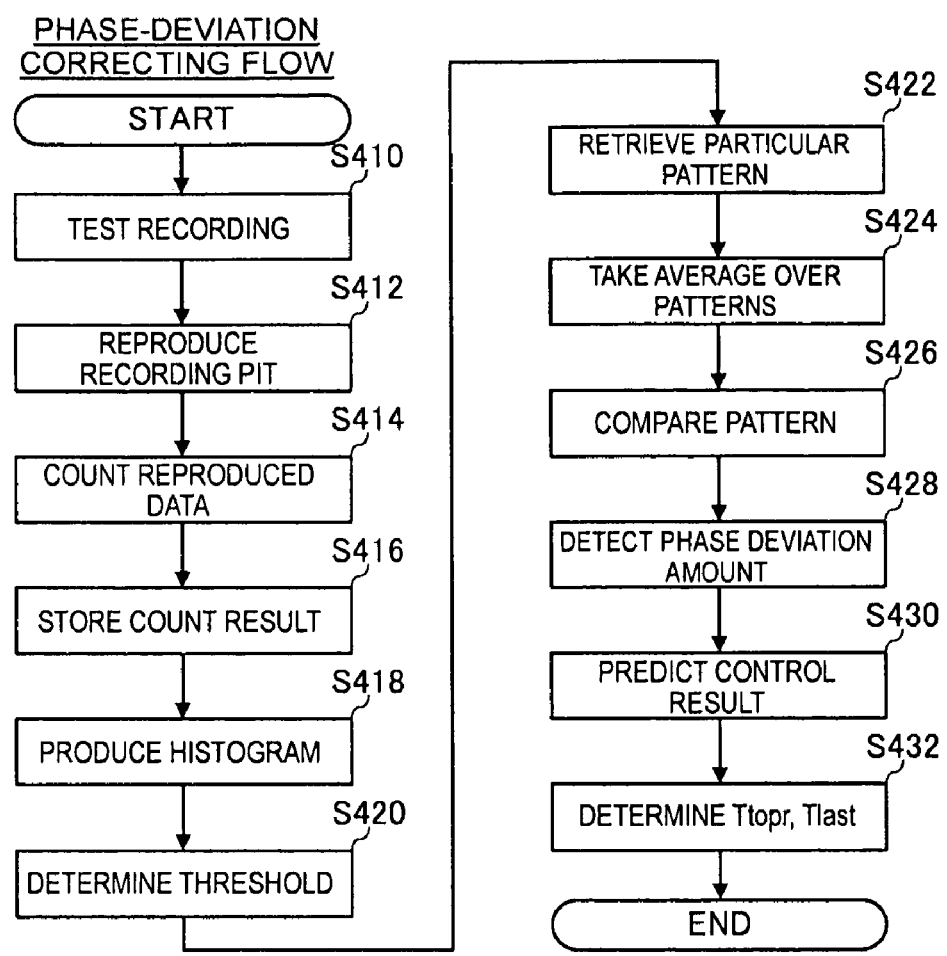
FIG. 35 is a flowchart showing an execution procedure for a phase-condition determining flowchart at FIG. 1B step S400.

FIG. 35 is a flowchart illustrating an execution procedure for the phase condition determining flowchart at FIG. 1B step S400. As shown in the figure, the FIG. 2 drive first performs a test recording, to the media 50, based on a plurality of record patterns changed in the nT-long pulse constituted by an mT-long pulse and an (n−m)T-long pulse (step S410). At this time, the conditions for the mT-long and (n−m)T-long pulses are fixed at respective values obtained in the flowchart described so far.

Then, reproduced is the record pattern formed by the test recording (step S412). The record-deviation detecting section 112 counts a reproduced binary signal obtained as a result thereof from the binarization circuit 110, by a counter synchronous with a predetermined clock (step S414). The pit and land lengths included in the reproduced binary signal are stored, as count data, in the storage area 115 (step S416).

Then, the record-deviation detecting section 112 produces a histogram representative of an occurrence frequency on each count value by use of the count data stored in the storage area 115 (step S418). From the histogram, determined is a threshold, a count result, providing a criterion in determining a pit length and land length (step S420).

Then, the record-deviation detecting section 112 retrieves a plurality of particular patterns including a particular pit/land pattern with reference to the threshold, out of the count data stored in storage area 115 (step S422). The count results, considered fallen under the equal pit length and included in the particular pattern, are averaged over. Furthermore, the count results, considered fallen under the equal land length, are averaged over, thereby determining the average lengths respectively over the pits and lands constituting the particular pattern (step S424).

Then, the record-deviation detecting section 112 takes one, as a reference pattern, out of the plurality of particular patterns extracted, and compares the reference pattern with other patterns (step S426), thus detecting independently the following deviation amount (step S428):
1) pit-front-phase deviation amount relative to the recording pulse,
2) pit-rear-phase deviation amount relative to the recording pulse, and
3) pit deviation amount of from the recording pulse due to thermal interference.

Then, the operating-expression deriving section 113 derives an operating expression for determining an optimal strategy, based on the deviation amount detected by the record-deviation detecting section 112. The strategy determining section 114 predicts control results of the parameters by use of the operating expression derived by the operating-expression deriving section 113 (step S430). Based on a prediction result, Ttopr and Tlast shown in FIG. 34 are determined and set to the strategy circuit 102 (step S432).

Here, the procedure, of from the test recording at the step S410 up to the averaging at the step S424, is executed similarly to those of the technique shown in FIGS. 20-24, and hence omitted to explain.

Figure 36:
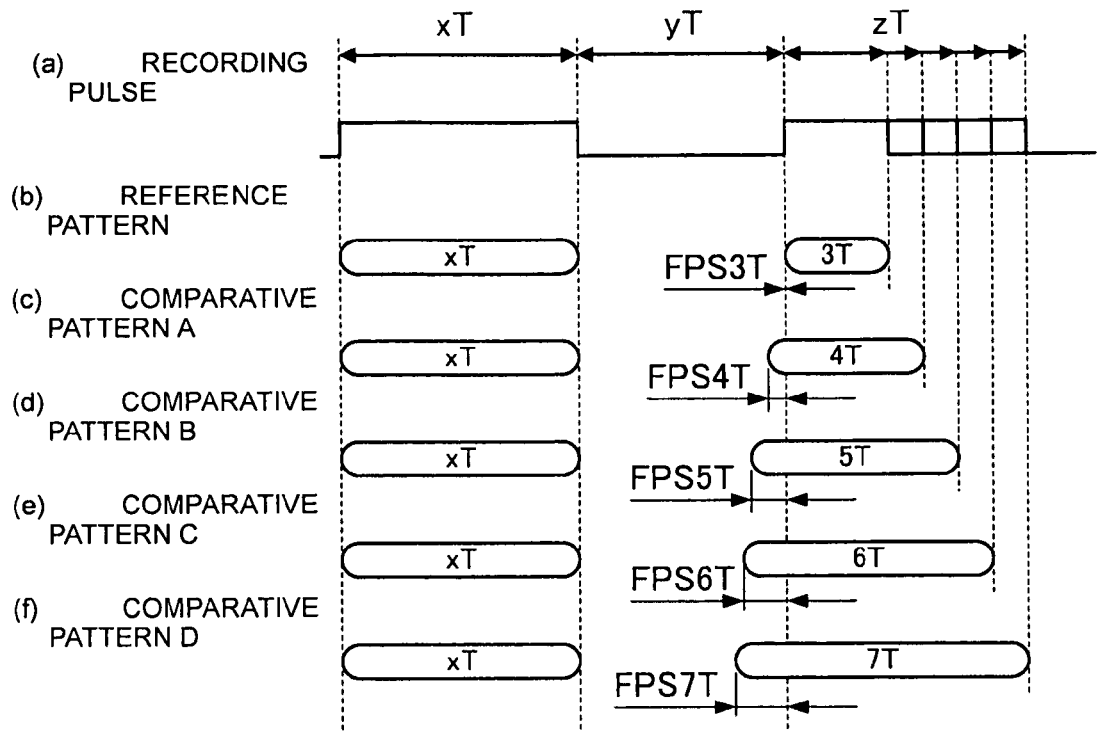
FIG. 36 is a concept figure showing an example of a record pattern and reproducing pattern for detecting a front phase deviation amount in a pit length.

FIG. 36 is a concept figure illustrating an example of a record and reproduce pattern for detecting a front phase deviation amount in the pit. As shown in the figure, in the case of detecting a front phase deviation amount in the pit length, test recording is performed by use of the recording pulse shown in (a) of the figure. The recording pulse includes a pattern having a continuing land PxT, pit LyT and land variable pit Pzt wherein the fixed pit PxT and the fixed land LyT are fixed in their lengths while the variable pit PzT is varies in its length as 3T, 4T, . . . 7T as shown in from (b) to (f) in the figure. Not that the variable pit is changed in length up to 14T though not shown.

Here, in case measuring the length of the fixed land LyT of the record pattern, the fixed land LyT would have a constant length under the ideal recording condition. However, in case the fixed land LyT has a length deviated from the ideal regulation length, then the amount of deviation of the fixed land LyT from the ideal regulation length corresponds to the front phase deviation amounts of the respective pits P3T, P4T, . . . P14T of 3T, 4T, . . . 14T relative to the recording pulse in the strategy during recording because the pit PxT is fixed in its length.

Therefore, it is possible to obtain front phase deviation amounts FPS4T-FPS7T relative to the reference pattern as shown in the figure by taking the figure-(b) pattern having a variable pit Pzt of 3T as a reference pattern and the remaining patterns in (c)-(f) of the figure as comparative patterns, and comparing the fixed land LyT length of the comparative pattern with the fixed land LyT1 length of the reference pattern.

Here, because the deviation amounts FPS3T-FPS7T are satisfactorily detected as relative values with reference to certain points, the front phase deviation amount FPS3T of the reference pattern may be defined as zero or as a deviation amount of from the ideal length. Alternatively, in place of the figure-(b) pattern, any of the patterns shown in (c)-(d) in the figure may be taken as a reference pattern.

Figure 37:
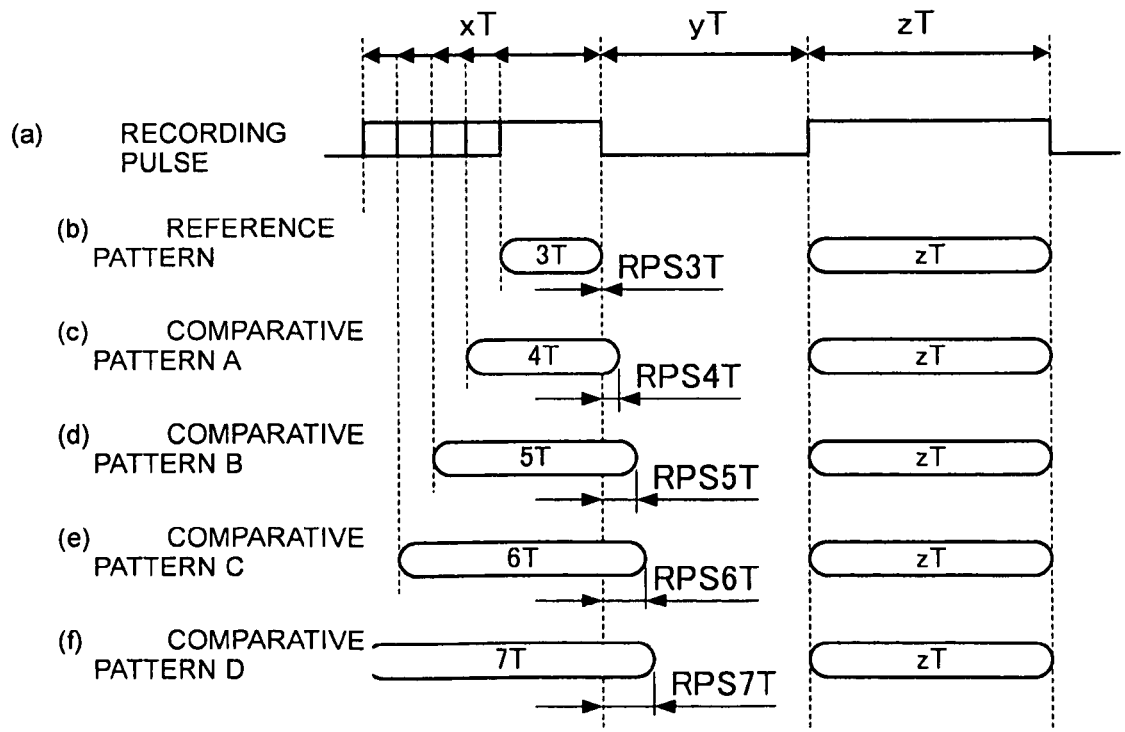
FIG. 37 is a concept figure showing an example of a record pattern and reproducing pattern for detecting a rear phase deviation amount in a pit length.

FIG. 37 is a concept figure illustrating an example of recording and reproducing patterns for detecting a rear phase deviation amount in the pit length. As shown in the figure, in the case of detecting a rear phase deviation amount in the pit length, test recording is performed by use of the recording pulse shown in (a) of the figure. The recording pulse includes a pattern having a continuing variable pit PxT, fixed land LyT and fixed pit Pzt wherein the fixed land LyT and the fixed pit PzT are fixed in their lengths while the variable pit PxT is varies in its length as 3T, 4T, . . . 7T as shown in from (b) to (f) of the figure. Not that the variable pit is varied in length up to 14T though not shown.

Here, in case measuring the length of the fixed land LyT of the record pattern, the fixed land LyT would have a constant length under the ideal recording condition. However, in case the fixed land LyT has a length deviated from the ideal regulation length, then the amount of deviation of the fixed land LyT from the ideal regulation length corresponds to the rear phase deviation amounts of the respective pits P3T, P4T, . . . P14T of 3T, 4T, . . . 14T relative to the recording pulse in the strategy during recording because the pit PzT is fixed in its length.

Therefore, it is possible to obtain rear phase deviation amounts RPS4T-RPS7T relative to the reference pattern as shown in the figure by taking the figure-(b) pattern having a variable pit Pxt of 3T as a reference pattern and the remaining patterns in (c)-(f) of the figure as comparative patterns, and comparing the fixed land LyT length of the comparative pattern with the fixed land LyT length of the reference pattern.

Here, because the deviation amounts RPS3T-RPS7T are satisfactorily detected as relative values with reference to certain points, the rear phase deviation amount RPS3T of the reference pattern may be defined as zero or as a deviation amount of from the ideal length. Alternatively, in place of the figure-(b) pattern, any of the patterns shown in (c)-(d) in the figure may be taken as a reference pattern.

FIGS. 38A and 38B are concept figures illustrating an example of a record pattern for detecting an amount of a deviation in the pit caused due to thermal interference. As shown in the figure, in the case of detecting an amount of a pit deviation caused due to thermal interference, test recording is performed by use of the recording pulse shown in (a) of the figure. The recording pulse includes a pattern having a continuing land LxT, pit PyT and land LzT wherein the fixed pit PyT and the fixed land LzT are fixed in their lengths while the variable land LxT is varies in its length as 3T, 4T, . . . 7T as shown in from (b) to (f) of the figure. Not that the variable land is changed in length up to 14T though not shown.

Here, in case measuring the length of the fixed pit PyT of the record pattern, the fixed pit PyT would have a constant length under the ideal recording condition. However, in case the fixed pit PyT has a length deviated from the ideal regulation length, then the amount of deviation of the fixed pit PyT from the ideal regulation length corresponds to the amount of a deviation caused due to thermal interference of the pit formed immediately preceding the variable land LxT because the land LzT is fixed in its length.

Therefore, it is possible to obtain front phase deviation amounts HID3T-HID7T relative to the reference pattern as shown in the figure by taking the figure-(b) pattern having a variable land LxT of 3T as a reference pattern and the remaining patterns in (c)-(f) of the figure as comparative patterns, and comparing the fixed pit PyT length of the comparative pattern with the fixed pit PyT length of the reference pattern.

Here, because the deviation amounts HID3T-HID7T are satisfactorily detected as relative values with reference to certain points, the front phase deviation amount HID3T of the reference pattern may be defined as zero or as a deviation amount of from the ideal length. Alternatively, in place of the figure-(b) pattern, any of the patterns shown in (c)-(d) in the figure may be taken as a reference pattern.

FIGS. 39A and 39B are concept figures illustrating a table configuration for retrieving a particular pattern for use in detecting a pit front or rear phase deviation. In the case of detecting a pit-front-phase deviation, the data stored in the FIG. 2 storage area 115 is retrieved with reference to a threshold range, shown in (a) of the figure, concerning the pit PxT, land LyT and pit PzT established on each of the particular patterns (corresponding to step S422 in FIG. 35), thereby extracting a data string satisfying the threshold.

Then, the count results are classified as pit PxT, land LyT and pit PzT, to determine an average over each of the pit PxT, the land LyT and the pit PzT (corresponding to step S424 in FIG. 35). By performing the pattern comparison mentioned before with using the averages over the count results, a front phase deviation amount can be obtained in the pit length. In (b) of the figure, there are exemplified thresholds for detecting a pit-rear-phase deviation. The thinking way and operation is similar to that in detecting a pit-front-phase deviation.

Figure 40:
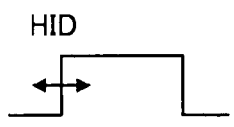
FIG. 40 is a concept figure showing a table configuration for particular pattern retrieval for use in detecting a pit-interference deviation.

FIG. 40 is a concept figure illustrating a table configuration for retrieving a particular pattern for use in detecting a pit-interference deviation. As shown in the figure, a pit-interference deviation is detected by a technique similar to that for pit front or rear phase deviation explained using FIG. 39.

Figure 41:
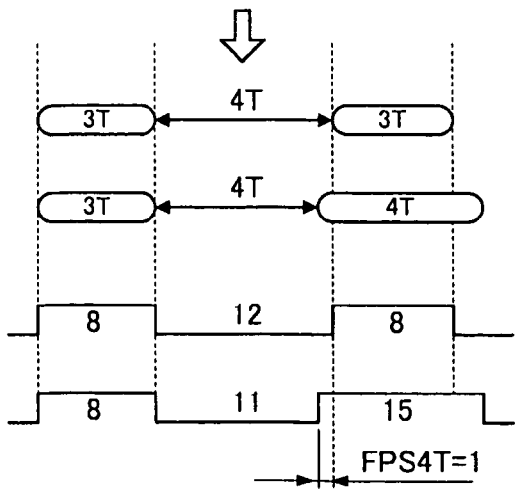
FIG. 41 is a concept figure showing a detailed example to detect a deviation amount by a relative comparison of count results.

FIG. 41 is a concept figure illustrating a concrete example to detect a deviation amount by relatively comparing the count results. Although the figure is an exemplification to detect a pit-front-phase deviation, the technique like this is applied for detecting other types of deviation amounts. When detecting a deviation amount, a reference and comparison patterns shown in (a) and (b) of the figure are respectively retrieved and extracted, to compare a count value of a point where the length in nature is fixed, as shown in (c) and (d) of the figure. In the illustrated example, the land LyT is a comparing point. Accordingly, a difference is determined between a reference-pattern count result "12" shown in (c) of the figure and a compared-pattern count result "11" shown in (d) of the figure. A difference "1" thus obtained provides a value of deviation amount FPS4T.

Figure 42:
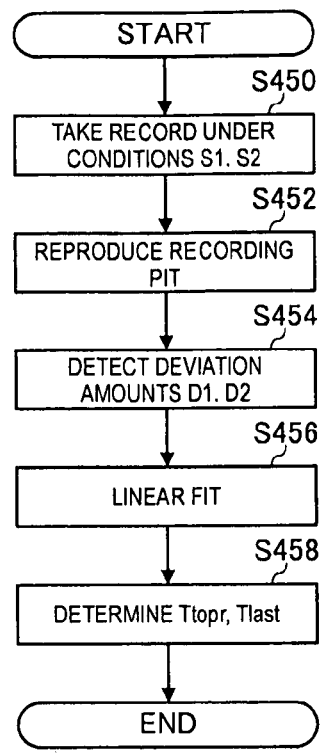
FIG. 42 is a flowchart showing an execution example to determining Ttopr, Tlast by predicting a control amount shown in FIG. 35.

FIG. 42 is a flowchart illustrating an execution example to determine Ttopr, Tlast by means of the FIG. 35 control-amount prediction. As shown in the figure, control-amount prediction is conducted by executing a series of steps, as follows. Namely, test recording is conducted under two or more conditions S1, S2 different in recording conditions (step S450). The resulting record pit is reproduced (step S452). By comparing the resulting reproduced pattern, determined are a deviation amount D1 corresponding to the condition S1 and a deviation amount D2 corresponding to the condition S2 (step S454), to thereby linearly fit for the relationship of between the S1 and S2 as well as D1 and D2 (step S456). Using the relevant linear line, an optimal Ttopr and Tlast is determined (step S458).

Figure 43:
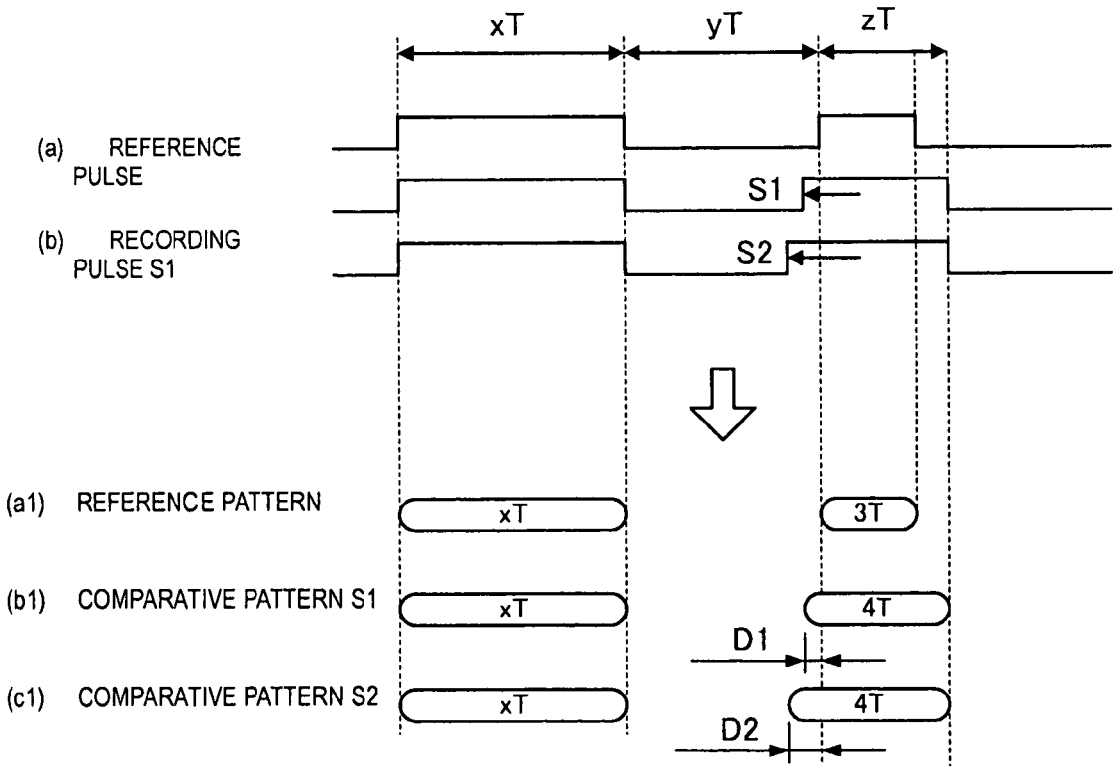
FIG. 43 is a concept figure showing a relationship of between a recording condition S1, S2 and a deviation amount D1, D2.

FIG. 43 is a concept figure illustrating a relationship between a recording condition S1, S2 and a deviation amount D1, D2. Provided that the recording pulse is taken as a reference pulse "PzT=3T", a comparative recording pulse "PzT=4T" is placed in a test recording under two conditions with a recording pulse S1, in (b) of the figure, that PzT at its top is changed S1 and a recording pulse S2, in (c) of the figure, that PzT at its top is changed S2.

As a result, a reference pattern shown in (a1) of the figure is obtained corresponding to the recording pulse in (a) of the figure, a comparative pattern S1 shown in (b1) of the figure is obtained corresponding to the recording pulse in (b) of the figure, and a comparative pattern S2 shown in (c1) of the figure is obtained corresponding to the recording pulse in (c) of the figure. Here, in the comparative pattern S1, a deviation in an amount D1 occurs corresponding to the control amount S1 while, in the comparative pattern S2, a deviation in an amount D2 occurs corresponding to the control amount S2.

By knowing the deviation amounts D1, D2 for the control amounts S1, S2, it can be predicted in what amount a deviation is caused by providing in what control amount to which one of the parameters. For this reason, by utilizing the relationship of those, control amount is predicted and correction amount is determined.

Figure 44:
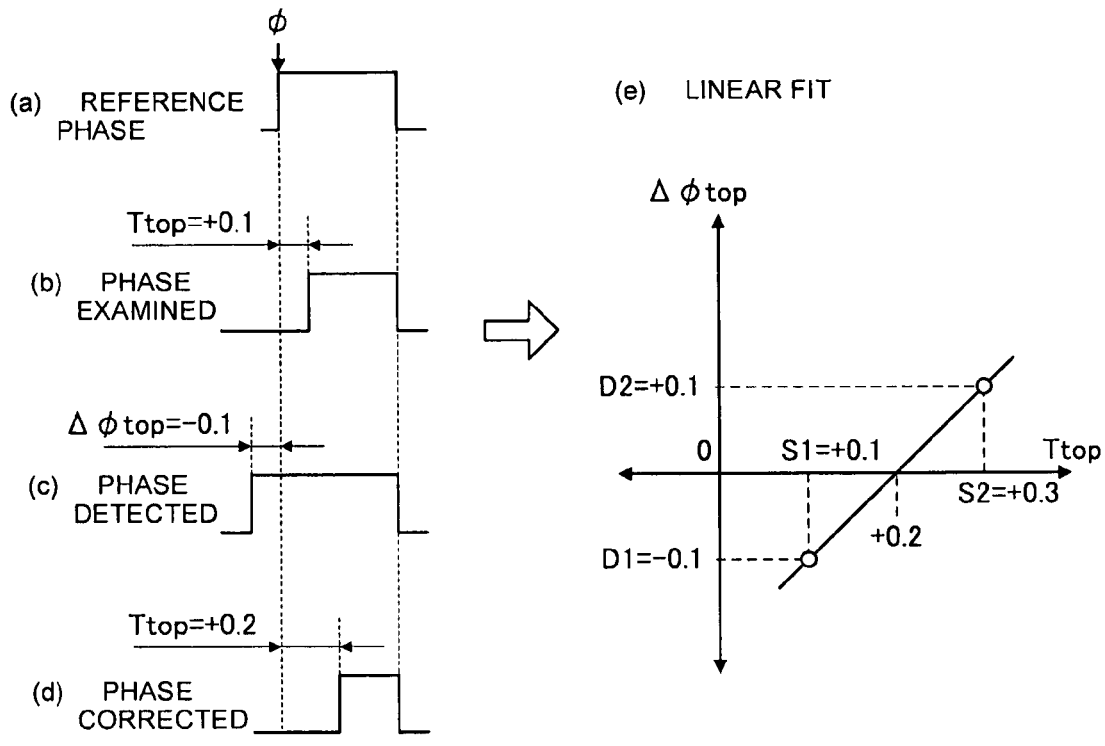
FIG. 44 is a concept figure showing an example of a correction for front phase deviation utilizing a linear fitting.

FIG. 44 is a concept figure illustrating an example to correct for front phase deviation by utilizing a linear fitting. When determining a correction amount Ttop for front phase deviation, test recording is conducted by use of a waveform having a pulse deviated Ttop in position as shown in (b) of the figure (corresponding to the recording conditions S1, S2) provided that the reference pulse is in a reference phase $\phi$ as shown in (a) of the figure. As a result, detected is a phase deviation $\Delta\phi$top in the reproduced signal obtained, as shown in (c) of the figure (corresponding to the deviation amounts D1, D2).

In the illustrated example, the Ttop is changed in two ways, i.e. S1=+0.1 and S2=+0.3, to obtain a detected phase $\Delta\phi$top as a deviation amount D1=−0.1 and D2=+0.1. By using those S1, S2, D1 and D2 thus obtained, the control result $\Delta\phi$top is linearly fit against a control amount Ttop as shown in (e) in the figure. By utilizing the linear line, a correction phase Ttop=+0.2 capable of canceling the phase deviation is determined as an optimal correction value.

In this manner, linear or curve fitting is available for a relationship of between a strategy change S1, S2 and a deviation amount change D1, D2 if determining at least two change points. By using the linear line, it is possible to determine an optimal correction amount at which the deviation amount is zero.

Specifically, the recording pulse is optimally corrected by determining a deviation amount D for a several-point change of the strategy S, substituting a relationship between the strategy S and the deviation amount D to a general expression "D=a×S+b", determining constants a, b by resolving the simultaneous equations, determining finally a strategy S corresponding to the ideal deviation amount D, and setting the relevant strategy S to the FIG. 1 strategy circuit 102.

For example, it is assumed that the FIG. 1 record-deviation detecting section 112 detected a deviation amount D1 from a reproduced pattern in a test recording using a certain strategy S1 and a deviation amount D2 from a reproduced pattern in a test recording using another strategy S2.

$$D1 = a \times S1 + b$$

$$D2 = a \times S2 + b$$

From the above, "a" and "b" are calculated to determine the following function that uses "a" and "b" thus calculated:

$$S = (D-b)/a.$$

The optimal strategy S is determined by substituting, in the function, an output deviation amount D for improving the recording quality, e.g. for correcting for the initial output deviation, etc. caused, say, in an equalizer.

Note that the optimal strategy-S determining function can be determined corresponding to the respective pits P3T, P4T, . . . P14T of 3T, 4T, . . . 14T. Meanwhile, the optimal strategy-S determining function can be determined corresponding to a rate of recording.

Figure 45:
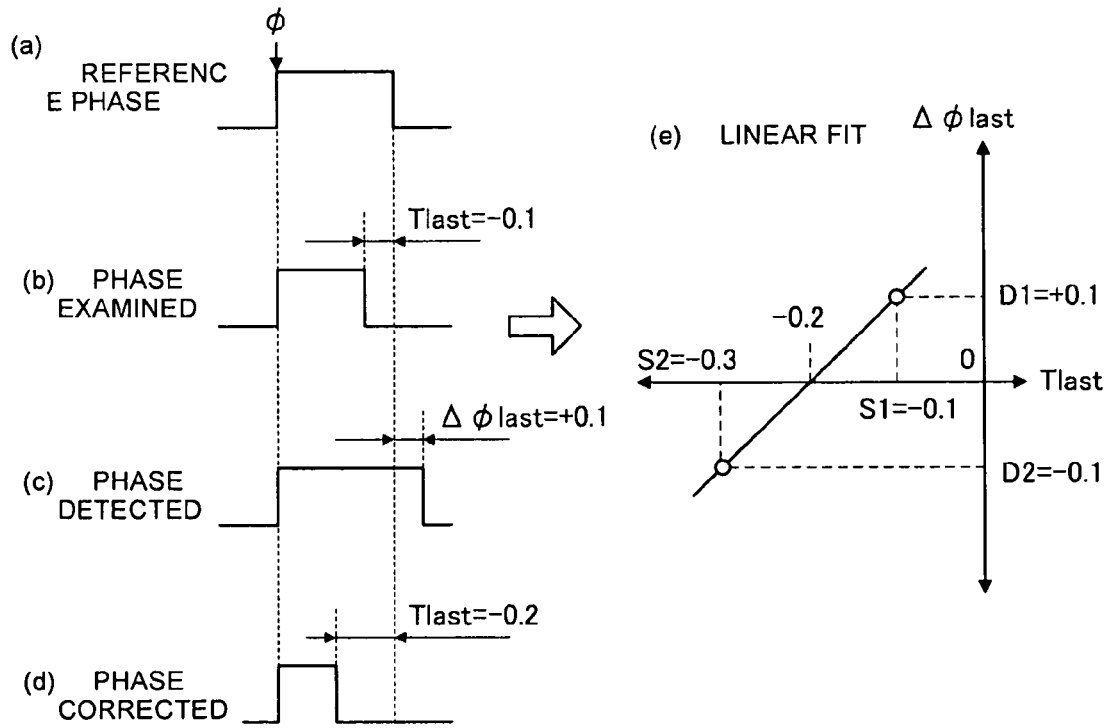
FIG. 45 is a concept figure showing an example of a correction for rear phase deviation utilizing a linear fitting.

FIG. 45 is a concept figure illustrating an example to correct for rear phase deviation by utilizing a linear fitting. When determining a correction amount Tlast for length deviation, test recording is conducted by use of a waveform having a pulse deviated Tlast in position, as shown in (b) of the figure, provided that the reference pulse is in a reference phase φ as shown in (a) of the figure. Thus, a phase deviation Δφlast is detected in the obtained reproduced signal as shown (c) of the figure.

In the illustrated example, the Tlast is changed in two ways, i.e. S1=−0.1 and S2=−0.3, to obtain the detected phase Δφlast as a deviation amount D1=+0.1 and D2=−0.1. By using those S1, S2, D1 and D2 thus obtained, the control result Δφlast is linearly fit against a control amount Δφlast as shown in (e) of the figure. By utilizing the linear line, a correction amount Tlast=−0.2 capable of canceling a phase deviation is determined as an optimal correction value.

FIGS. 46A and 46B are concept figures illustrating a table configuration storing correction amounts Ttop and Tlast. As shown in (a) of the figure, the correction amount Ttop is defined as a combination with a pit front land length on each correcting-pit length. For example, in the case that the pit to be corrected has a length 3T while the front land of the pit has a length 3T, then the correction amount is stored in an area shown "3-3" in the figure. In the case that the pit to be corrected has a length 4T while the front land of the pit has a length 3T, then the correction amount is stored in an area shown "3-4" in the figure. Subsequently, for 5T, . . . 14T, storage is done similarly to 3T and 4T.

Meanwhile, the correction amount Tlast is defined as a combination with a rear land length of the pit on each correcting-pit length. For example, in the case that the pit to be corrected has a length 3T while the rear land of the pit has a length 3T, then the correction amount is stored in an area shown "3-3" in the figure. In the case that the pit to be corrected has a length 4T while the rear land of the pit has a length 3T, then the correction amount is stored in an area shown "3-4" in the figure. Subsequently, for 5T, . . . 14T, storage is done similarly to 3T and 4T.

Figures 46, 47:
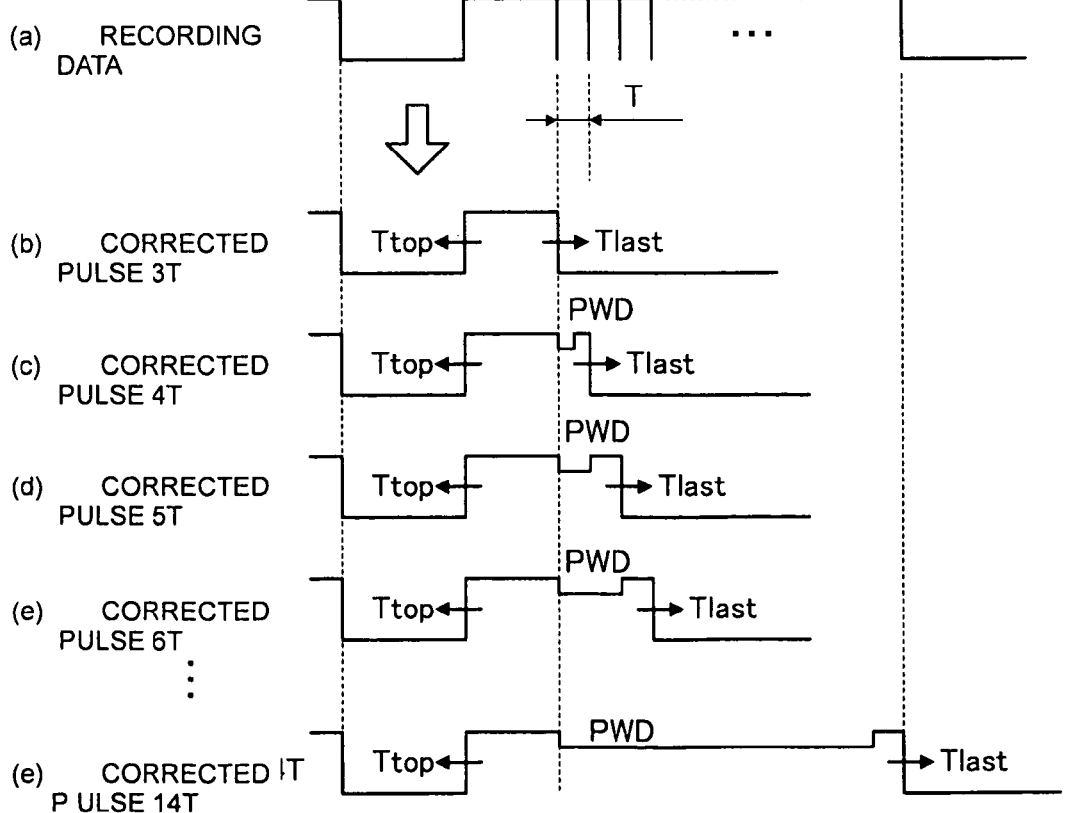
FIG. 47 is a concept figure showing a configuration concept of a corrected single-pulse.

FIG. 47 is a concept figure illustrating an example of a single-pulse corrected. As shown in the figure, in the case the recording data shown in (a) of the figure is recorded onto an optical disk, a strategy is established to which the optimal correction value is applied for each pit length. For example, in the case of recording a 3T-long pit, a front correction value Ttop for a 3T-long pit is read out of the table shown in FIG. 46 according to the front land length while a rear end correction value Tlast for a 3T-long pit is read out thereof according to the rear land length, thus correcting the front and rear ends of the recording pulse by means of the Ttop and Tlast, as shown in (b) of the figure.

Meanwhile, in the case of correcting a pit having a length 4T or greater, a PWD correction value for a relevant pit length is read out of the FIG. 32 table in addition to Ttop and Tlast as shown in (c)-(d) of the figure, thus correcting the pulse form in accordance with the relevant PWD value.

Figure 48:
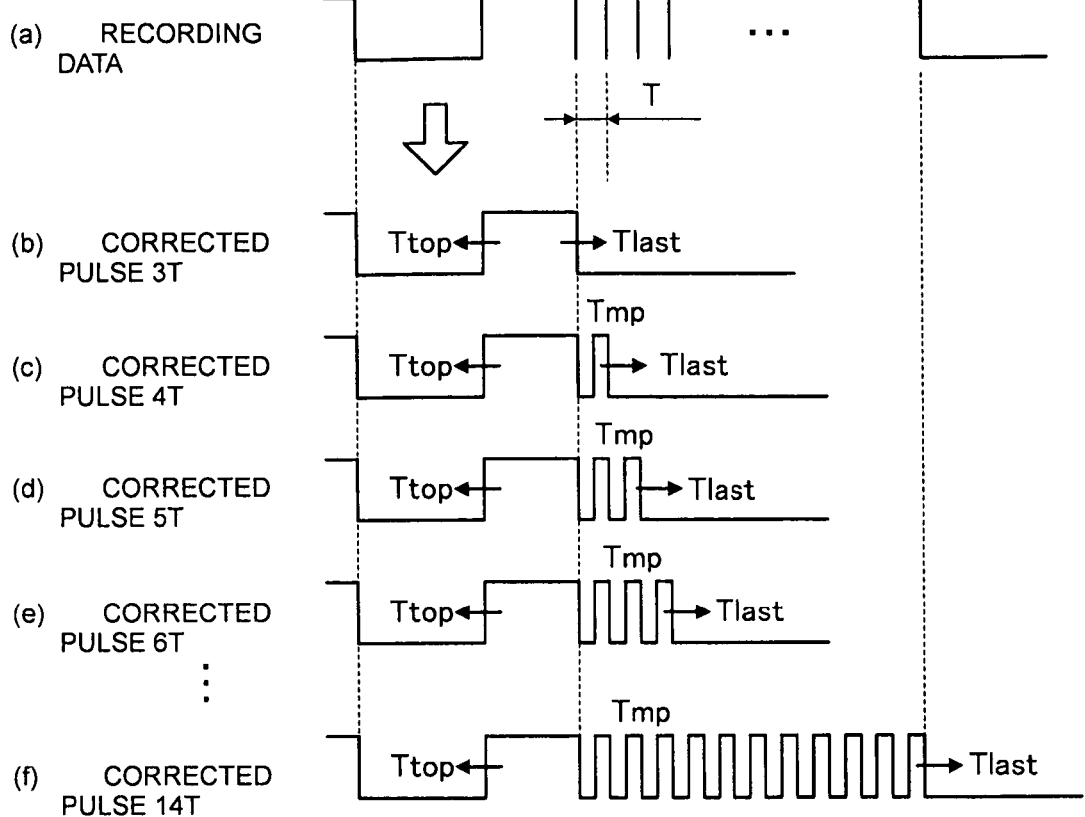
FIG. 48 is a concept figure showing a configuration concept of a corrected multi-pulse.

FIG. 48 is a concept figure illustrating an example of a multi-pulse corrected. In the case of a multi-pulse as shown in the figure, a correction value Tmp is read, in place of the correction value PWD for the FIG. 47 single-pulse, out of the FIG. 32 table thereby correcting the pulse form in accordance with the value Tmp. Except for this, those for a single-pulse are applied.

Incidentally, the embodiment described so far described the optimal strategy S by substituting a deviation amount D in the optimal-strategy-S determining function. Alternatively, a correction table determined from the function may be prepared to thereby determine the optimal strategy S depending upon the correction table.

Meanwhile, the optimal-strategy setting process may be executed each time the optical disk type is changed or each time the rate of recording is changed. Furthermore, the condition for the optimal strategy, determined in the optimal-strategy setting step, may be stored, in conjunction with the optical disk type and the rate of recording, in the memory so that the optimal strategy stored in the memory can be read out and used when performing a recording again to the same type of optical disk or again at the equal rate of recording.

Figure 49:
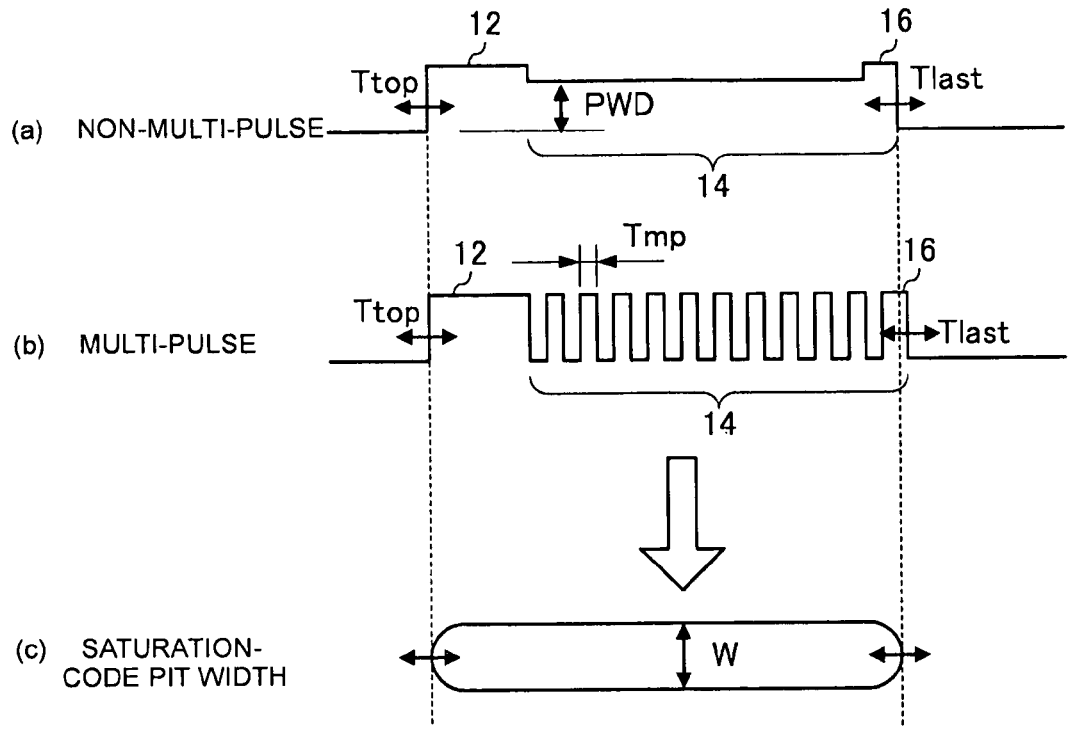
FIG. 49 is a concept figure showing a concept to control the recording pit width by regulating an intermediate pulse.

FIG. 49 is a concept figure illustrating a concept to control the width of a recording pit by regulating the intermediate pulse. In the case the recording pulse is configured by a top pulse 12, an intermediate pulse 14 and a last pulse 16 as shown in (a) and (b) in the figure, the width W of a saturation-code pit shown in (c) of the figure is controlled by regulating the intermediate pulse PWD, Tmp while the length and phase of the pit is controlled by the front and rear phase correction amounts Ttop, Tlast shown in (a) and (b) in the figure.

Figure 50:
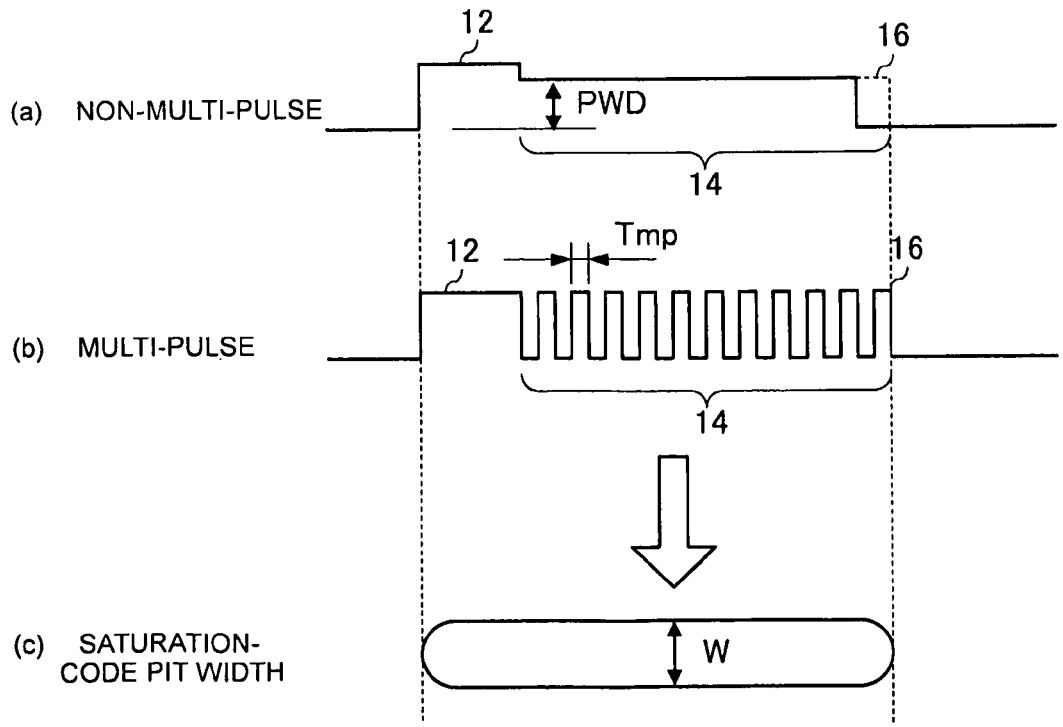
FIG. 50 is a concept figure showing a suitable establishing example of a last pulse in the FIG. 49 concept.

FIG. 50 is a concept figure illustrating a preferred example to set a last pulse under the FIG. 49 concept. In the case that a non-multi-pulse is used as a recording pulse as shown in (a) of the figure, the width of a saturation-code pit is desirably controlled by changing the intermediate-pulse condition PWD in an off state of the last pulse 16. In the case that a multi-pulse is used as a recording pulse as shown in (b) of the figure, the width of a saturation-code pit is desirably controlled by changing the intermediate-pulse condition Tmp in a state the narrow pulse Tmp and the last pulse 16 that constitute a intermediate pulse 14 are set at the equal width.

Figure 51:
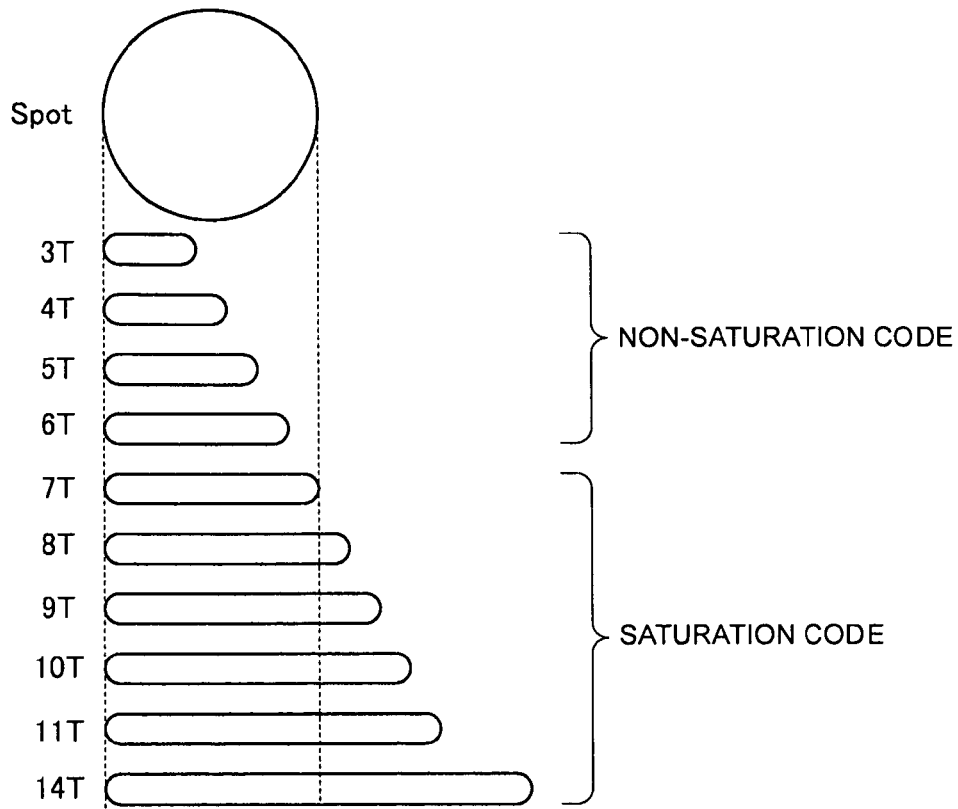
FIG. 51 is a concept figure showing a relationship between a non-saturation code and a saturation code.

FIG. 51 is a concept figure illustrating a relationship between a non-saturation code and a saturation code. Provided that the code whose reproduced signal amplitude is obtained unsaturated, e.g. in a code length 3T-6T shorter than the spot diameter "Spot", is regarded as an unsaturated code as in the figure while the code whose reproduced signal amplitude is obtained saturated, e.g. 7T-14T, is regarded as a saturation code, then the pit-width increase corresponding to a saturated code forms a factor to reduce the signal quality at the Wobble or Lpp. Therefore, the recording pulse corresponding to the saturation code is regulated in its intermediate condition based on the concept shown in FIGS. 49 and 50.

Figure 52:
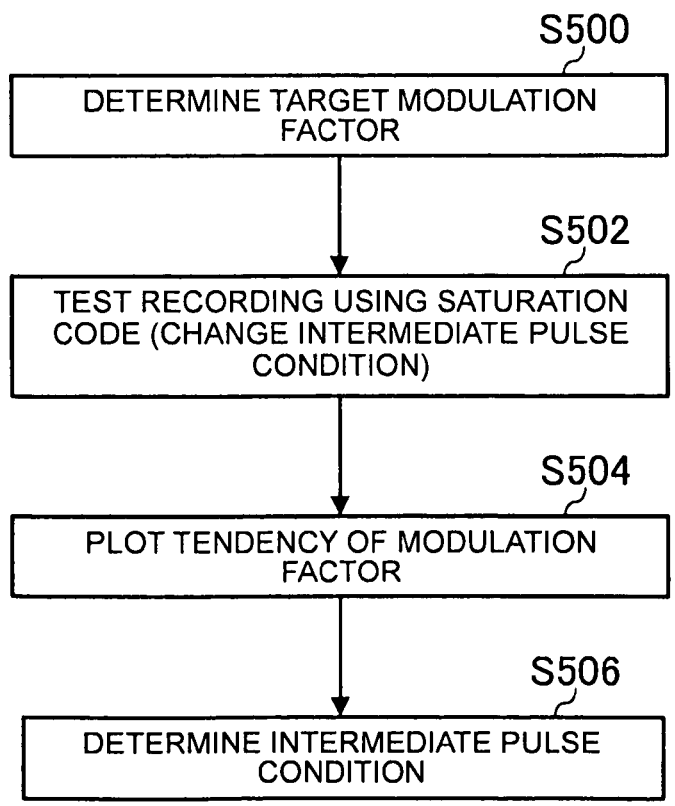
FIG. 52 is a flowchart showing a first execution procedure for controlling the pit width by regulating the intermediate pulse condition.

FIG. 52 is a flowchart illustrating a first example of an execution procedure for controlling the pit width by regulating the intermediate-pulse condition. As shown in the figure, when controlling the pit width at its intermediate pulse, a target modulation factor suited for the recording media is first determined by the technique such as of test recording (step S500). The test recording is performed by changing the intermediate-pulse condition for a saturation code, say, a recording pulse in a length of 14T (step S502).

Subsequently, the test-recorded result is reproduced and measured of its modulation factor, to make a plotting of a modulation-factor change tendency depending upon a change in the intermediate-pulse condition (step S504). From the tendency in the plotting, an intermediate-pulse condition is established at which the optimal modulation factor can be obtained for the relevant media (step S506).

Figure 53:
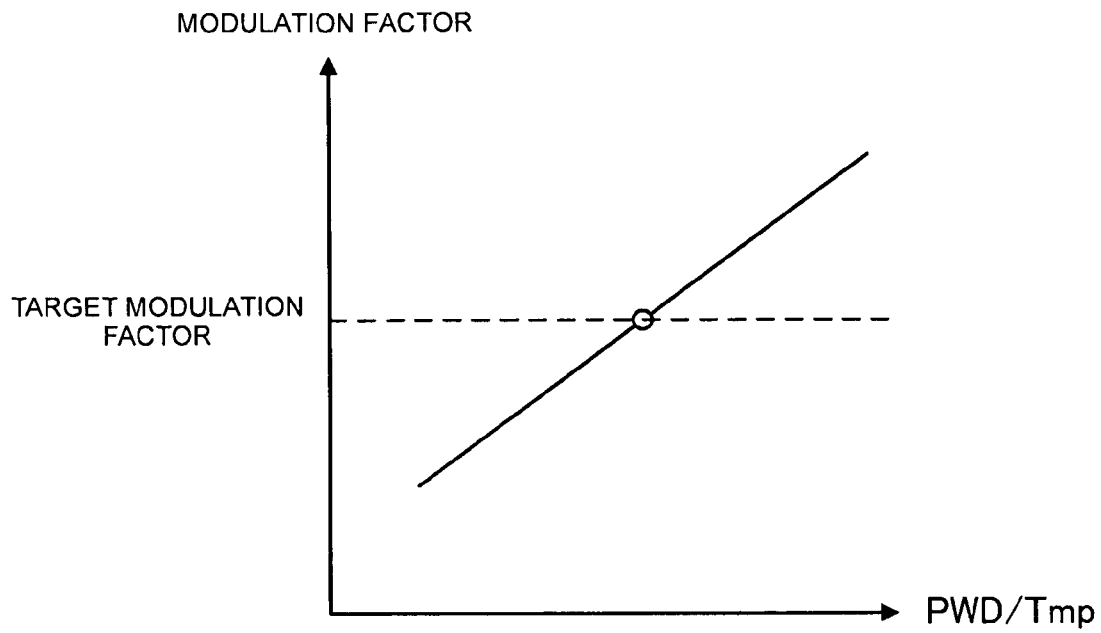
FIG. 53 is an X-Y plot figure showing an example of a change tendency of a modulation factor obtained by the FIG. 52 procedure.

FIG. 53 is a figure of an X-Y plotting illustrating an example of modulation-factor change tendency obtained by the FIG. 52 procedure. As shown in the figure, in case plotting the change of a modulation factor against a change in the intermediate-pulse condition PWD, Tmp, it generally shows a tendency of linear change. The linear line intersects with the target modulation factor suited for the relevant media, whose intersection point, shown with an open circle in the figure, is established as an optimal intermediate-pulse condition.

Figure 54:
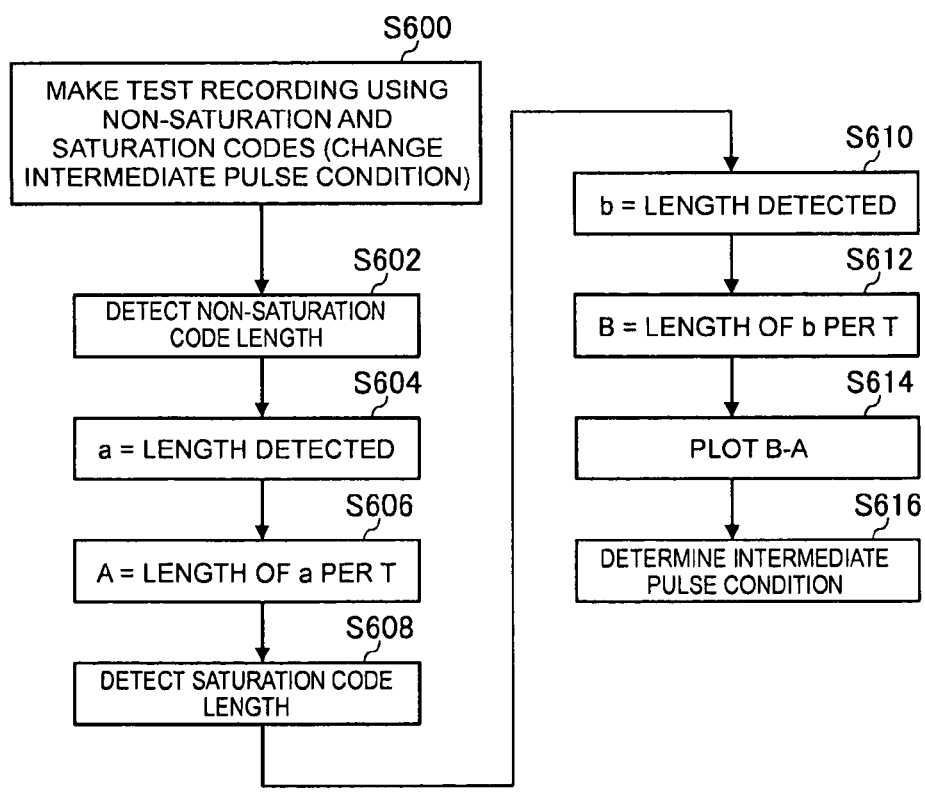
FIG. 54 is a flowchart showing a second execution procedure for controlling the pit width by regulating the intermediate pulse condition.

FIG. 54 is a flowchart illustrating a second example of an execution procedure to control the pit width by regulating the intermediate pulse condition. As shown in the figure, this example first prepares a test pattern including non-saturation and saturation codes, to conduct a test recording by changing the intermediate pulse condition of recording pulse corresponding to the saturation code included in the test pattern (step S600).

Then, the test-recorded result is reproduced to detect a length of the non-saturation code and determine a length per 1T on the detected length (step S602-S606). Similarly, the test-recorded result is reproduced to detect a length of the saturation code and determine a length per 1T on the detected length (step S608-S612).

Then, plotting is made on a difference between a non-saturation-code length per 1T A and a saturation-code length per 1T B against a change in the intermediate-pulse condition (step S614). From the tendency of plotting, an intermediate-pulse condition is established that is optimal for the relevant media (step S616).

Figure 55:
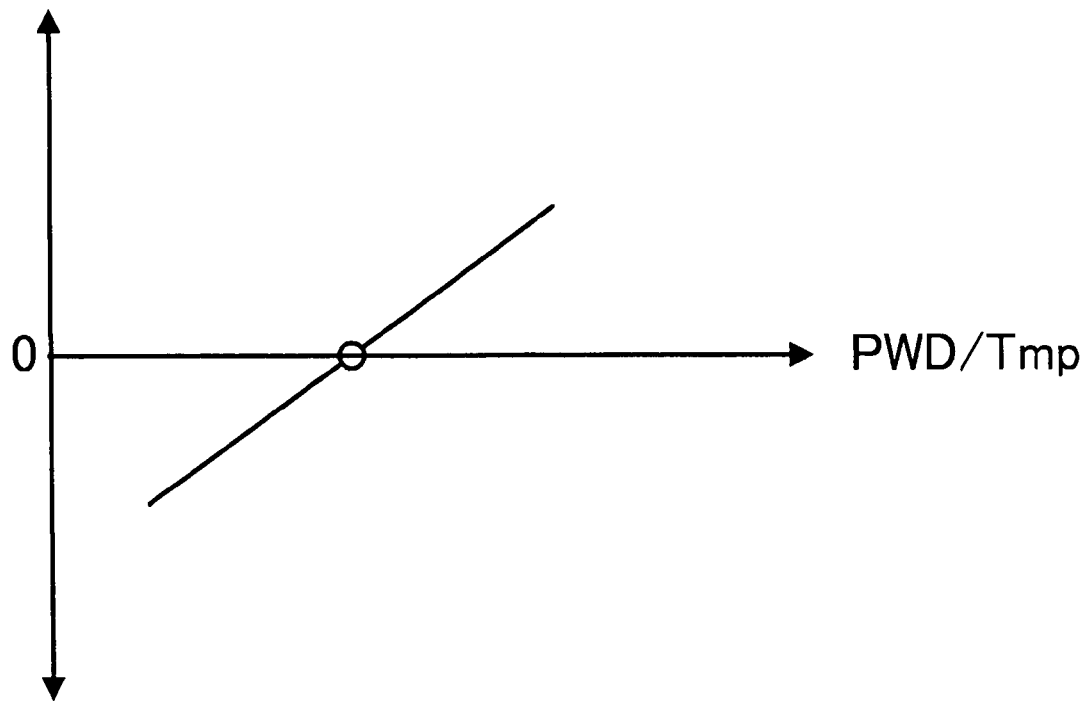
FIG. 55 is an X-Y plot figure showing an example of a change tendency of a modulation factor obtained by the FIG. 54 procedure.

FIG. 55 is a figure of an X-Y plotting illustrating an example of modulation-factor change tendency obtained by the FIG. 54 procedure. As shown in the figure, in case plotting the change of a modulation balance against a change in the intermediate-pulse condition PWD, Tmp, it generally shows a tendency of linear change. The linear line intersects with the zero point providing an optimal modulation balance, whose intersection point, shown with an open circle in the figure, is established as an optimal intermediate-pulse condition.

Figure 56:
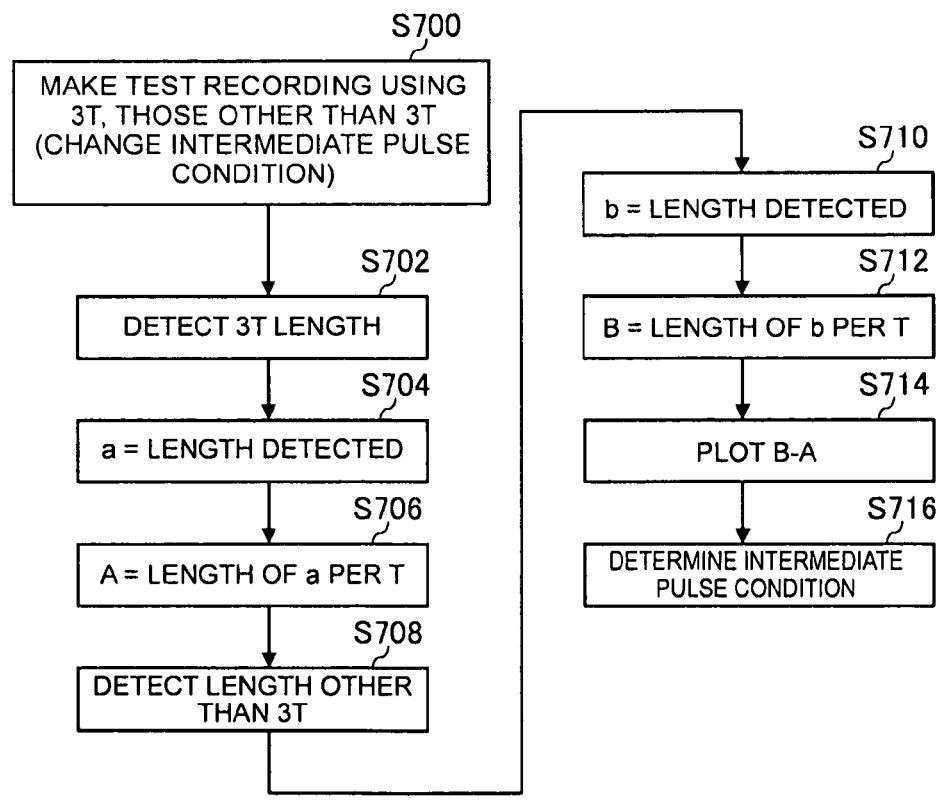
FIG. 56 is a flowchart showing a third execution procedure for controlling the pit width by regulating the intermediate pulse condition.

FIG. 56 is a flowchart illustrating a third example of an execution procedure to control the pit width by regulating the intermediate pulse condition. As shown in the figure, this example first prepares a test pattern including a 3T-long code as the shortest code and a longer code than 3T, e.g. a 4T-long code, to conduct a test recording by changing the intermediate pulse condition of recording pulse corresponding to the 4T-long code included in the test pattern (step S700).

Then, the test-recorded result is reproduced to detect a length of the 3T-long code and determine a length per 1T on the detected length (step S702-S706). Likewise, the test-recorded result is reproduced to detect a length of the 4T-long code and determine a length-per-T on the detected length (step S708-S712).

Then, plotting is made on a difference between a length-per-T A of the 3T-long code and a length-per-T B of the 4T-long code against a change in the intermediate-pulse condition (step S614). From the tendency of plotting, an intermediate-pulse condition is established that is the optimal for the relevant media (step S616).

According to one embodiment, recording is expected to be applied in a sever environment because of the capability of obtaining a recording condition approximate to the optimal even where the media is unknown to the drive.

What is claimed is:

1. An optical-information recording apparatus adapted to establish a recording pulse comprising a top pulse, an intermediate pulse and a last pulse based at least in part on a plurality of types of codes and to illuminate laser light based on the established recording pulse thereby recording information to an optical recording media, the apparatus comprising:
    means for controlling a phase of a recording pit corresponding to a saturation code by regulating at least the top pulse corresponding to the saturation code, wherein the saturation code is a code whose reproduced signal amplitude is saturated;
    means for controlling the width of the recording pit corresponding to the saturation code by regulating the intermediate pulse in the recording pulse corresponding to the saturation code;
    means for performing a test recording to the media by changing the intermediate pulse condition of the saturation code while fixing conditions for the top pulse and the last pulse;
    means for performing a test recording to the media by using a non-saturation code shorter than the saturation code;
    means for reproducing a result of the test recordings and detecting recording lengths of the saturation and non-saturation codes; and
    means for determining an intermediate pulse condition of the saturation code depending upon a change tendency of the recording length of the saturation code relative to the recording length of the non-saturation code.

2. An optical-information recording method adapted to establish a recording pulse comprising a top pulse, an intermediate pulse and a last pulse correspondingly to a plurality of types of codes and to illuminate laser light based on the established recording pulse thereby recording information to an optical recording media, the method comprising:
    controlling a phase of a recording pit corresponding to a saturation code by regulating at least a condition of the top pulse in a recording pulse corresponding to the saturation code, wherein the saturation code is a code whose reproduced signal amplitude is saturated;
    controlling the width of the recording pit corresponding to the saturation code by regulating the intermediate pulse in the recording pulse corresponding to the saturation code;
    performing a test recording to the media by changing the intermediate pulse condition of the saturation code while fixing conditions for the top pulse and the last pulse;
    performing a test recording to the media by using a non-saturation code shorter than the saturation code;
    reproducing a result of the test recordings and detecting recording lengths of the saturation and non-saturation codes; and
    determining an intermediate pulse condition of the saturation code depending upon a change tendency of the recording length of the saturation code relative to the recording length of the non-saturation code.

3. A signal processing circuit adapted for incorporation in an optical-information recording apparatus that is configured to establish a recording pulse comprising a top pulse, an intermediate pulse and a last pulse based at least in part on a plurality of codes and to illuminate laser light based on the established recording pulses thereby recording information to an optical recording media, the signal processing circuit being configured to perform the method of claim 2.

4. A method of determining a condition for an intermediate pulse of a recording pulse comprising a top pulse, an intermediate pulse, and a last pulse, the method comprising:
   recording a test pattern to a media, said test pattern comprising a first code and a second code longer than the first code, and changing the intermediate pulse condition for the second code while fixing conditions for the top pulse and the last pulse when recording the test pattern;
   determining an intermediate pulse condition of the second code depending at least in part on a change tendency of the recording length of the second code relative to the recording length of the first code.

5. The method according to claim 4, wherein the first code is a non-saturation code, and the second code is a saturation code.

6. The method according to claim 5, wherein the step of determining the intermediate pulse condition of the second code includes:
   detecting a unit recorded length of the second code for each of the changed intermediate pulse condition;
   detecting a unit recorded length of the first code; and
   determining the intermediate pulse condition in which the unit recorded length of the second code becomes substantially equal to the unit recorded length of the first code.

7. The method according to claim 4, wherein the first code is a 3T code.

8. The method according to claim 7, wherein the second code is a 4T code.

9. A method of determining a condition for an intermediate pulse of a recording pulse comprising a top pulse, an intermediate pulse, and a last pulse, the method comprising:
   test-recording an unsaturated code and a saturated code longer than the unsaturated code to a media, the saturated code being test-recorded plural times with varying an intermediate pulse condition while fixing conditions for the top pulse and the last pulse;
   detecting a unit recorded length of the test-recorded saturated code for each of the changed intermediate pulse condition;
   detecting a unit recorded length of the test-recorded unsaturated code; and
   determining an intermediate pulse condition in which the unit recorded length of the saturated code becomes substantially equal to the unit recorded length of the unsaturated code, thereby adjusting a width of the recoded saturated code.

10. The method according to claim 9, wherein the intermediate pulse condition is a height of the intermediate pulse.

11. The method according to claim 9, wherein the intermediate pulse comprises a plurality of pulses, and the intermediate pulse condition is the width of each of the plurality of pulses.

12. A method of determining a condition for an intermediate pulse of a recording pulse comprising a top pulse, an intermediate pulse, and a last pulse, the method comprising:
   recording a test pattern to a media, said test pattern comprising a first code and a second code longer than the first code, and changing the intermediate pulse condition for the second code while fixing conditions for the top pulse when recording the test pattern;
   determining an intermediate pulse condition of the second code depending at least in part on a change tendency of the recording length of the second code relative to the recording length of the first code.

13. A signal processing circuit adapted for incorporation in an optical-information recording apparatus that is configured to establish a recording pulse comprising a top pulse, an intermediate pulse and a last pulse based at least in part on a plurality of codes and to illuminate laser light based on the established recording pulses thereby recording information to an optical recording media, the signal processing circuit being configured to perform the method of claim 12.

14. The method according to claim 12, wherein the first code is a non-saturation code, and the second code is a saturation code.

15. The method according to claim 12, wherein the first code is a 3T code.

16. The method according to claim 15, wherein the second code is a 4T code.

17. The method according to claim 12, wherein the intermediate pulse condition is a height of the intermediate pulse.

18. The method according to claim 12, wherein the intermediate pulse comprises a plurality of pulses, and the intermediate pulse condition is the width of each of the plurality of pulses.

19. An optical-information recording apparatus adapted to establish a recording pulse comprising a top pulse, an intermediate pulse and a last pulse based at least in part on a plurality of types of codes and adapted to illuminate laser light based on the established recording pulse thereby recording information to an optical recording media, the apparatus comprising:
   means for recording a test pattern to a media, said test pattern comprising a first code and a second code longer than the first code, and for changing the intermediate pulse condition for the second code while fixing conditions for the top pulse when recording the test pattern; and
   means for determining an intermediate pulse condition of the second code depending at least in part on a change tendency of the recording length of the second code relative to the recording length of the first code.

20. The apparatus according to claim 19, wherein the first code is a non-saturation code, and the second code is a saturation code.

21. The apparatus according to claim 19, wherein the first code is a 3T code.

22. The apparatus according to claim 21, wherein the second code is a 4T code.

23. The apparatus according to claim 19, wherein the intermediate pulse condition is a height of the intermediate pulse.

24. The apparatus according to claim 19, wherein the intermediate pulse comprises a plurality of pulses, and the intermediate pulse condition is the width of each of the plurality of pulses.

* * * * *